US012525859B2

(12) United States Patent
Barreiro

(10) Patent No.: US 12,525,859 B2
(45) Date of Patent: Jan. 13, 2026

(54) GENERATOR

(71) Applicant: Manuel Barreiro, Ellenbrook (AU)

(72) Inventor: Manuel Barreiro, Ellenbrook (AU)

( * ) Notice: Subject to any disclaimer, the term of this patent is extended or adjusted under 35 U.S.C. 154(b) by 282 days.

(21) Appl. No.: 18/563,728

(22) PCT Filed: May 5, 2022

(86) PCT No.: PCT/AU2022/050426
§ 371 (c)(1),
(2) Date: Nov. 22, 2023

(87) PCT Pub. No.: WO2022/246497
PCT Pub. Date: Dec. 1, 2022

(65) Prior Publication Data
US 2024/0283340 A1    Aug. 22, 2024

(30) Foreign Application Priority Data

May 26, 2021  (AU) ................................ 2021901570
Sep. 6, 2021  (AU) ................................ 2021902876
Nov. 26, 2021  (AU) ................................ 2021903817

(51) Int. Cl.
*H02K 16/02*  (2006.01)
*H02K 7/02*  (2006.01)
*H02K 19/26*  (2006.01)

(52) U.S. Cl.
CPC ............... *H02K 16/02* (2013.01); *H02K 7/02* (2013.01); *H02K 19/26* (2013.01)

(58) Field of Classification Search
CPC ...... H02K 16/005; H02K 16/02; H02K 19/26; H02K 21/12; H02K 21/26; H02K 7/02;
(Continued)

(56) References Cited

U.S. PATENT DOCUMENTS

2013/0181562 A1* 7/2013 Gieras .................... H02K 16/02
310/114
2015/0162799 A1* 6/2015 Ilan ......................... F16F 15/03
310/90.5
(Continued)

FOREIGN PATENT DOCUMENTS

AU    2020217397 A1    4/2021
CN    102570749 A    7/2012
(Continued)

OTHER PUBLICATIONS

International Search Report (Form PCT/ISA/210) for International Application No. PCT/AU2022/050426 mailed Jul. 4, 2022, 6 pages.
(Continued)

*Primary Examiner* — Naishadh N Desai
(74) *Attorney, Agent, or Firm* — Withrow + Terranova, PLLC; Vincent K. Gustafson

(57) ABSTRACT

A generator comprises a pair of coaxially aligned rotors including an inner rotor disposed within an outer rotor that combine to form a magnetic field and armature pair. First and second prime movers rotate the rotors in opposite relative directions such that electricity is produced from relative rotation of the magnetic field and armature. First and second flywheels are connected to or integral with the rotors to rotate therewith. Each flywheel has a magnetic circumference. One or more magnetic supports are arranged relative to the circumference to cause at least one vertically acting magnetic force to be exerted on the circumference to support the flywheel's weight. A pair of magnetic stabilisers are arranged on respective opposed lateral sides of each flywheel. The stabilisers cause opposed horizontally acting magnetic forces to be exerted on the flywheel's circumference to impede lateral movement of the flywheel to stabilise the flywheel.

19 Claims, 51 Drawing Sheets

(58) Field of Classification Search
CPC ........ H02K 7/025; H02K 7/09; H02K 13/003; H02K 16/025; H02K 21/021; H02K 21/22; H02K 7/10; H02K 7/20; Y02E 10/72; Y02E 60/16; H02J 9/08; Y02A 40/25; Y02P 60/14

See application file for complete search history.

(56) References Cited

U.S. PATENT DOCUMENTS

| | | | |
|---|---|---|---|
| 2018/0273016 A1* | 9/2018 | Xu | ........................ H02K 51/00 |
| 2018/0351446 A1 | 12/2018 | Wong | |

FOREIGN PATENT DOCUMENTS

| | | | |
|---|---|---|---|
| CN | 102878202 A | 1/2013 | |
| JP | H11341757 A | 12/1999 | |
| WO | 2012098571 A1 | 7/2012 | |

OTHER PUBLICATIONS

Written Opinion (Form PCT/ISA/237) for International Application No. PCT/AU2022/050426 dated Jul. 4, 2022, 5 pages.

Notification of Transmittal and International Preliminary Report on Patentability (under Chapter II of the Patent Cooperation Treaty) (Forms PCT/IPEA/416 and PCT/IPEA/409) for International Application No. PCT/AU2022/050426 mailed Nov. 23, 2022, 6 pages.

* cited by examiner

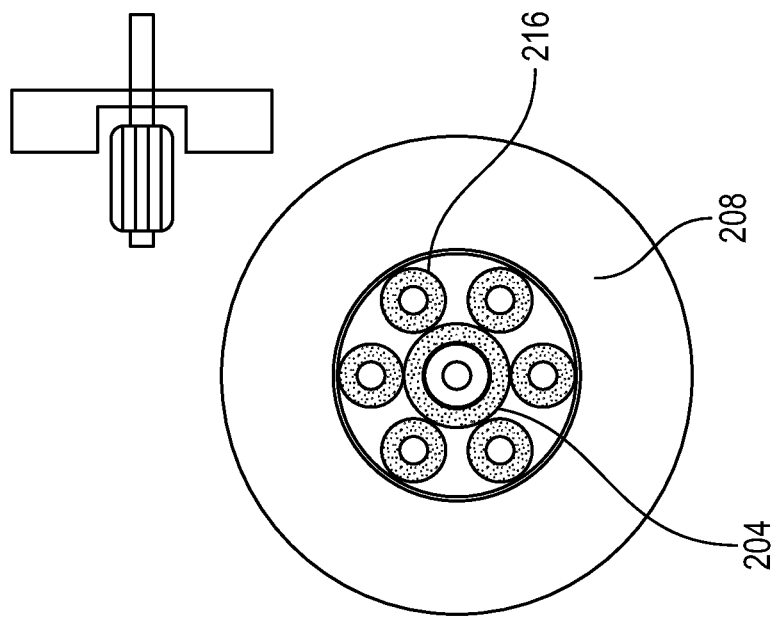
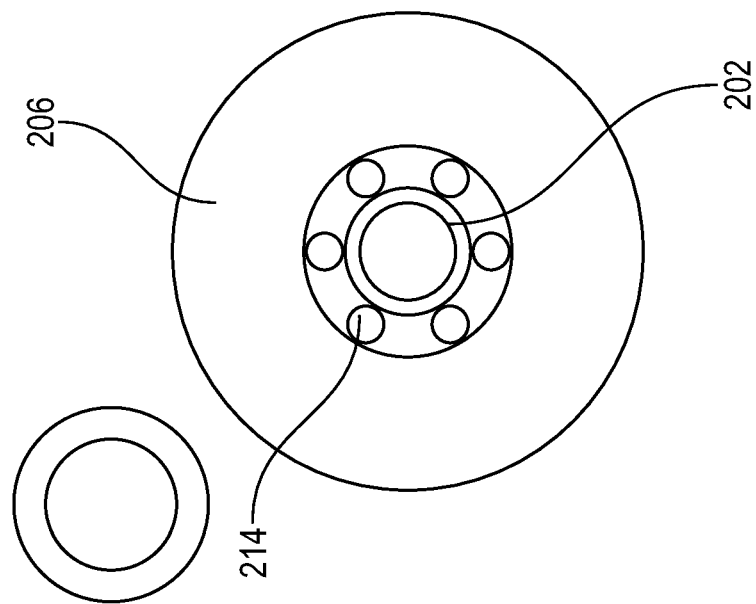
FIG. 30

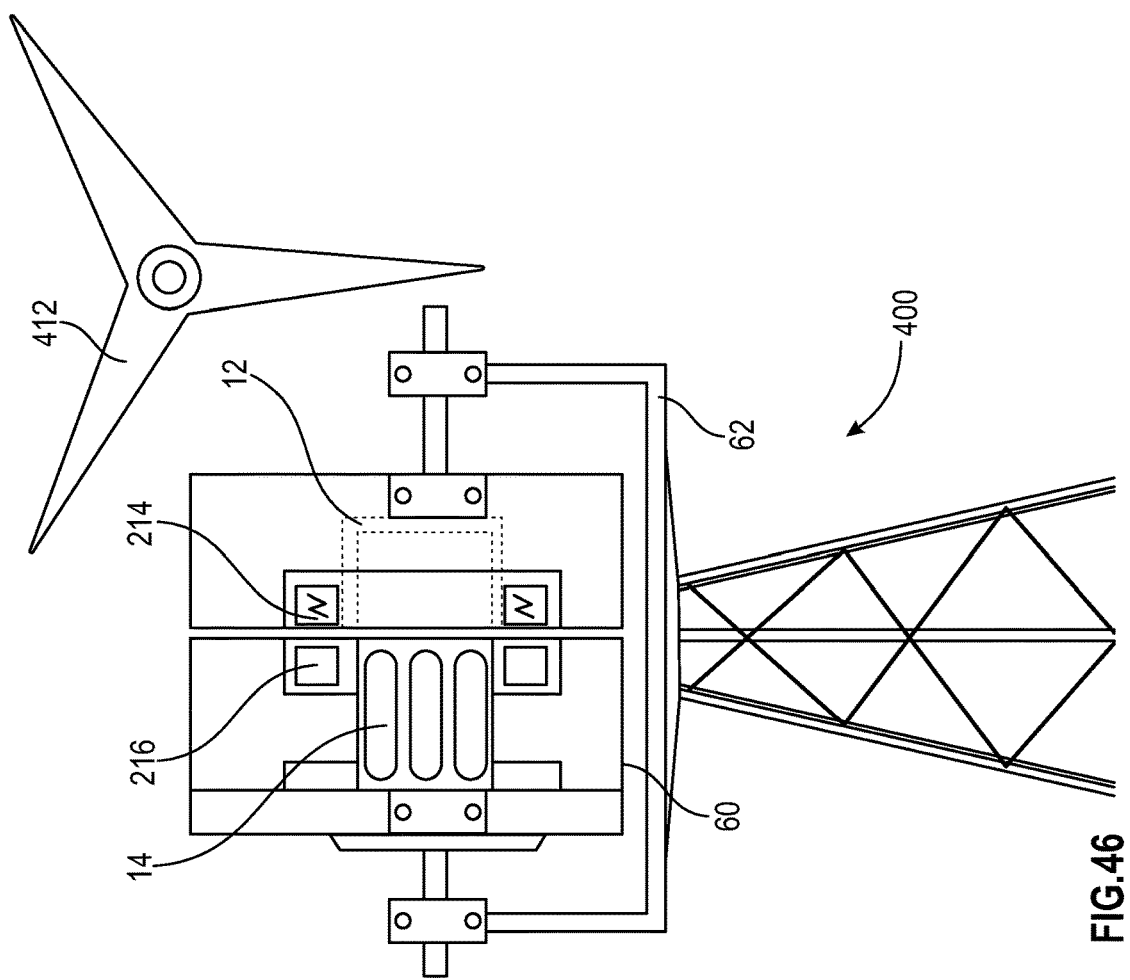
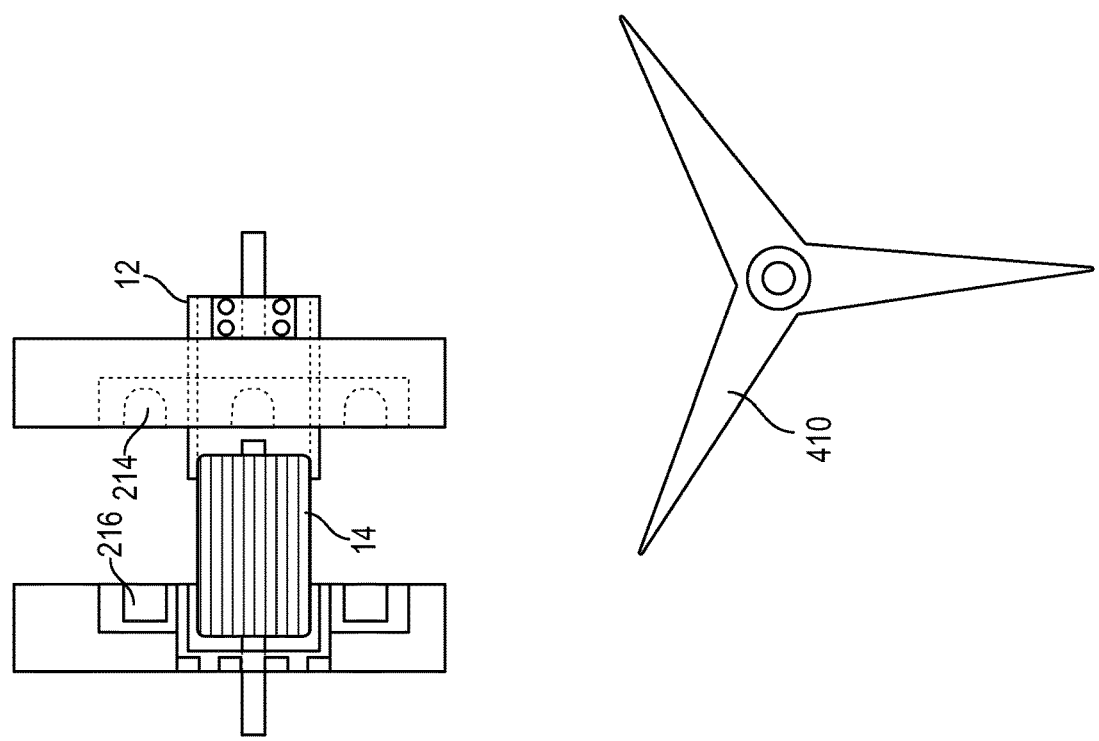
FIG. 46

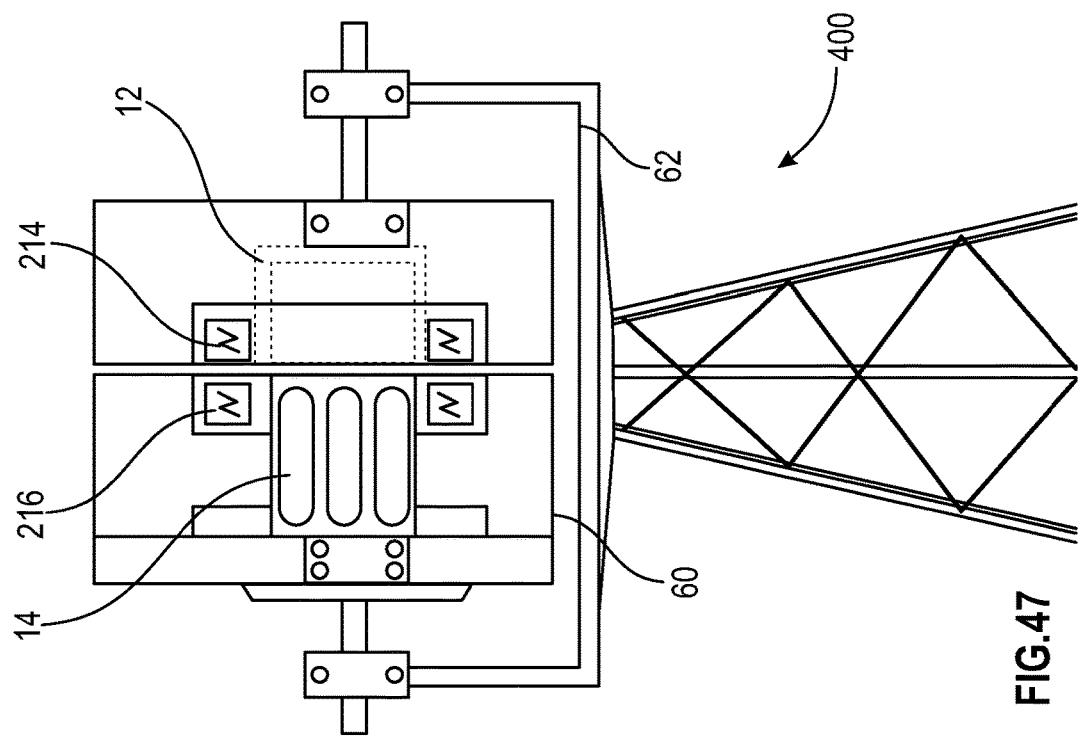
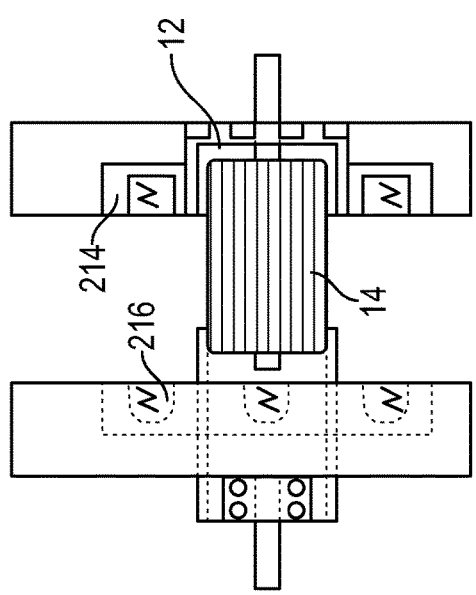
FIG.47

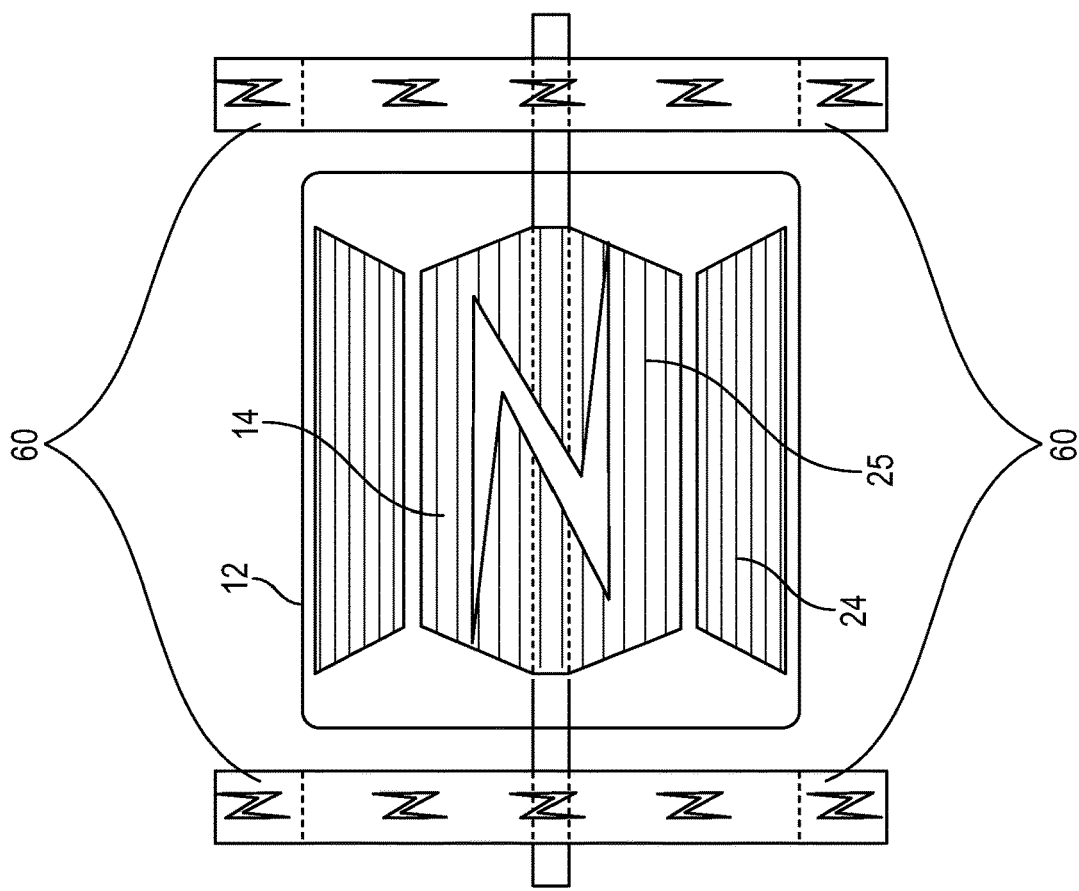
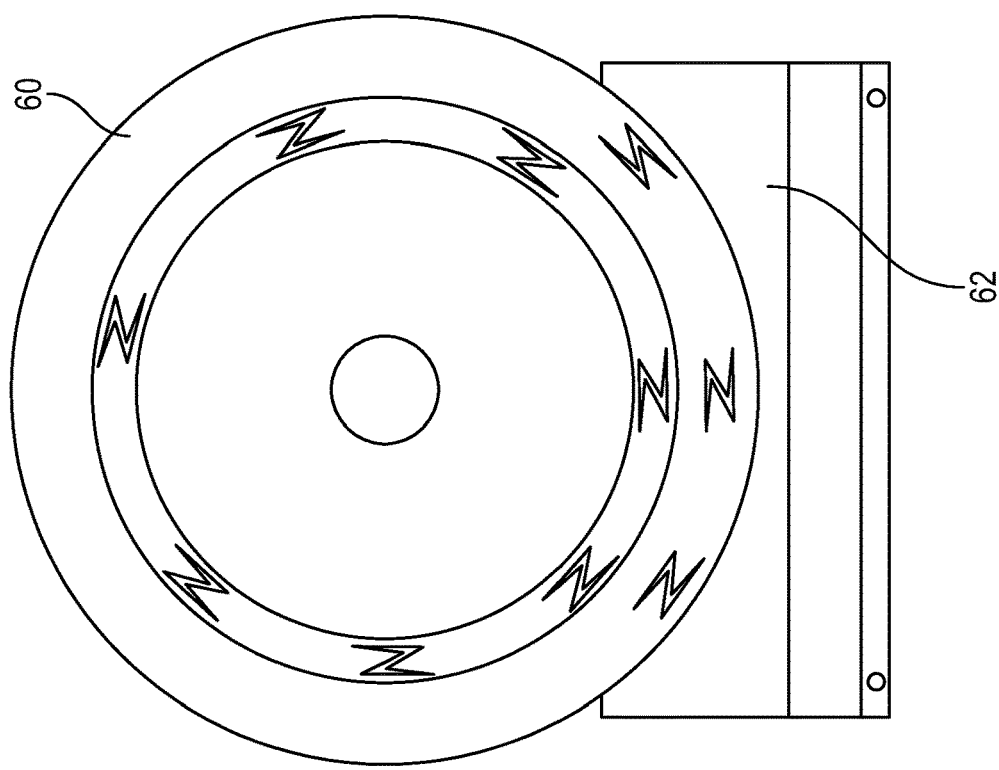
FIG.50

GENERATOR

CROSS-REFERENCE TO RELATED APPLICATIONS

This application is a 35 U.S.C. § 371 national phase filing of International Application No. PCT/AU2022/050426 filed on May 5, 2022, and further claims priority to each of Australian Provisional Patent Application No. 2021903817 filed on Nov. 26, 2021, Australian Provisional Patent Application No. 2021902876 filed on Sep. 6, 2021, and Australian Provisional Patent Application No. 2021901570 filed on May 26, 2021 wherein the entire contents of the foregoing applications are hereby incorporated by reference herein.

FIELD

The present invention relates to electrical power generation and, more particularly, to a generator for producing electrical power that comprises a pair of counter rotating rotors.

BACKGROUND

A generator is an electromechanical device for producing electrical power. A generator that produces alternating current (AC) electricity, which is often referred to as an alternator, typically comprises a rotor that is spun about an axis relative to a stationary stator by a prime mover, such as by a diesel engine. The stator comprises a magnet and the rotor comprises field coils. The rotor provides an armature that spins relative to the magnetic field of the stator causing AC power to be induced in the armature's field coils.

The frequency and voltage of the AC power that is generated by the alternator depends on the rotational speed of the rotor relative to the stator. Because the stator is stationary, if a higher voltage and frequency needs to be generated then the rotor must be turned by the prime mover at a faster rotational speed. Similarly, the voltage that is produced by a DC generator corresponds to the speed at which the generator's rotor is turned by the relevant prime mover.

To achieve faster rotor speeds in a generator, a more powerful prime mover must be used to drive the generator's rotor which can lead to operational inefficiencies. In situations where multiple prime movers are available, such as multiple wind turbines, gearing mechanisms must be used to mechanically transmit the combined torque produced by the prime movers to the generator's rotor, which can result in further operational inefficiencies. Further, when the rotor is required to spin at a rapid rotational frequency over a long period of time, this can lead to part wear and failure in the generator. The bearing assemblies that support the rotor's axle can, in particular, suffer significant wear when the rotor is spinning at a high rotational speed.

Generators are also commonly required to produce a smooth output current at a particular desired frequency and/or voltage. For example, an AC generator that is used in a power station to supply electrical power to a grid network must typically generate the power at a constant frequency of 50 or 60 Hertz (Hz) (the so-called "utility frequency"). It is inefficient, and in many cases not possible, to regulate the output frequency of a high-capacity AC generator using electronic means, such as a variable frequency drive. The output frequency is, therefore, commonly regulated using a mechanical governor mechanism that controls the generator's rotor speed. For example, in hydroelectric power stations the rotational speed of each water turbine is regulated by controlling the flow rate of water flowing into the turbine. In wind farms, the speed of each wind turbine is regulated by reactively varying the angle of the turbine's blades relative to the current wind direction and speed. It is difficult to achieve a smooth output frequency using such mechanical governor systems. For example, when the speed and/or direction of the wind powering a wind turbine suddenly changes, the angle of the turbine's blades must be rapidly adjusted to compensate for the wind change. There is inevitably a delay between the point in time at which the wind change is detected and when the turbine's blades are accordingly adjusted. The rotational speed of the turbine rotor will deviate from its desired speed while the turbine's blades are being adjusted. This results in fluctuations in the generator's output frequency which is undesirable for grid networks and many other electrical loads.

The preceding discussion of the background art is intended to facilitate an understanding of the present invention only. The discussion is not an acknowledgement or admission that any of the material referred to is or was part of the common general knowledge as at the priority date of the application.

SUMMARY

According to the present invention there is provided a generator, wherein the generator comprises:

first and second rotors that are coaxially aligned and comprise an outer rotor and an inner rotor, the inner rotor being disposed within the outer rotor, wherein the rotors combine to form a magnetic field and armature pair for generating electricity;

first and second prime movers that are independently connected to the first and second rotors respectively to rotate the rotors in opposite relative directions such that electricity is produced from relative rotation of the magnetic field and armature; and first and second flywheels connected to or integral with the first and second rotors respectively to rotate with the first and second rotors respectively, wherein a combined weight of the first flywheel and first rotor is substantially equal to a combined weight of the second flywheel and second rotor, and wherein each individual flywheel of the flywheels includes an annular magnet that extends circumferentially around an outer circumference of the individual flywheel, and wherein the individual flywheel is provided with:

one or more magnetic supports arranged relative to the annular magnet to cause at least one vertically acting magnetic force to be exerted on the annular magnet to support a weight of the flywheel; and a pair of magnetic stabilisers arranged on respective opposed lateral sides of the flywheel, wherein the stabilisers have inwardly positioned surfaces facing the flywheel, wherein magnetic polarities of the surfaces match a magnetic polarity of an outward facing surface of the annular magnet such that the stabilisers cause a pair of opposed magnetic repulsion forces to be exerted on the annular magnet to impede lateral movement of the flywheel to stabilise the flywheel.

The stabilisers may be mounted on adjustable supports that allow respective positions of the inwardly positioned surfaces to be adjusted relative to the annular magnet to alter respective magnitudes of the repulsion forces.

The stabilisers may comprise electromagnets. The electromagnets may be powered by the electricity generated by the generator.

The magnetic supports may comprise a first magnetic support disposed underneath the flywheel, wherein a magnetic polarity of the first magnetic support matches a magnetic polarity of the annular magnet such that the annular magnet is repelled from the first magnetic support.

The magnetic supports may comprise a second magnetic support disposed above the flywheel, wherein a magnetic polarity of the second magnetic support is opposite to the magnetic polarity of the annular magnet such that the annular magnet is attracted to the second magnetic support.

The magnetic supports may be mounted on adjustable supports that allow respective vertical positions of the magnetic supports relative to the annular magnet to be altered.

The first and second rotors may comprise respective first and second drive axles. The first and second prime movers may comprise respective first and second drive shafts coupled to the respective first and second drive axles to rotate the rotors in the opposite relative directions.

The first and second drive shafts may be directly axially coupled to the first and second drive axles respectively.

The first and second drive shafts may be indirectly coupled to the first and second drive axles respectively by pulley wheel and drive belt arrangements.

The outer rotor may provide the magnetic field and the inner rotor may provide the armature.

The generator may comprise a slip ring assembly provided on the drive axle of the inner rotor.

The generator may comprise a slip ring assembly that comprises a pair of conductive rings extending concentrically about a rotational axis of the second of the flywheels.

The outer rotor may comprise a generally cylindrical hollow drum and the first of the flywheels may be attached to an outward facing surface of the drum.

The first of the flywheels may comprise an annular disc extending circumferentially about the outward facing surface of the drum.

The second of the flywheels may be equal in weight to the first of the flywheels and be attached to a drive axle of the inner rotor such that it is positioned laterally offset from the drum.

The generator may comprise a set of permanent magnets connected to the first of the flywheels and a set of field coils connected to the second of the flywheels, wherein relative rotation between the permanent magnets and field coils causes an electrical current to be induced in the field coils.

The generator may comprise a third rotor, wherein the inner and outer rotors are disposed inside and coaxially aligned with the third rotor, the third rotor being connected to a drive axle of the inner rotor such that the third rotor is rotated by the drive axle with the inner rotor in an opposite relative direction to the outer rotor, and wherein the third rotor and outer rotor combine to form a magnetic field and armature pair for generating electricity.

The prime movers may comprise a pair of hydraulic turbines or a pair of wind turbines.

BRIEF DESCRIPTION OF DRAWINGS

Embodiments of the invention will now be described by way of example only with reference to the accompanying drawings, in which:

FIG. 30 is a side elevation view of a pair of flywheels of the generator of FIG. 28;

FIGS. 45-48 show wind turbine generators according to further example embodiments of the invention, wherein the generators are shown in exploded, partially exploded or unexploded form;

FIGS. 49-50 show generators according to further example embodiments of the invention, wherein the generators are shown in exploded, partially exploded or unexploded form.

DESCRIPTION OF EMBODIMENTS

Figure 1:
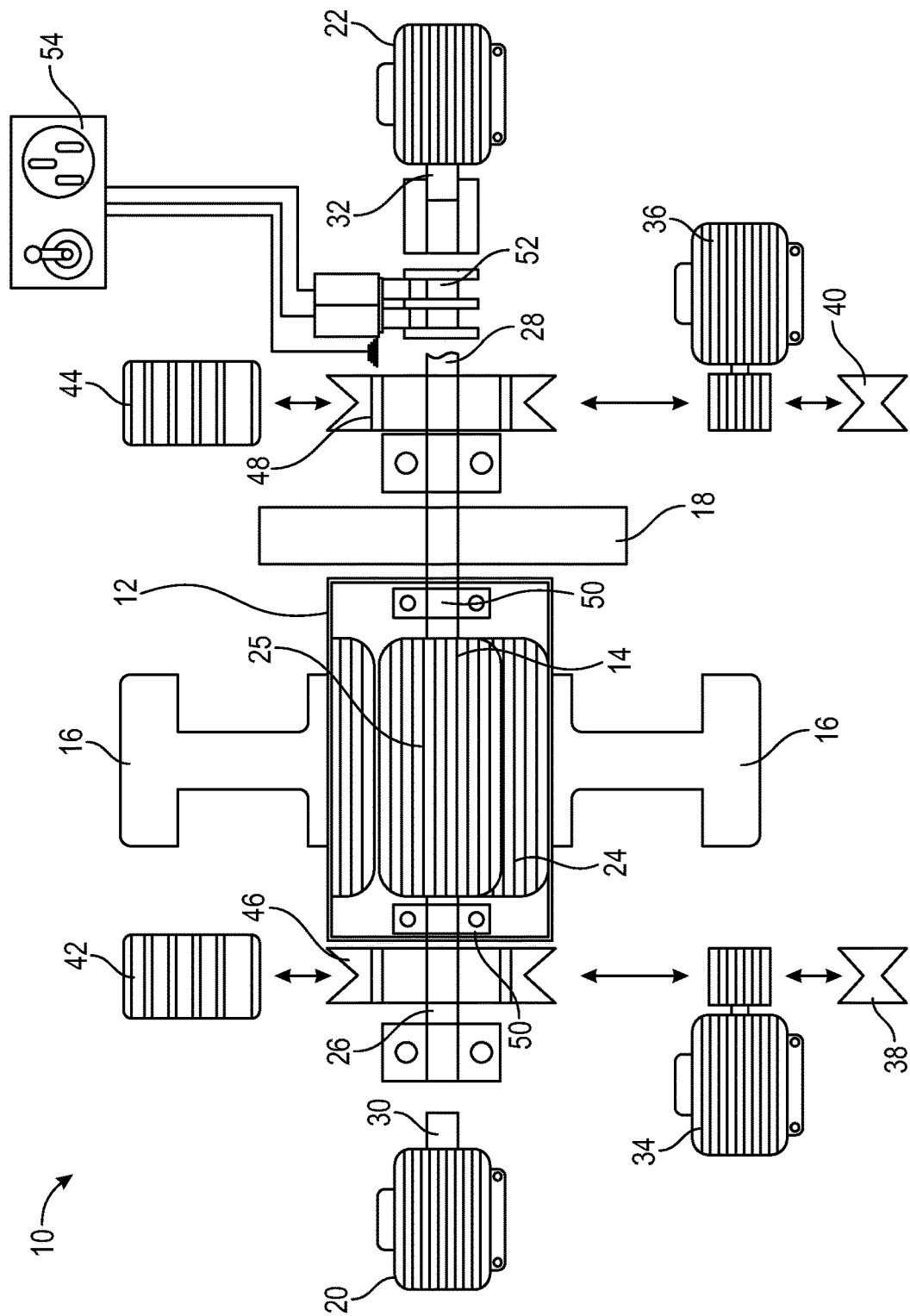
FIG. 1 is a plan view of a generator according to an example embodiment of the invention shown in partially exploded cross sectional form.

Referring to FIG. 1, an example embodiment of the present invention provides a generator 10 that comprises a first rotor 12 and a second rotor 14. The two rotors are coaxially aligned and comprise an outer rotor 12 and an inner rotor 14, wherein the inner rotor 14 is disposed within the outer rotor 12. The two rotors 12, 14 combine to form a magnetic field and armature pair for generating electricity. The generator 10 also comprises a first prime mover 20 and a second prime mover 22. The two prime movers 20, 22 are independently connected to the first and second rotors 12, 14 respectively such that they rotate the rotors 12, 14 in opposite relative directions thereby causing electricity to be produced by relative rotation of the magnetic field and armature.

Figure 17:
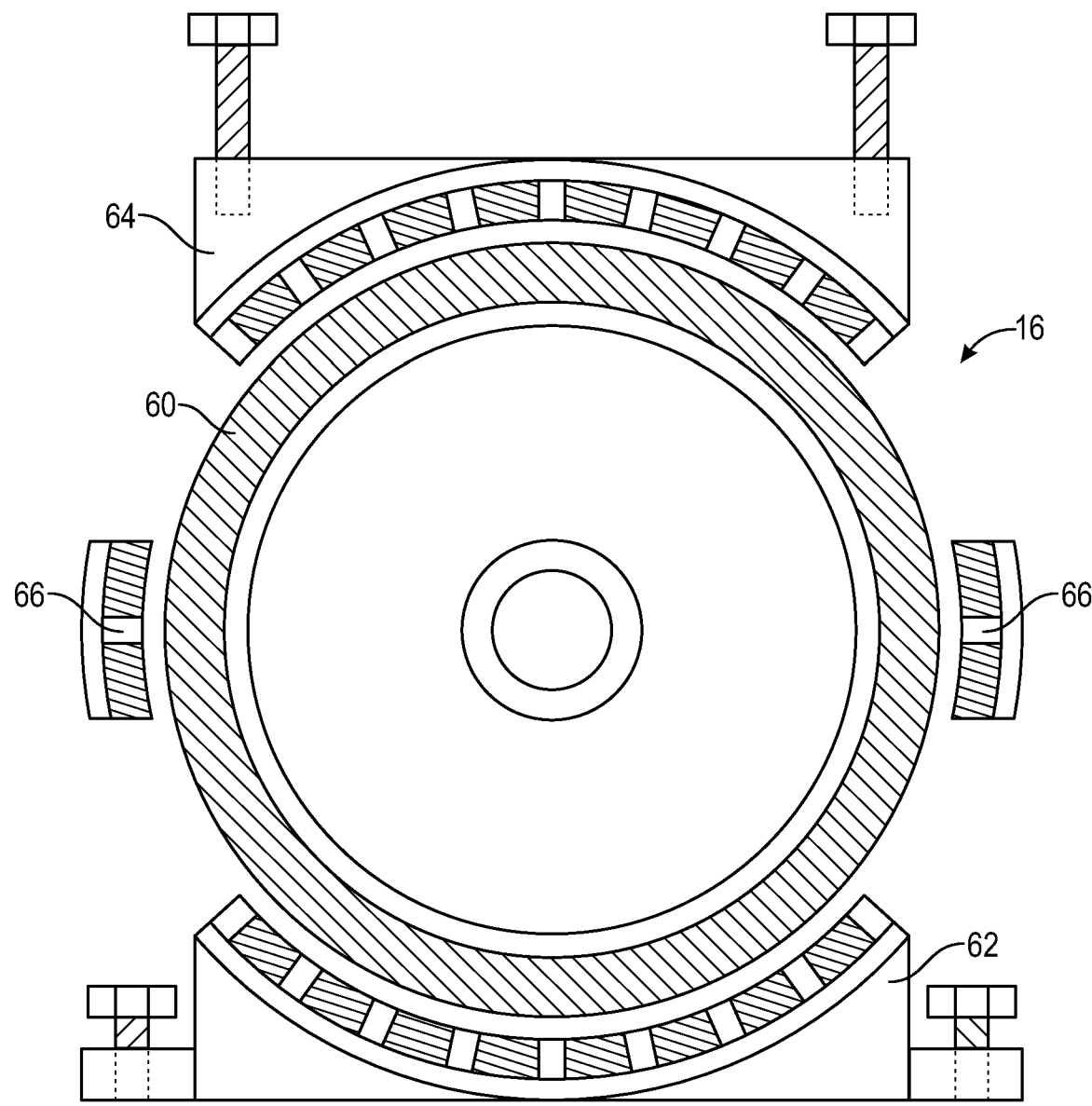
FIG. 17 is a side elevation view of a flywheel included in the invention.

The generator 10 also comprises a first flywheel 16 and a second flywheel 18. The first and second flywheels 16, 18 are connected to the first and second rotors 12, 14 to rotate with the first and second rotors 12, 14 respectively. As depicted in FIG. 17, each individual flywheel 16, 18 has a magnetic circumference 60 and is provided with one or more magnetic supports 62, 64 arranged relative to the circumference 60 that cause at least one vertically acting magnetic force to be exerted on the circumference 60 to support a weight of the flywheel 16, 18. Each flywheel 16, 18 is also provided with a pair of magnetic stabilisers 66 arranged on respective opposed lateral sides of the flywheel 16, 18. The stabilisers 66 cause opposed horizontally acting magnetic forces to be exerted on the circumference 60 to stabilise and impede lateral movement of the flywheel 16, 18 during use.

More particularly, in the example depicted in FIG. 1 the outer rotor 12 comprises a generally cylindrical hollow drum and its corresponding flywheel 16 comprises a generally annular assembly that extends circumferentially about the drum's outward-facing cylindrical surface. The outer rotor 12 may comprise a magnet 24 attached to an inward-facing surface of the drum. The magnet 24 may be generally annular in shape and extend circumferentially about the drum's inward-facing surface. The magnet 24 may comprise any means for generating a magnetic field and, for example, may comprise a permanent magnet or an electromagnet. In examples where the magnet 24 is an electromagnet, the outer rotor 12 may be provided with an excitation control system for supplying an electrical current to the field coils of the electromagnet to create the required magnetic field.

The inner rotor 14 may comprise field coils 25 that are positioned substantially centrally within the hollow drum of the outer rotor 12. The field coils 25 operate as a spinning armature of the generator 10 such that relative rotation between the field coils 25 and the magnetic field of the magnet 24 cause an electrical current to be generated in the field coils 25 by electromagnetic induction. The outer rotor 12 may comprise a drive axle 26 that rotates with the rotor 12. The inner rotor 14 may also comprise a drive axle 28 that rotates with the rotor 14 and is axially aligned with the outer rotor drive axle 26. The field coils 25 may extend circumferentially about the drive axle 28 of the inner rotor 14. The second flywheel 18 may be attached to the drive axle 28 of the inner rotor 14 and may be positioned laterally offset from the drum of the outer rotor 12.

Figure 3:
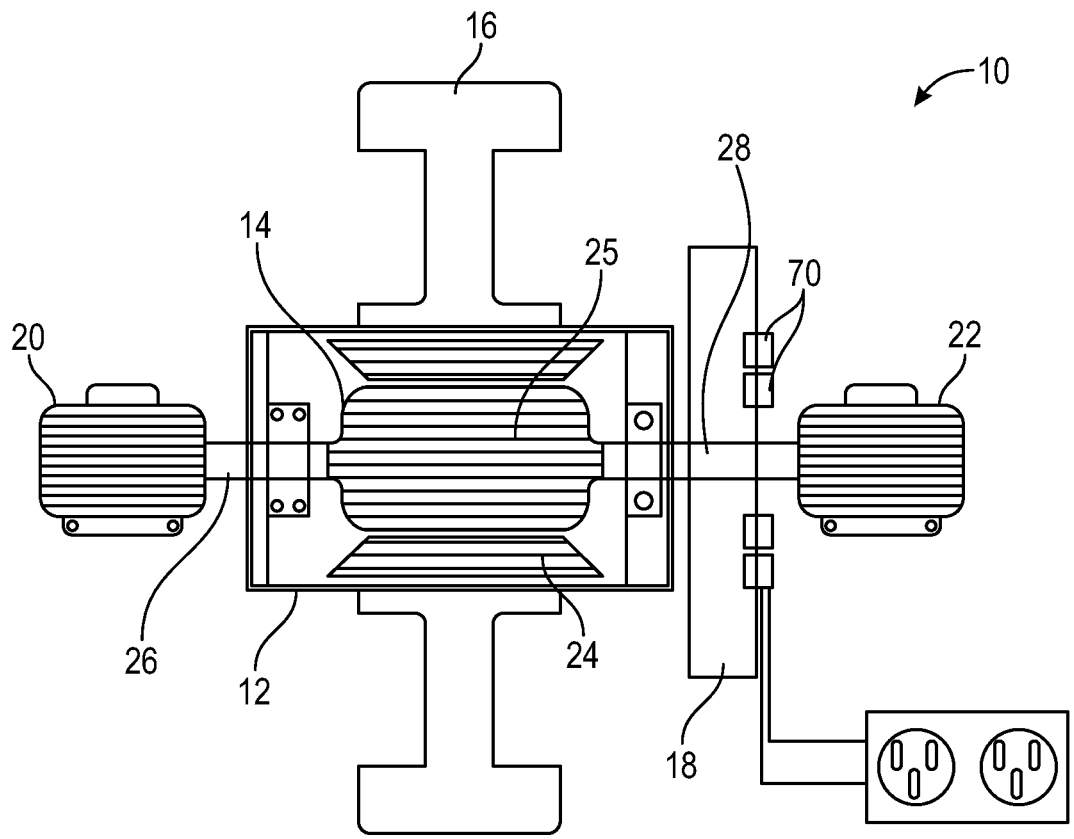
FIG. 3 is a plan view of a generator according to a further example embodiment of the invention shown partially in cross section.

The first prime mover 20 may comprise a drive shaft 30 that is directly axially coupled to the drive axle 26 of the outer rotor 12. Similarly, the second prime mover 22 may comprise a drive shaft 32 that is directly axially coupled to the drive axle 28 of the inner rotor 14. The prime movers 20, 22 are shown in exploded (disconnected) form in FIG. 1. FIG. 3 depicts an embodiment wherein the prime movers 20, 22 are shown in unexploded (connected) form with their respective draft shafts connected directly to the rotor axles 26, 28. In this configuration, the prime movers 20, 22 directly rotate the axles 26, 28 and, therefore, rotors 12, 14.

The prime movers 20, 22 may comprise any means for generating a rotational mechanical force to turn the drive shafts 30, 32 about their respective rotational axes. For example, each of the prime movers 20, 22 may comprise a reciprocating engine (such as a diesel engine), a gas turbine, a wind turbine or a hydraulic turbine. In other examples, each of the prime movers 20, 22 may comprise an electrical motor that is supplied power from an external electrical power source, including a renewable source of electrical power.

Figure 2:
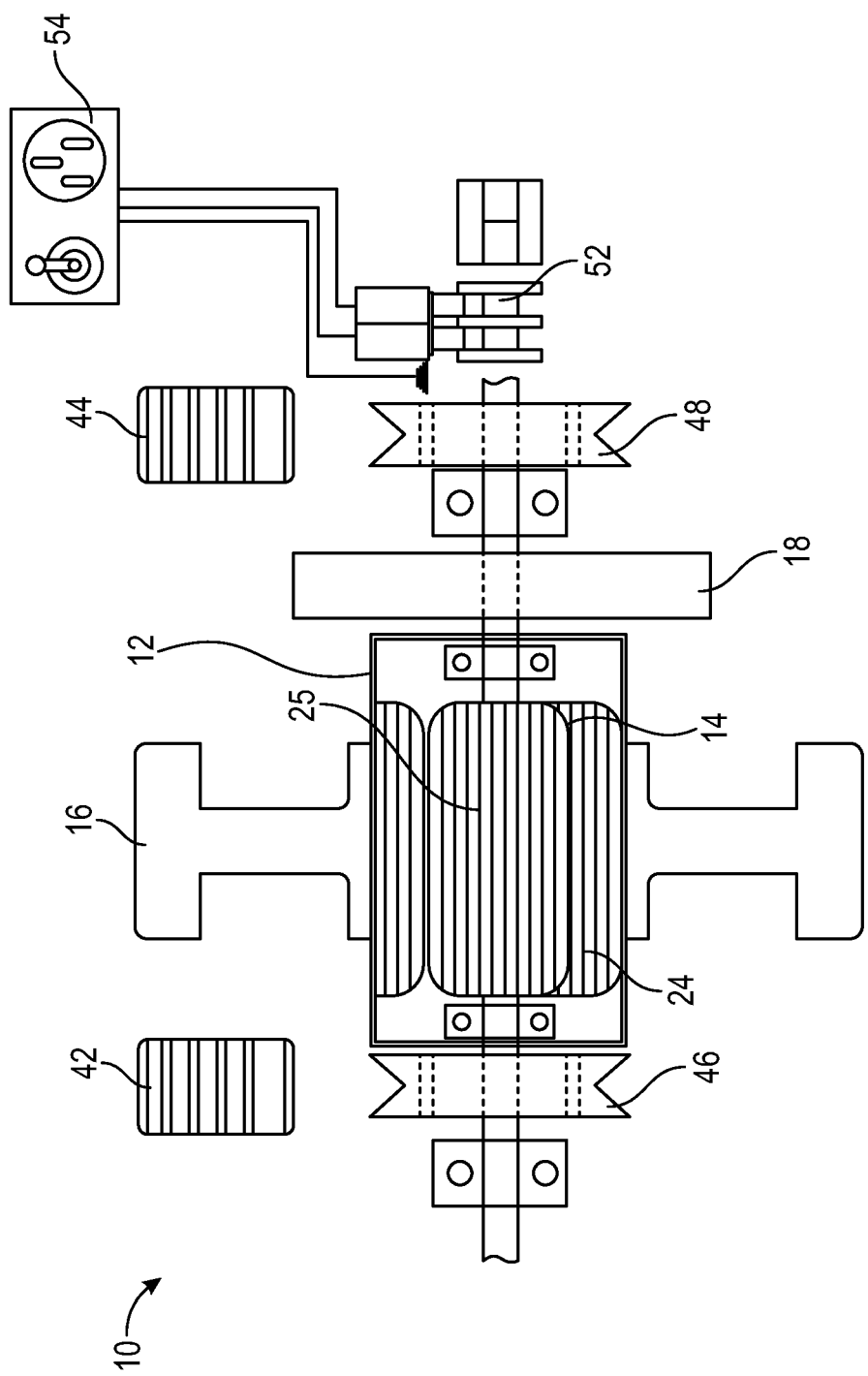
FIG. 2 is a plan view of a generator according to a further example embodiment of the invention shown in partially exploded cross sectional form.

As shown in FIGS. 1 and 2, in other examples the generator 10 may comprise a pair of prime movers 34, 36 that are laterally offset from the rotor axles 26, 28. The prime movers 34, 36 may comprise respective drive shafts that are provided with V-shaped pulley wheels 38, 40. The pulley wheels 38, 40 may be indirectly coupled to the rotor axles 26, 28 by drive belts 42, 44 that extend around the pulley wheels 38, 40 and around corresponding V-shaped pulley wheels 46, 48 provided on the rotor axles 26, 28. The prime movers, pulley wheels and drive belts are shown in exploded (unconnected) form in FIG. 1. Further, the drive belts 42, 44 and V-shaped pulley wheels 46, 48 on the rotor axles 26, 28 are shown in isolation without any prime movers in FIG. 2.

To enable the outer rotor 12 to rotate coaxially with the inner rotor 14, the outer rotor 12 may be attached rotatably to the drive axle 28 of the inner rotor 14 by a pair of annular collars 50. The collars 50 may extend about the drive axle 28 and may each comprise a bearing arrangement that allows the collars 50 to rotate smoothly about the axle 28. In use, the prime movers 20, 22 turn the rotor axles 26, 28 in opposite directions which, accordingly, causes the rotors 12, 14 to rotate in opposite directions. The relative counter rotation between the magnetic field provided by the magnet 24 of the first rotor 12 and the field coils 25 of the second rotor 14 causes an alternating (AC) electrical current to be induced in the field coils 25. In one example, each of the rotors 12, 14 may rotate at a rotational frequency of between 50 and 60 Hertz (Hz). The rotational energy provided to the rotors 12, 14 by the prime movers 20, 22 is stored in the counter-rotating flywheels 16, 18.

The electrical current generated in the field coils 25 may be received by a slip ring assembly 52 provided on the drive axle 28 of the inner rotor 14. In the example depicted in FIG. 1, the slip ring assembly 52 comprises a pair of conductive rings extending circumferentially about the drive axle 28 and a pair of brushes that bear against the conductive rings to receive the generated electrical current. The drive axle 28 may comprise wires (not shown) extending longitudinally through a hollow lumen of the axle 28 that supply the electricity from the field coils 25 to the conductive rings of the slip ring assembly 52. The electrical current may be supplied from the slip rings 52 to an electricity distribution network or connector interface 54 for subsequent use by electrical appliances. The field coils 25 may be arranged and configured to produce three-phase or single-phase AC power. An earth prod may be provided with the generator 10. The generator 10 may also comprise an automatic voltage regulator (not shown) to control the output voltage of the field coils 25.

It will be appreciated that the flywheels 16, 18 are large, heavy objects that store substantial angular momentum once accelerated to a required rotational speed during use. To mitigate against wear to the axles 26, 28 and to the bearing assemblies that rotatably support the axles 26, 28 during use, the one or more magnetic supports 62, 64 are operatively configured to support the weight of the flywheels 16, 18. For example, FIG. 17 depicts an individual flywheel 16 that may be used in embodiments. The flywheel 16 comprises a lowermost magnetic support 62 and an uppermost magnetic support 64. The flywheel 16 comprises an annular magnet 60 that extends circumferentially around an outer circumference of the flywheel 16. The inner main circular body of the flywheel 16 may be made of aluminium and the annular magnet 60 may be made of iron or a similar ferromagnetic material.

The magnetic polarity of the concave uppermost surface of the lowermost support 62 may match the magnetic polarity of the annular magnet 60, thus causing the annular magnet 60 to be repelled away from the support 62 in an upward direction. The magnetic polarity of the concave lowermost surface of the uppermost support 64 may be opposite to the magnetic polarity of the annular magnet 60, thus causing the annular magnet 60 to be attracted toward the support 64 in an upward direction. The respective repulsion and attraction forces provided by the two supports 62, 64 combine to counteract and support the weight of the flywheel 16. In other examples, only one magnetic support may be used that is adapted to cause a sufficiently powerful repulsion or attraction force to act on the flywheel 16 to support its weight. For example, only the lowermost support 62 or only the uppermost support 64 may be used.

The flywheel 16 is also stabilised by the pair of magnetic stabilisers 66 arranged on respective opposed lateral sides of the flywheel 16. The stabilisers 66 cause opposed horizontally acting magnetic forces to be exerted on the annular magnet 60 to impede lateral movement of the flywheel 16 during use. Preferably, each stabiliser 66 has an inwardly positioned surface facing the flywheel 16 that has a magnetic polarity that matches the magnetic polarity of the annular magnet 60. In this configuration, the annular magnet 60 is repelled from each stabiliser 66 inwardly toward the centrally-disposed rotational axis of the flywheel 16. The pair of repulsion forces operate to centre the flywheel 16 about its axis by opposing any periodic forces that act laterally on the axis due to lack of radial symmetry of the flywheel's weight. The stabilisers 66 also operate to oppose any periodic forces acting laterally on the axis due to the generator 10 being operated on a ground surface that is not perfectly level.

In one example, the magnetic polarity of the outward facing surface of the annular magnet 60, and the magnetic polarities of the surfaces of the lower support 62 and lateral stabilisers 66 facing the flywheel 16, may each be north and the magnetic polarity of the surface of the upper support 64 facing the flywheel 16 may be south. In other examples, the foregoing magnetic polarities may be reversed. The magnets included in the supports 62, 64 and stabilisers 66 may be permanent magnets or electromagnets. In examples where electromagnets are used, the electromagnets may be powered using electricity produced by the generator 10.

The lower and upper supports 62, 64 and the lateral stabilisers 66 may each be mounted on adjustable supports that allow their respective positions to be adjusted relative to the outer circumference 60 of the flywheel 16. For example, the lower and upper supports 62, 64 may be vertically adjustable and the lateral stabilisers 66 may be horizontally adjustable in position. The other flywheel 18 of the generator 10 may comprise equivalent adjustable magnetic support and stabiliser devices. Adjusting the positions of the supports and stabilisers allows the strength of the corresponding magnetic attraction and repulsion forces to be adjusted to suit the particular dimensions and mass characteristics of each flywheel 16, 18. This configuration also allows the generator 10 to accommodate different sized flywheels should a flywheel 16 need to be upgraded or replaced over time.

The combined weight of the first flywheel 16 and outer rotor 12 is preferably substantially equal to the combined weight of the second flywheel 18 and inner rotor 14. This ensures that the rotational inertia of each spinning flywheel 16, 18 is substantially equal. In examples where the generator 10 is used for large scale power generation, the rotors 12, 14 may comprise structural parts that are sufficiently large and heavy such that the relevant parts inherently operate as the generator's flywheels. That is to say, the relevant parts provide integral flywheels of the rotors 12, 14. Accordingly, the separately attached flywheels 16, 18 may be dispensed with in such examples.

In the examples depicted in FIGS. 1 and 2, the outer rotor 12 comprises the magnet 24 of the generator 10 and the inner rotor 14 comprises the field coils 25 that operate as the armature of the generator 10. In other examples, however, the inner rotor 14 may provide the magnetic field and the outer rotor 12 may comprise the field coils to operate as the armature.

Figure 6:
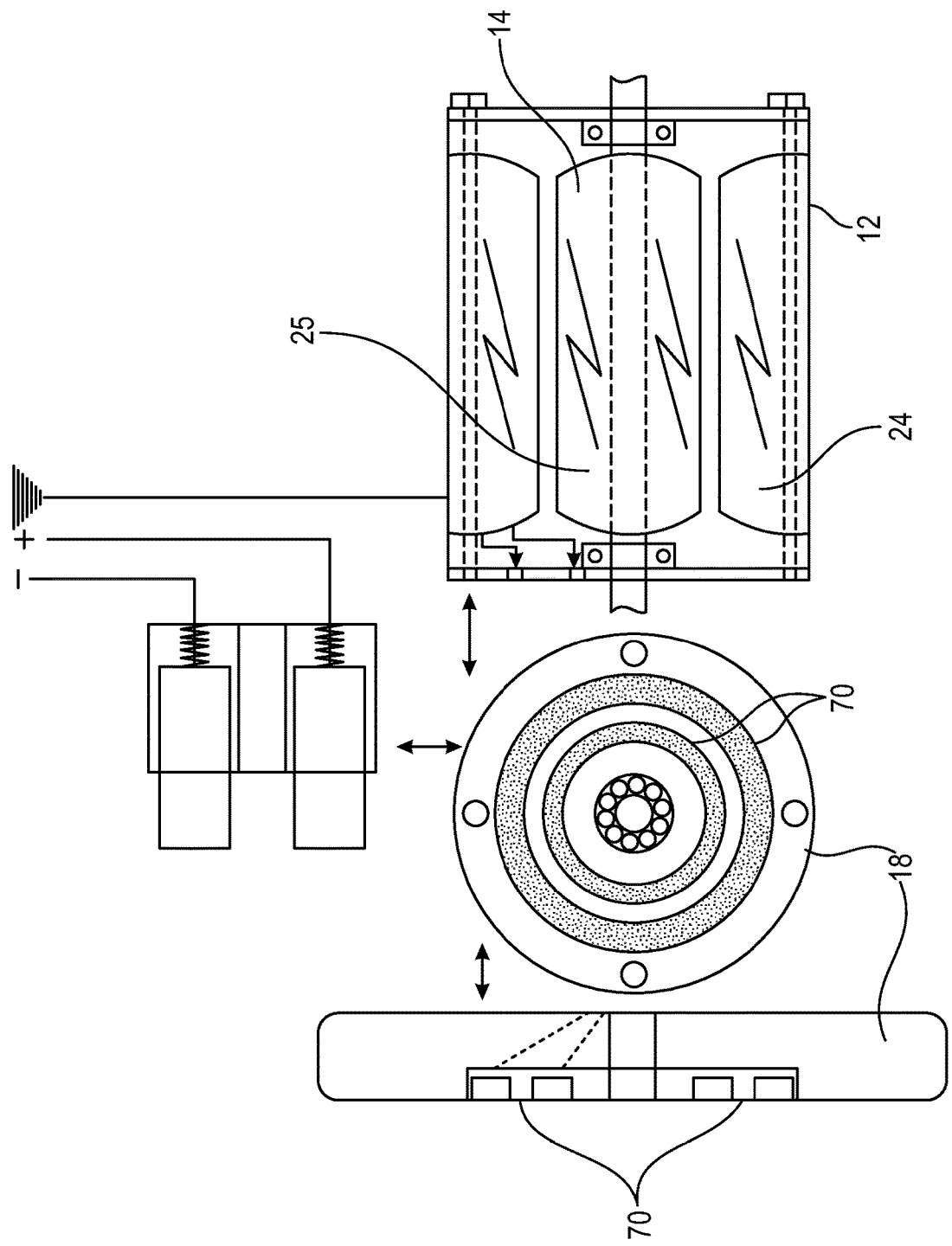
FIG. 6 is an exploded view of a generator according to a further example embodiment of the invention shown partially in cross section.
Figure 7:
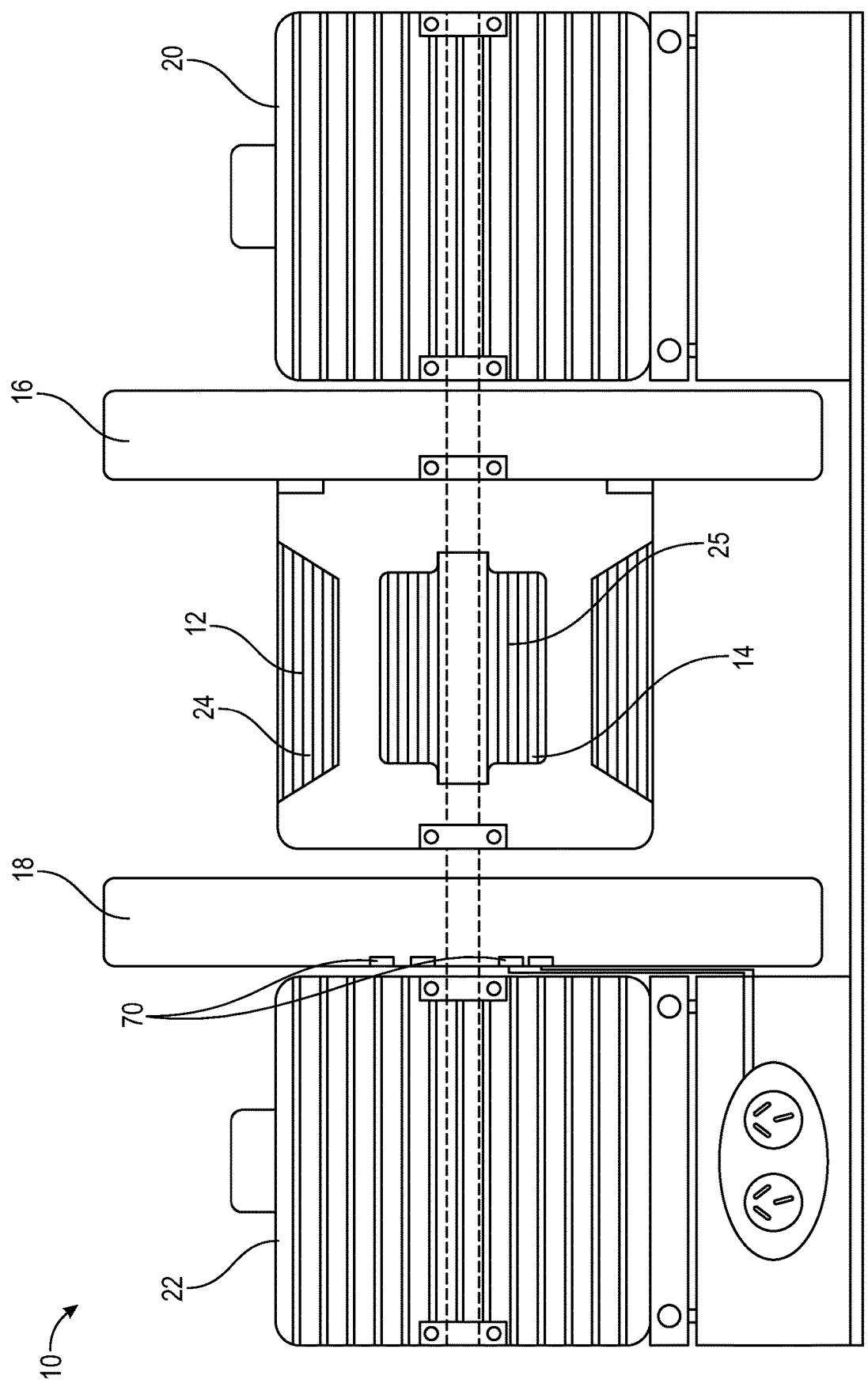
FIG. 7 is a side elevation view of a generator according to a further example embodiment of the invention shown partially in cross section.

In lieu of the slip ring assembly 52 provided on the drive axle 28 of the inner rotor 14, the flywheel 18 of the inner rotor 14 may comprise a slip ring assembly. For example, referring to FIGS. 3, 6 and 7 the slip ring assembly may comprise a pair of conductive rings 70 extending concentrically about a rotational axis of the second flywheel 18 on its outward facing surface. The generator 10 may comprise a pair of conductive brushes (not shown) that bear against the concentric rings 70 to receive the electrical power generated by the field coils 25.

Figure 4:
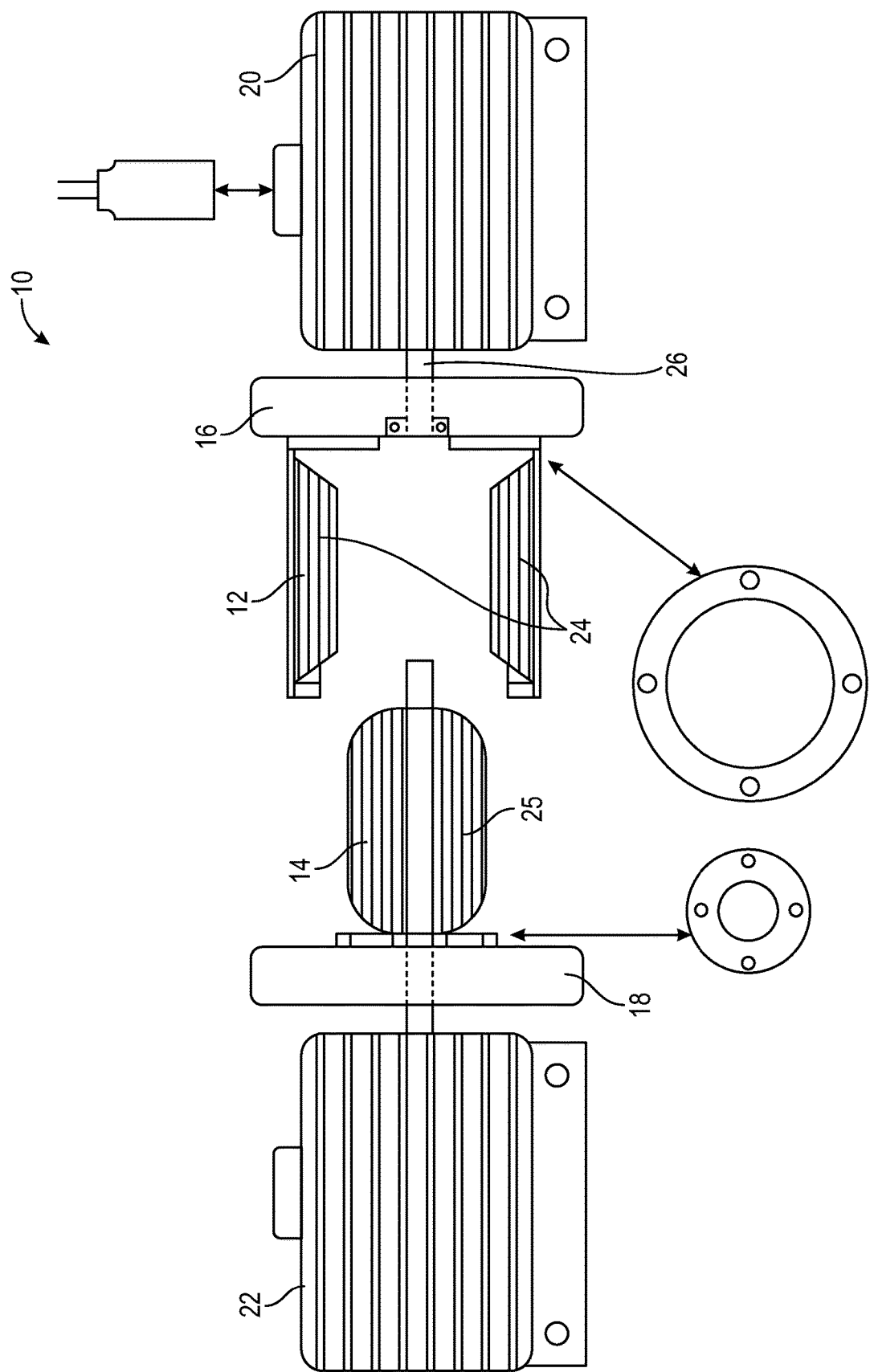
FIG. 4 is a side elevation view of a generator according to a further example embodiment of the invention shown in partially exploded form.
Figure 5:
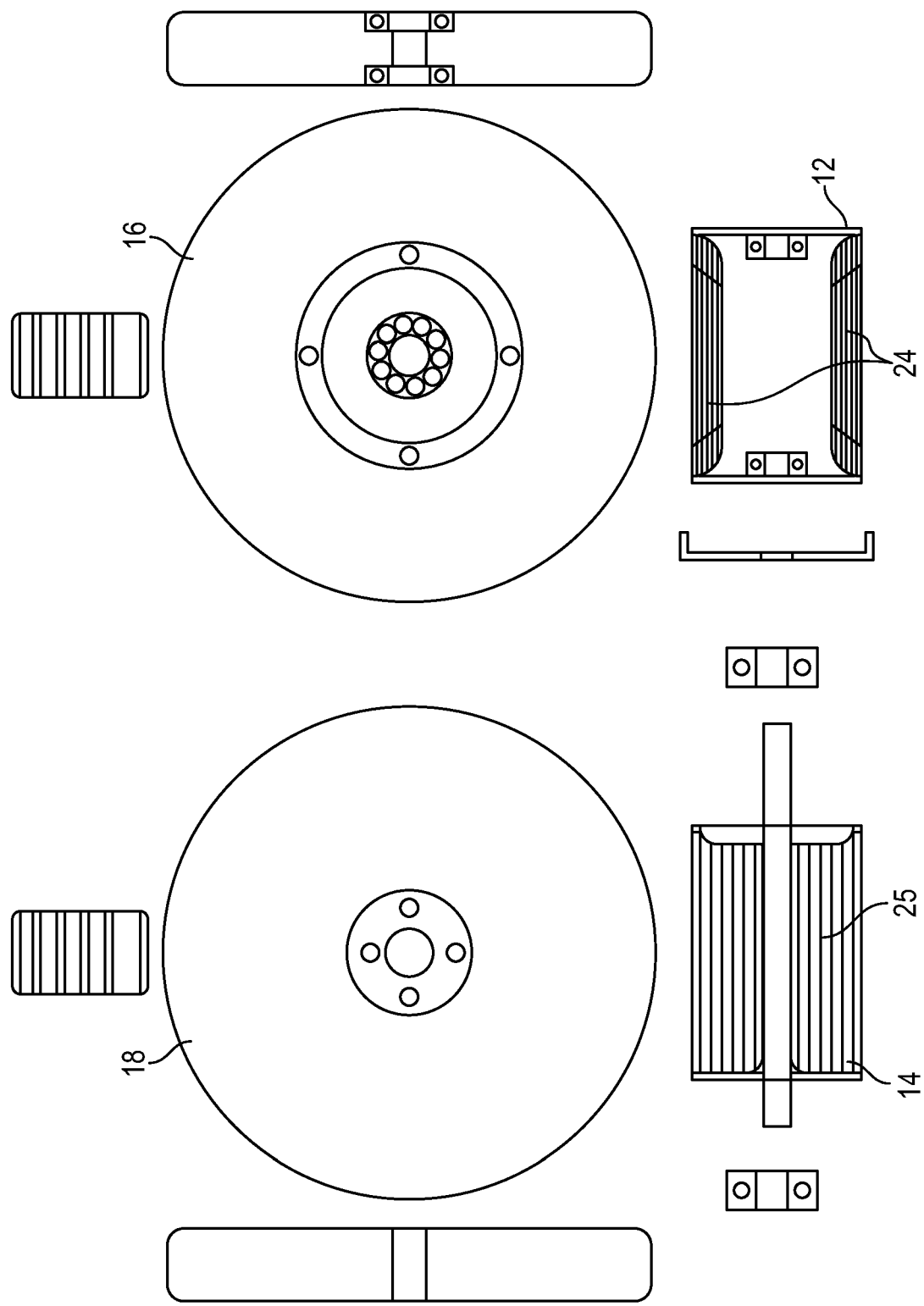
FIG. 5 is an exploded view of a generator according to a further example embodiment of the invention.
Figure 8:
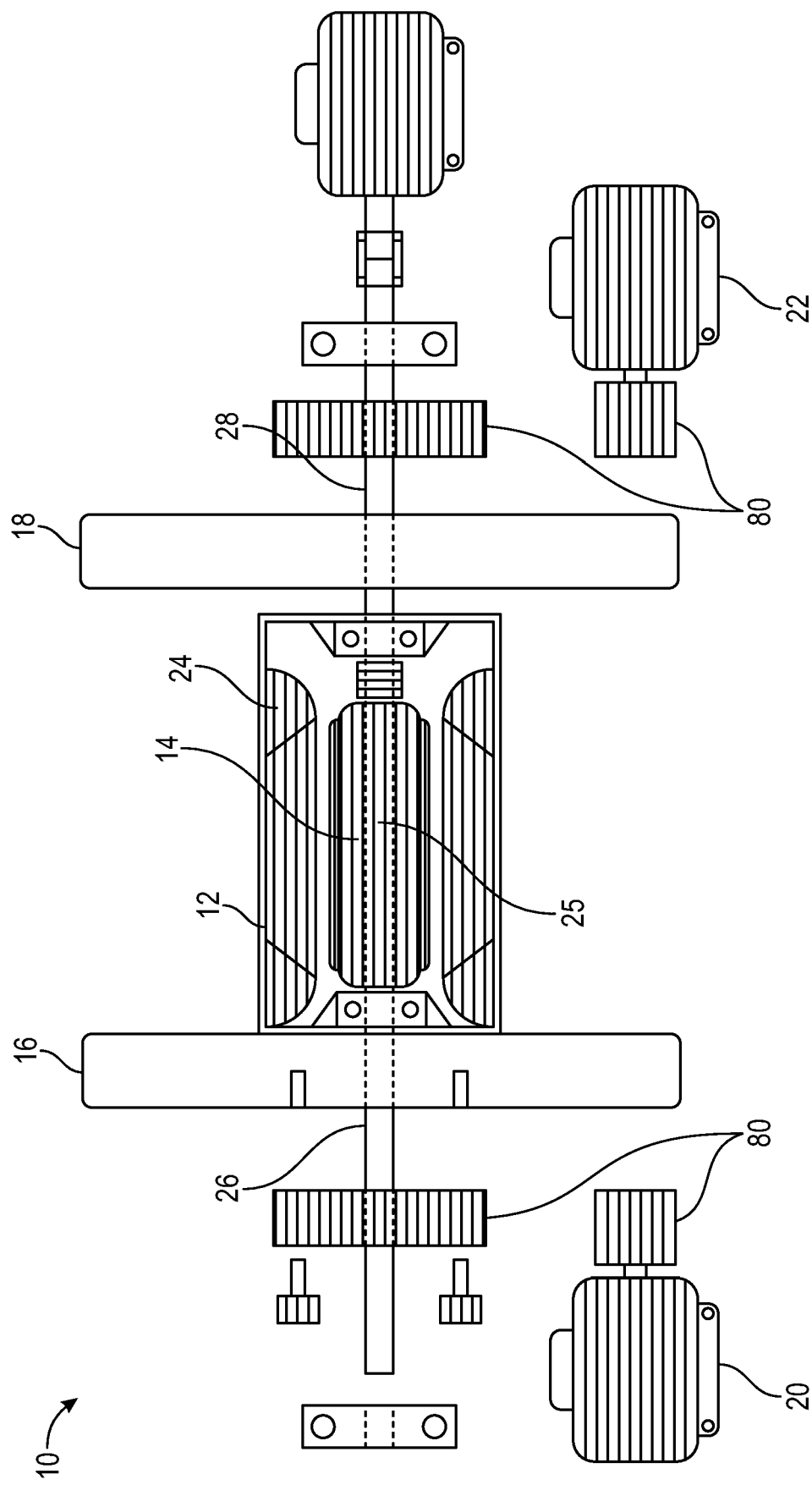
FIG. 8 is a plan view of a generator according to a further example embodiment of the invention shown in partially exploded cross sectional form.
Figure 9:
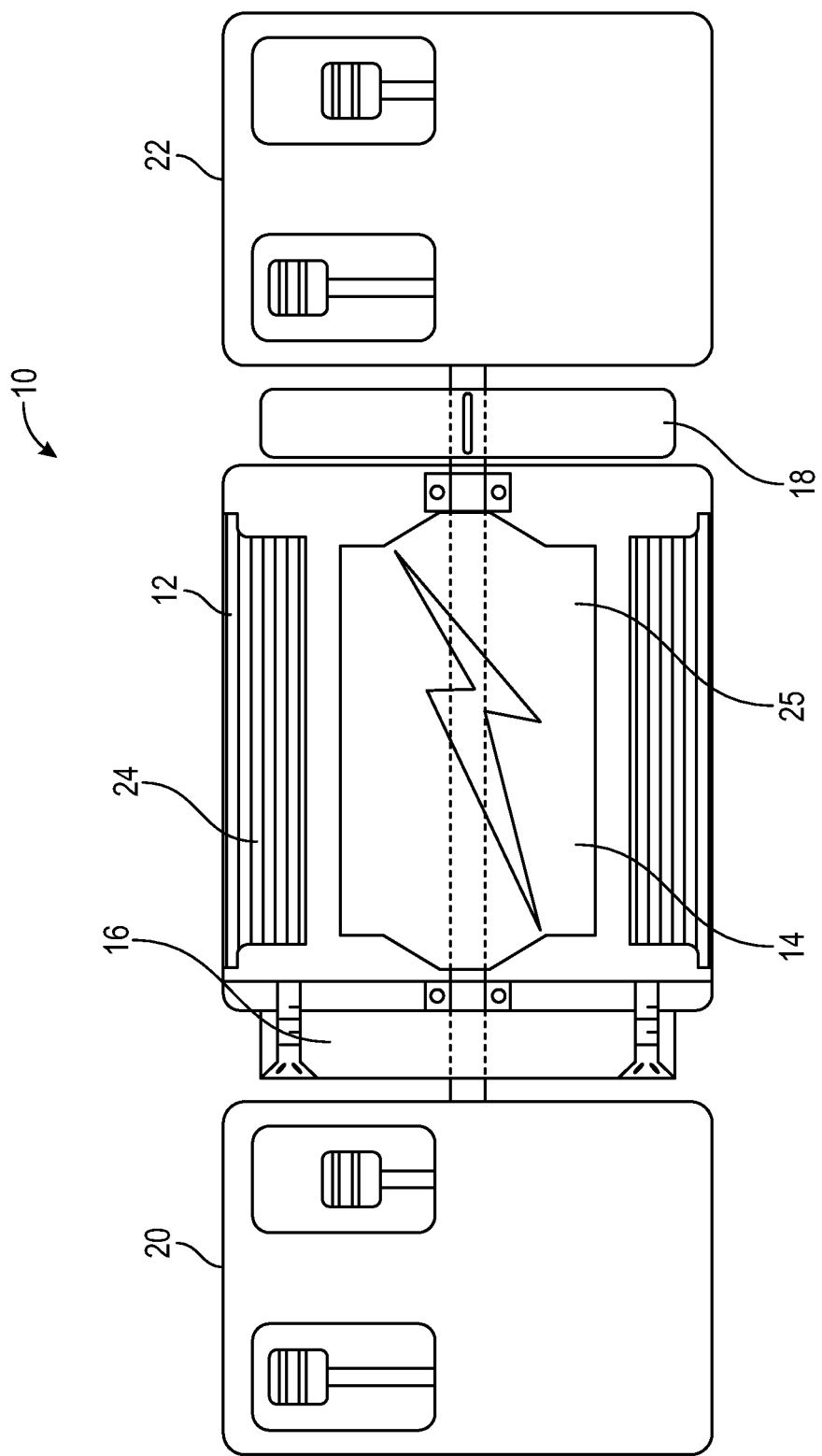
FIG. 9 is a plan view of a generator according to a further example embodiment of the invention shown partially in cross section.
Figure 10:
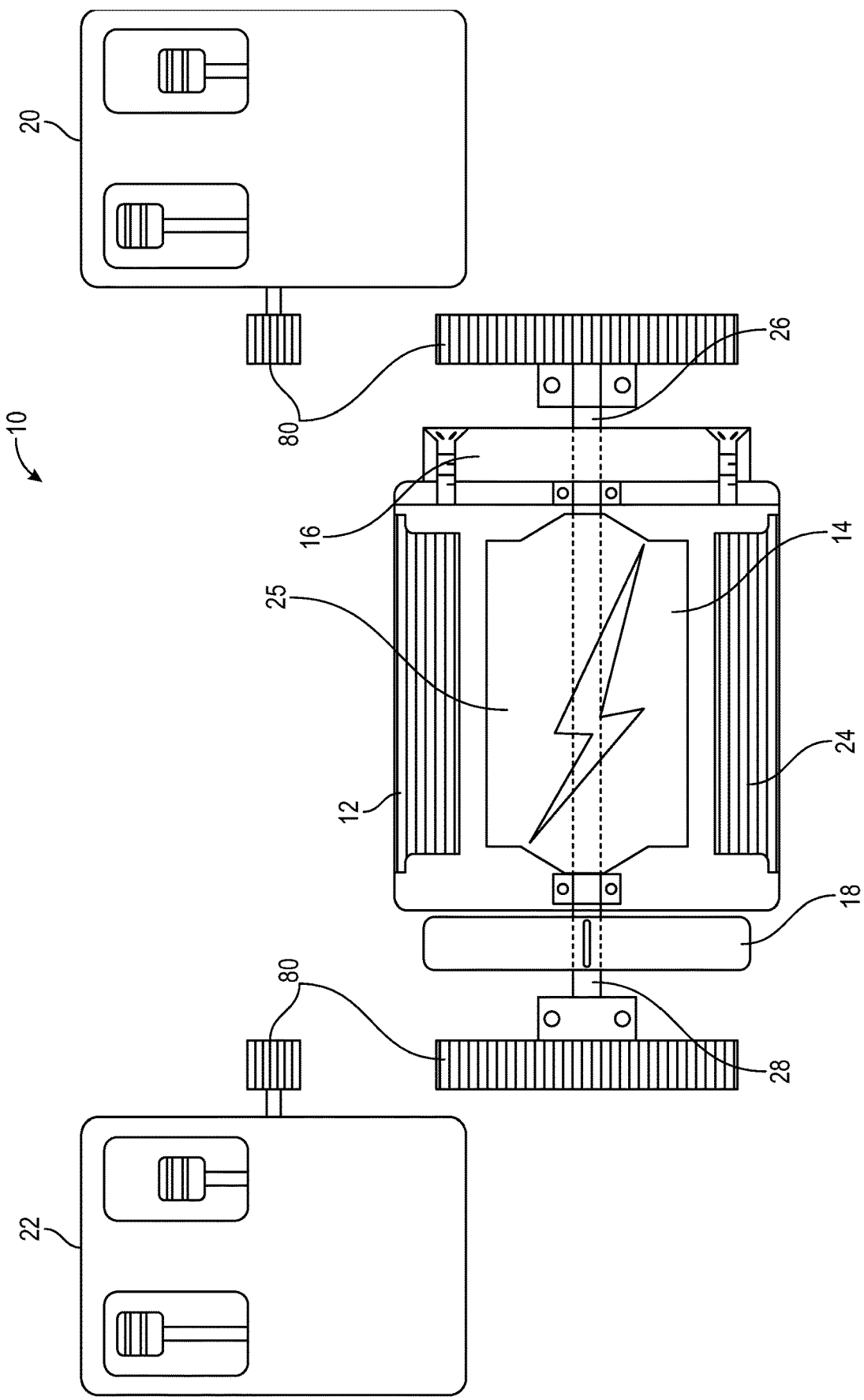
FIG. 10 is a plan view of a generator according to a further example embodiment of the invention shown in partially exploded form.

In other examples, as shown in FIGS. 4 and 8 the flywheel 16 of the outer rotor 12 may be attached to the drive axle 26 of the outer rotor 12 instead of to the outer surface of the cylindrical drum off the rotor 12. As shown in FIGS. 8, 10 and 14-16, the prime movers 20, 22 may be mechanically coupled to the drive axles 26, 28 by gear arrangements 80.

Figure 11:
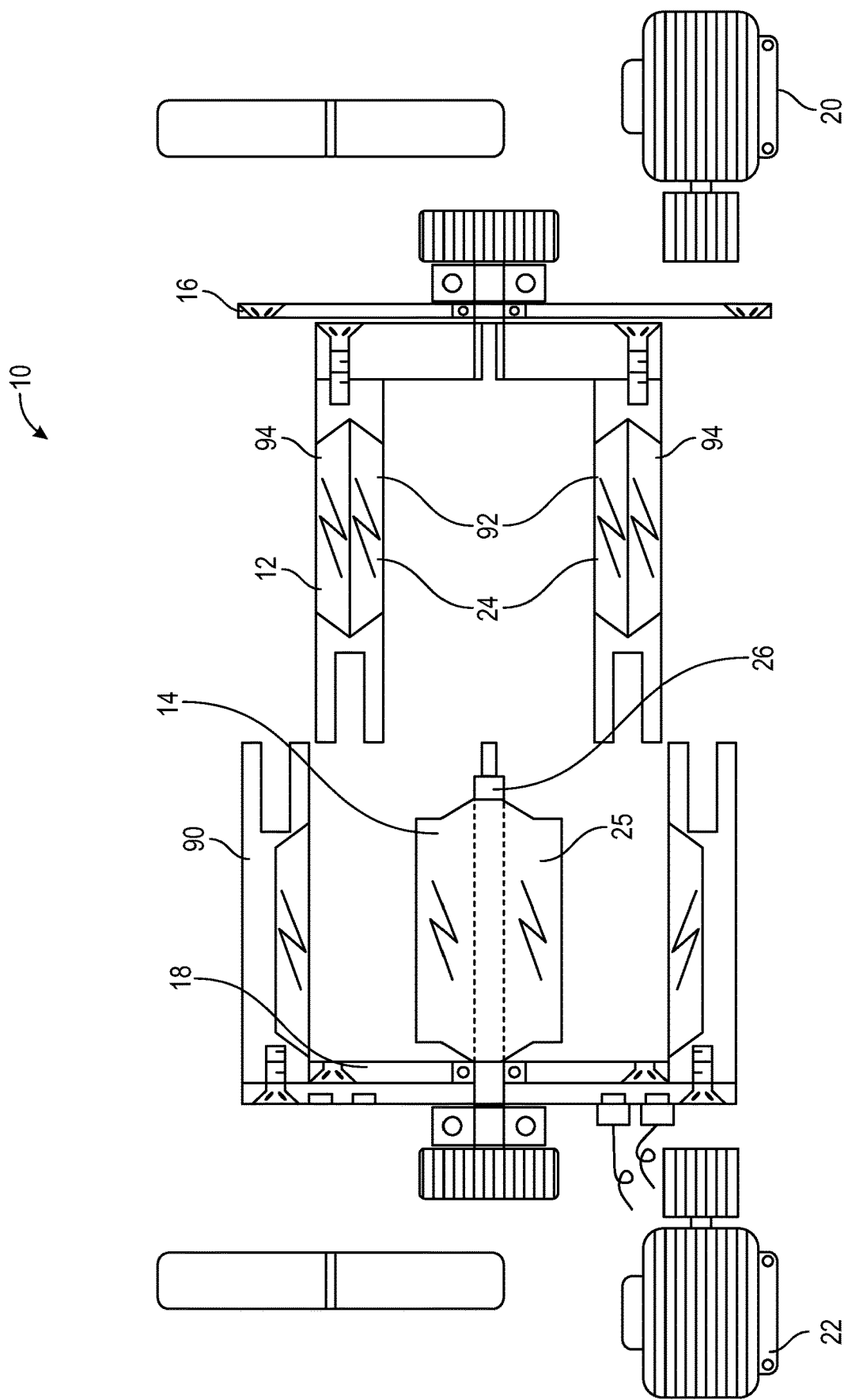
FIG. 11 is a plan view of a generator according to a further example embodiment of the invention shown in partially exploded form.
Figure 12:
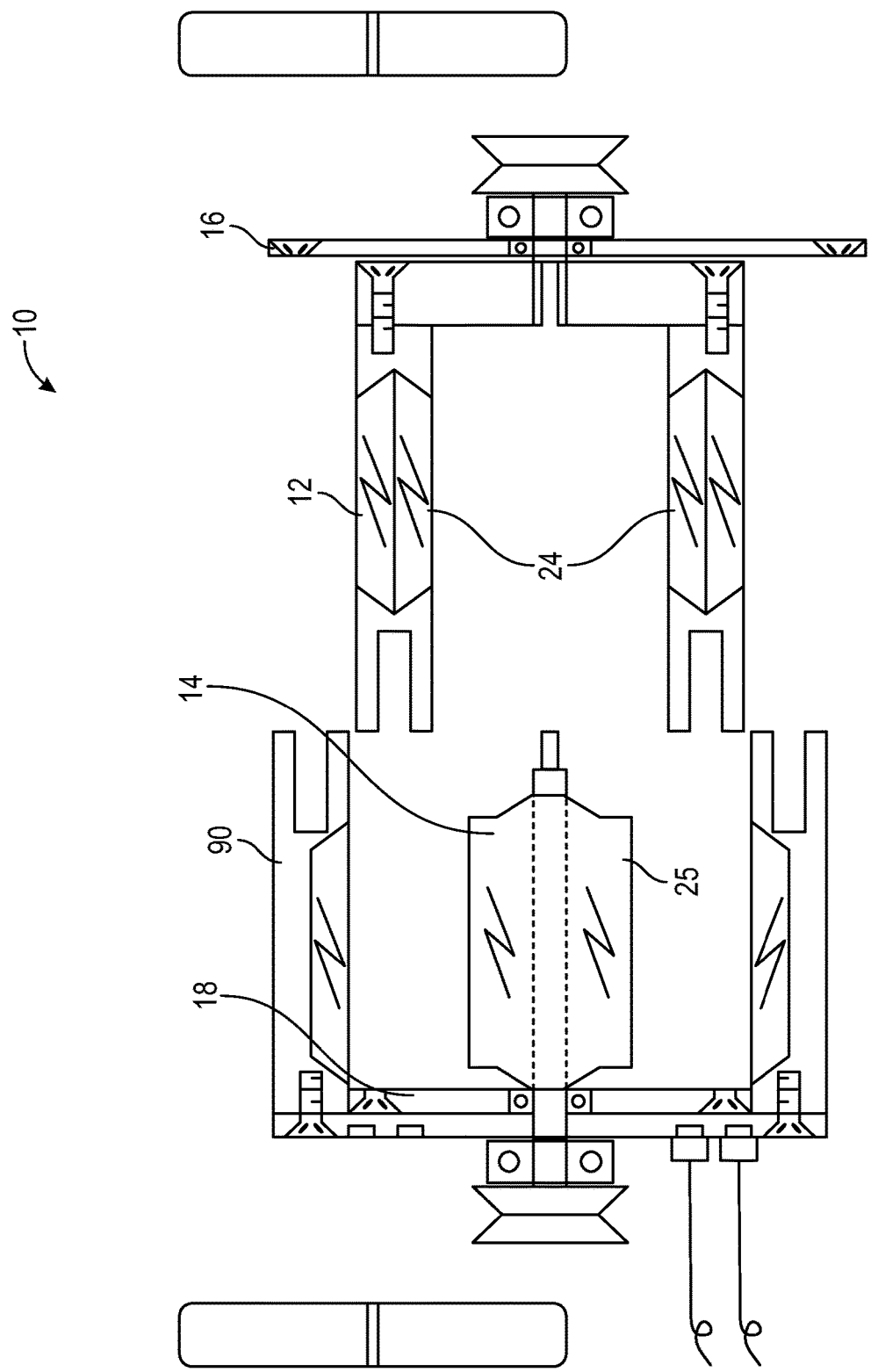
FIG. 12 is a plan view of a generator according to a further example embodiment of the invention shown in partially exploded form.
Figure 13:
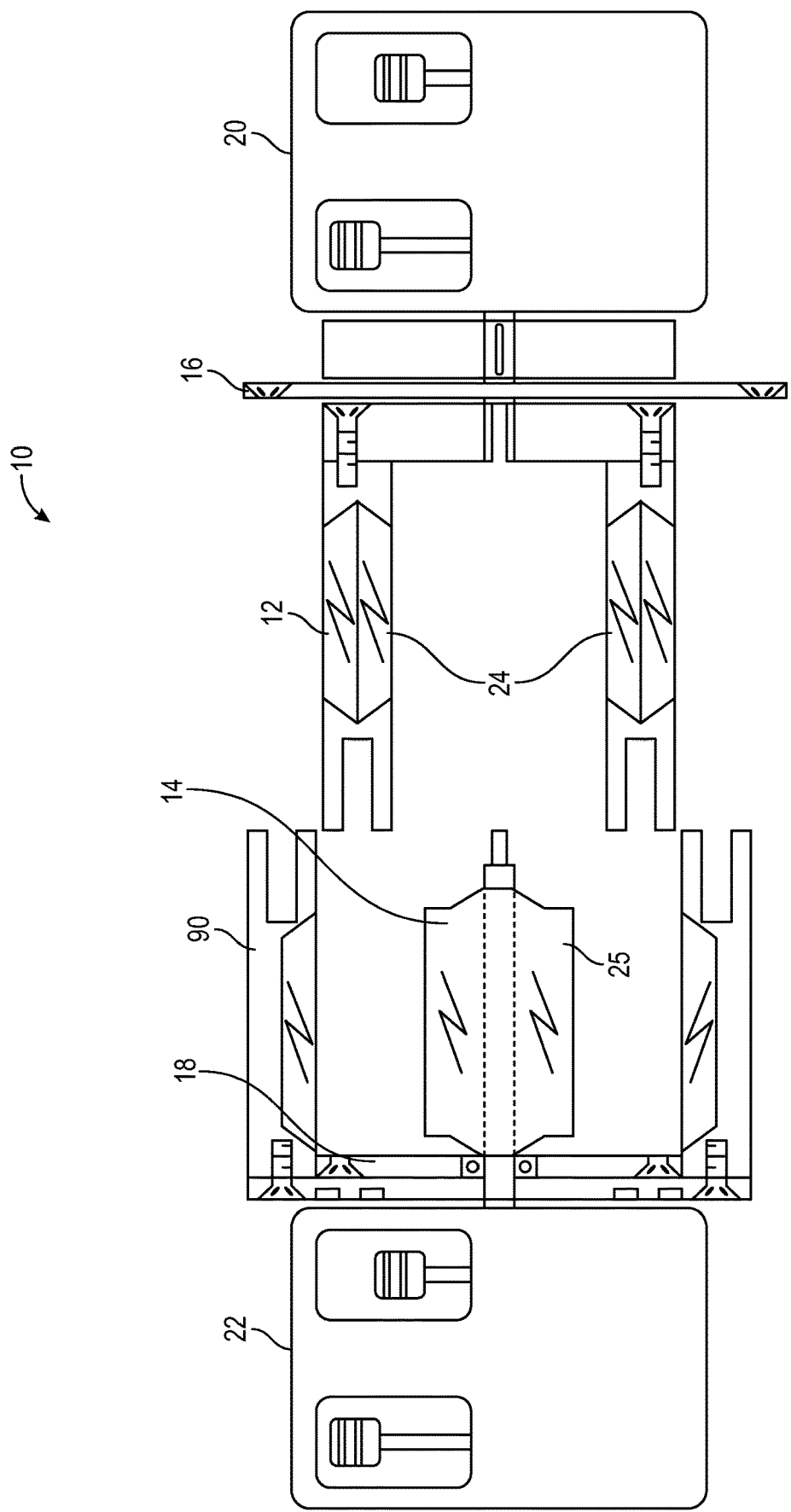
FIG. 13 is a plan view of a generator according to a further example embodiment of the invention shown in partially exploded form.
Figure 14:
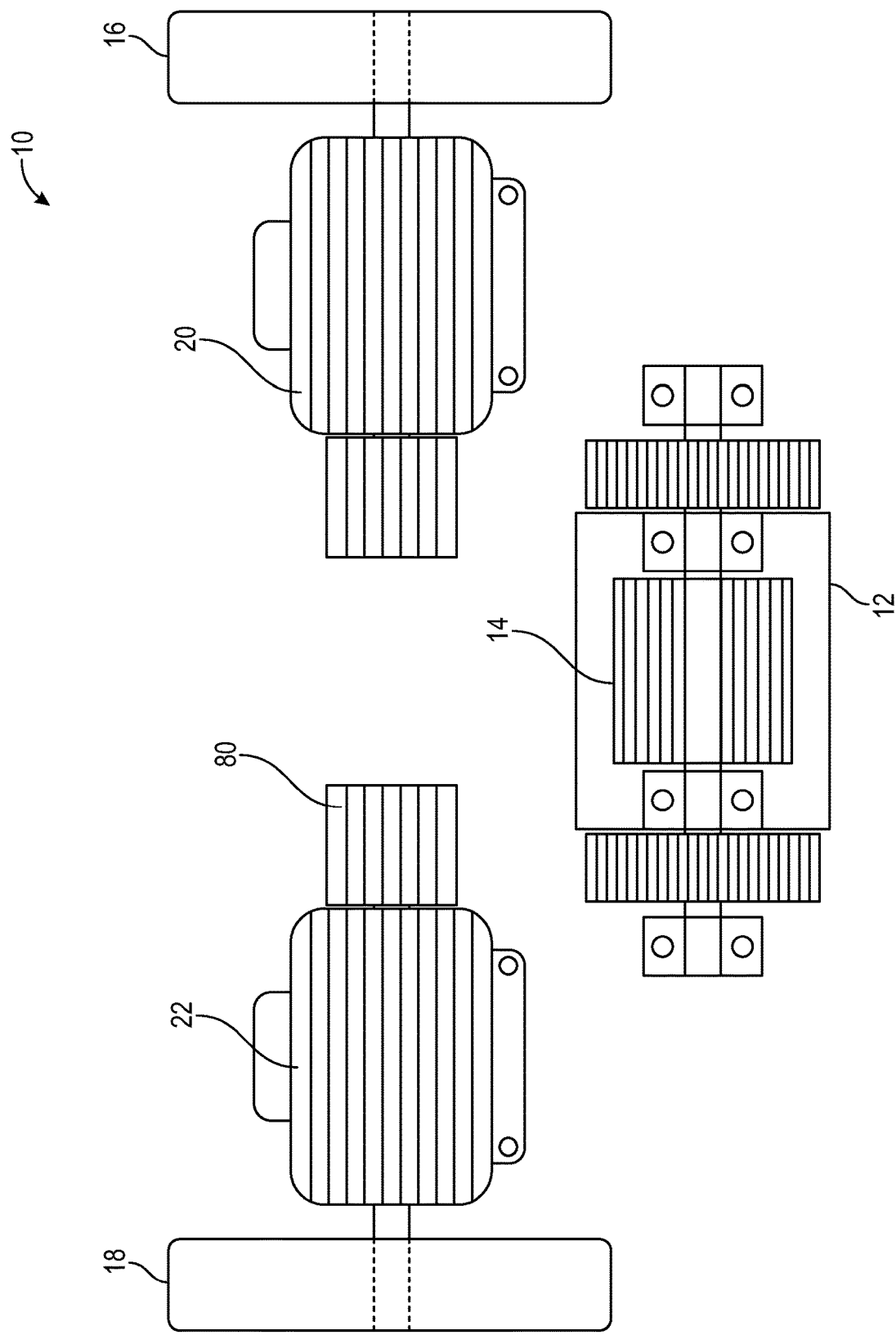
FIG. 14 is a plan view of a generator according to a further example embodiment of the invention shown in partially exploded form.
Figure 15:
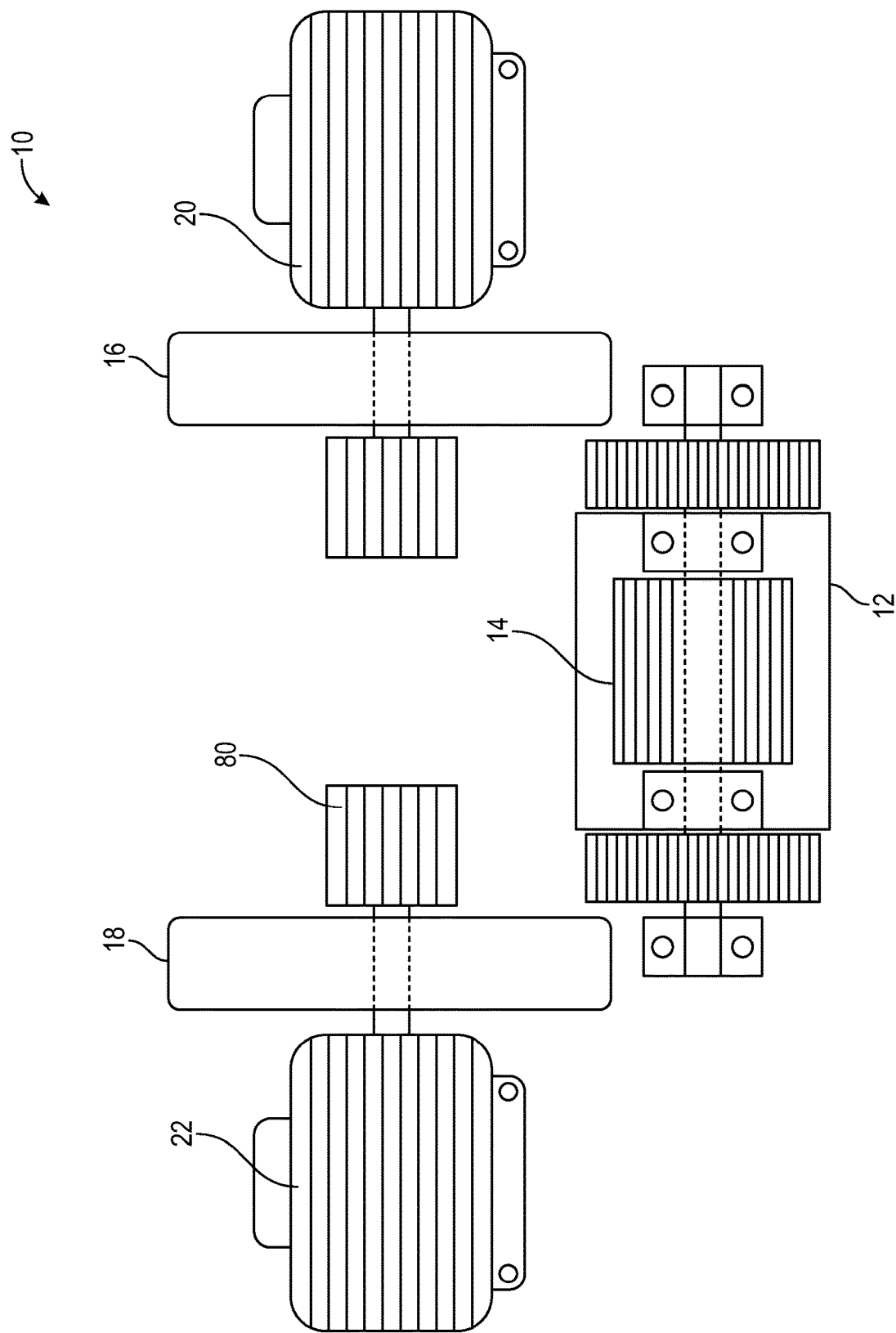
FIG. 15 is a plan view of a generator according to a further example embodiment of the invention shown in partially exploded form.
Figure 16:
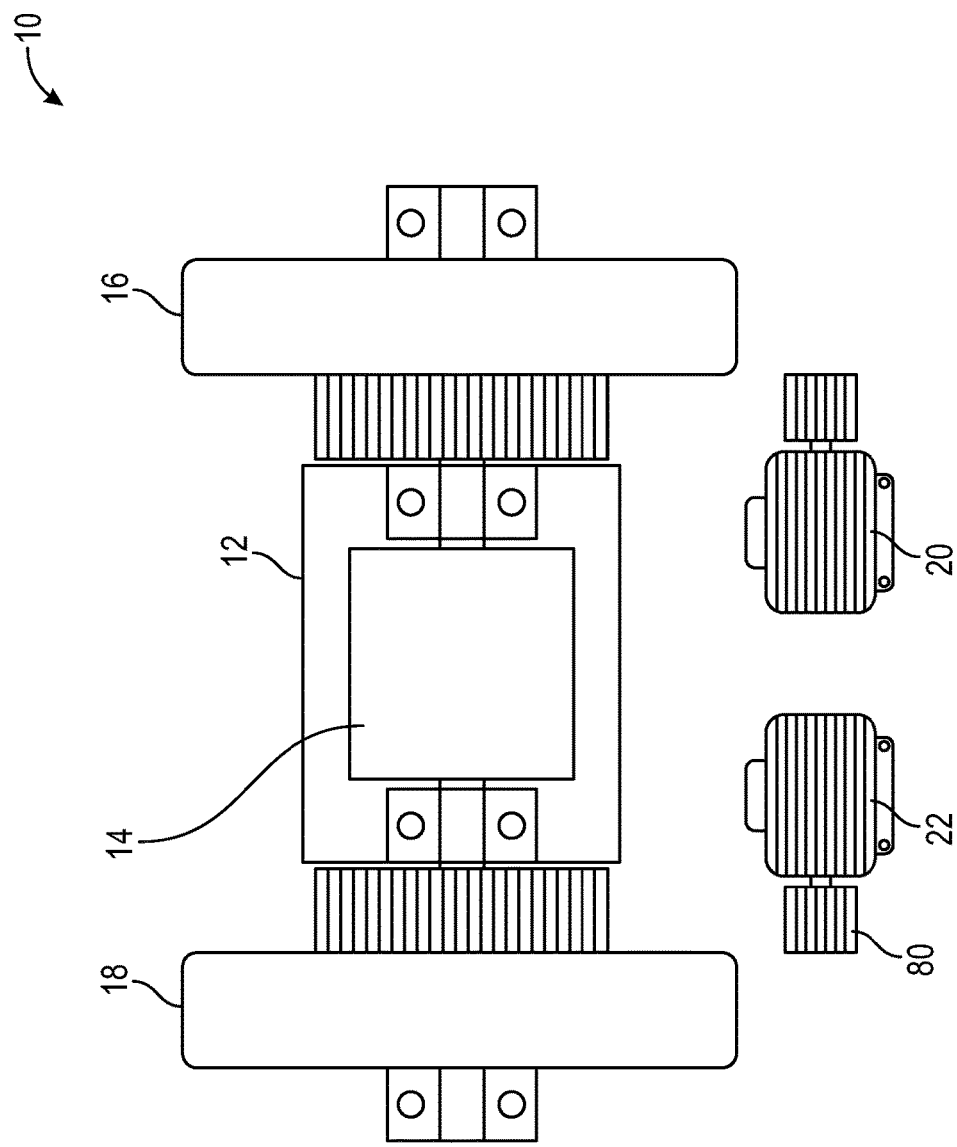
FIG. 16 is a plan view of a generator according to a further example embodiment of the invention shown in partially exploded cross sectional form.

Referring to FIGS. 11 to 13, in other examples the generator 10 may comprise a third rotor 90. The inner rotor 14 and outer rotor 12 may be disposed inside, and coaxially aligned with, the third rotor 90. The third rotor 90 may be mechanically coupled to the drive axle 28 of the inner rotor 14 so that the third rotor 90 is rotated by the drive axle 28 together with the inner rotor 14. In this arrangement, the third rotor 90 and inner rotor 14 both rotate in an opposite relative direction to the outer rotor 12 during use. The third rotor 90 and the outer rotor 12 may combine to form a magnetic field and armature pair for generating electricity, in addition to the inner rotor 14 and outer rotor 12. For example, the outer rotor 12 may be provided with a first set of field coils 92 that are provided on an inner side of the rotor 12 facing the inner rotor 14 and a second set of field coils 94 that are provided on an outer side of the rotor 12 facing the third rotor 90. The inner rotor 14 and the third rotor 90 may each comprise magnets for creating rotating magnetic fields. In use, relative counter rotation between the two sets of magnets and the field coils 92, 94 causes an AC current to be generated in each of the field coils 92, 94.

Figure 18:
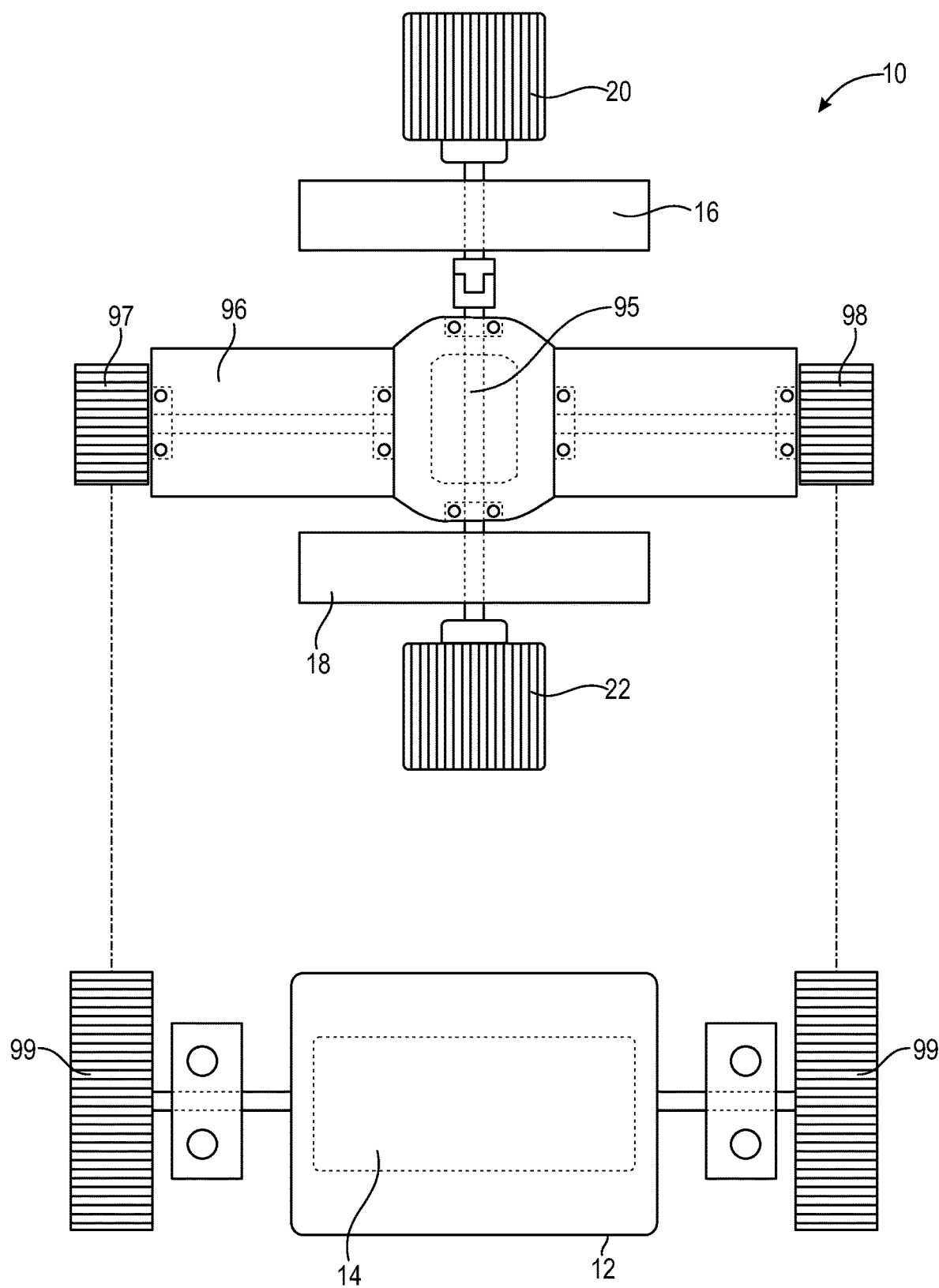
FIG. 18 is a plan view of a generator according to a further example embodiment of the invention shown partially in cross sectional form.

Referring to FIG. 18, in other examples the two prime movers 20, 22 may drive a common drive axle 95 that extends through a gear arrangement 96 that may be included in the generator 10. The gear arrangement 96 may comprise a pair of drive wheels 97, 98 and an internal gear mechanism (not shown) configured such that rotational motion of the axle 95 causes the drive wheels 97, 98 to rotate about their respective axles in opposite directions. For example, the gear mechanism may comprise a bevelled crown gear attached to the axle 95 that drives a pair of bevelled crown gears attached to the axles of the drive wheels 97, 98 respectively. The flywheels 16, 18 may be attached directly to the axle 95 at opposite ends of the axle 95. The drive wheels 97, 98 may drive a pair of drive belts (not shown) that turn a pair of counter-rotating pulley wheels 99 that rotate the inner rotor 14 and outer rotor 12 in opposite directions.

Figure 19:
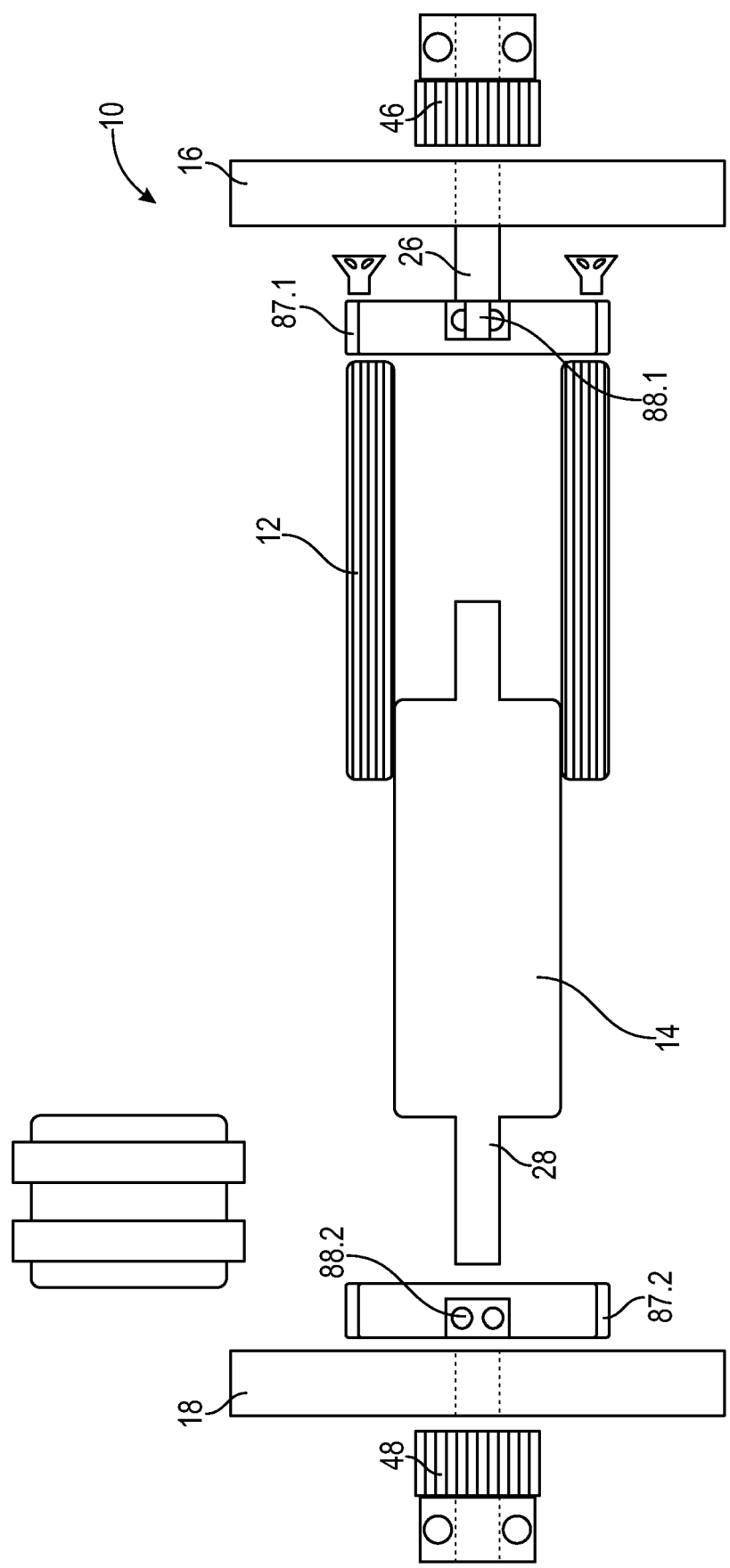
FIG. 19 is a plan view of a generator according to a further example embodiment of the invention shown in partially exploded cross sectional form.
Figure 20:
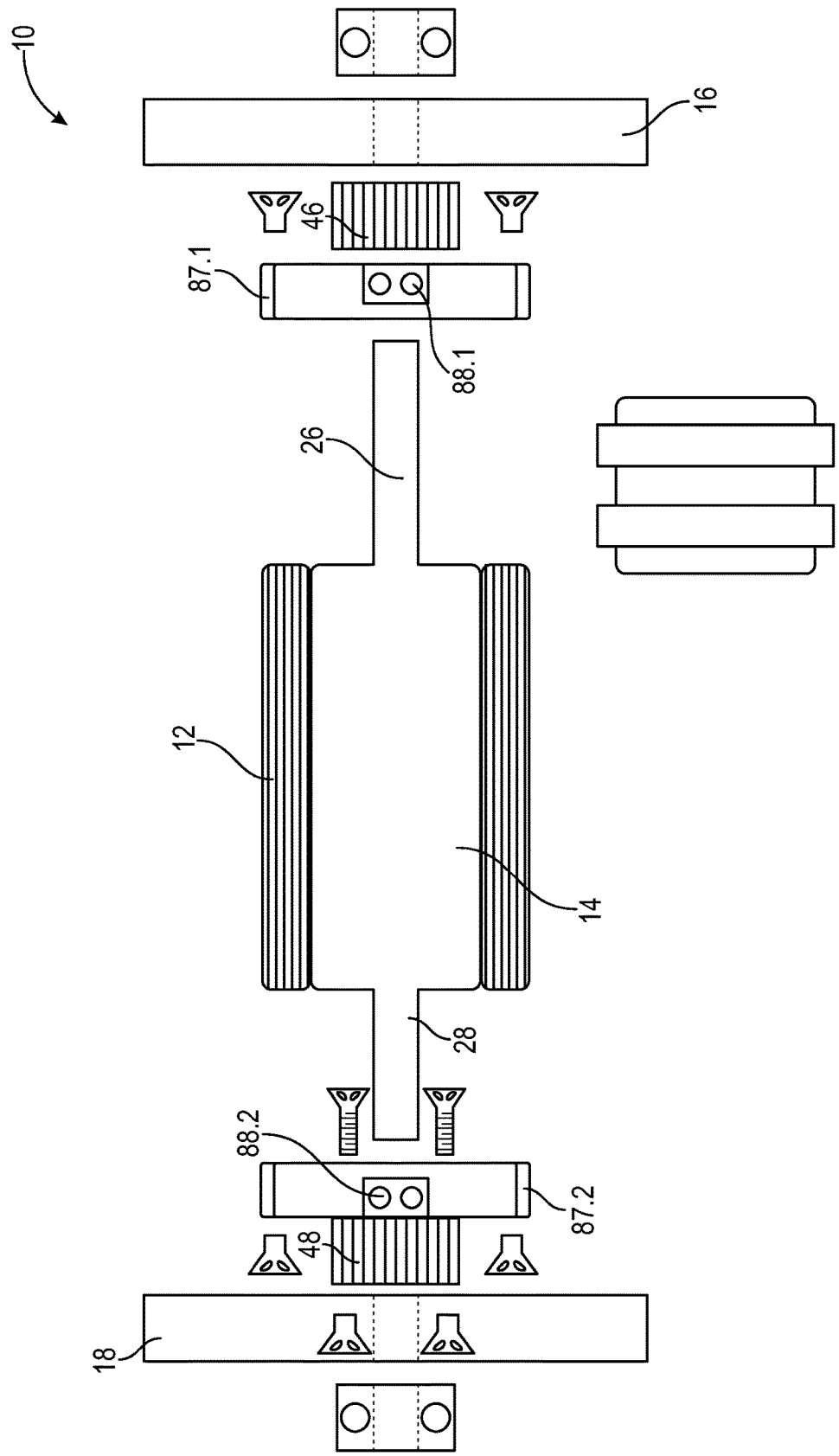
FIG. 20 is a plan view of a generator according to a further example embodiment of the invention shown in partially exploded cross sectional form.

FIGS. 19 and 20 each provide a further example of the generator 10 and illustrate how a pair of flywheels 16, 18, rotors 12, 14, rotor drive axles 26, 28 and pulley wheels 46, 48 of the generator 10 may be interconnected. The pulley wheels 46, 48 in each example may be driven by drive belts that are connected to a pair of prime movers (not shown). Each generator 10 may include a pair of mounting plates 87. The first mounting plate 87.1 is used to attach the first rotor drive axle 26 to the outer rotor 12 of the generator 10. The mounting plates may include brackets 88 that comprise bearings to rotatably receive the rotor drive axles 26, 28. The brackets 88 allow the two drive axles 26, 28, and their respective rotors 12, 14 and flywheels 16, 18, to rotate in opposite directions.

Figure 21:
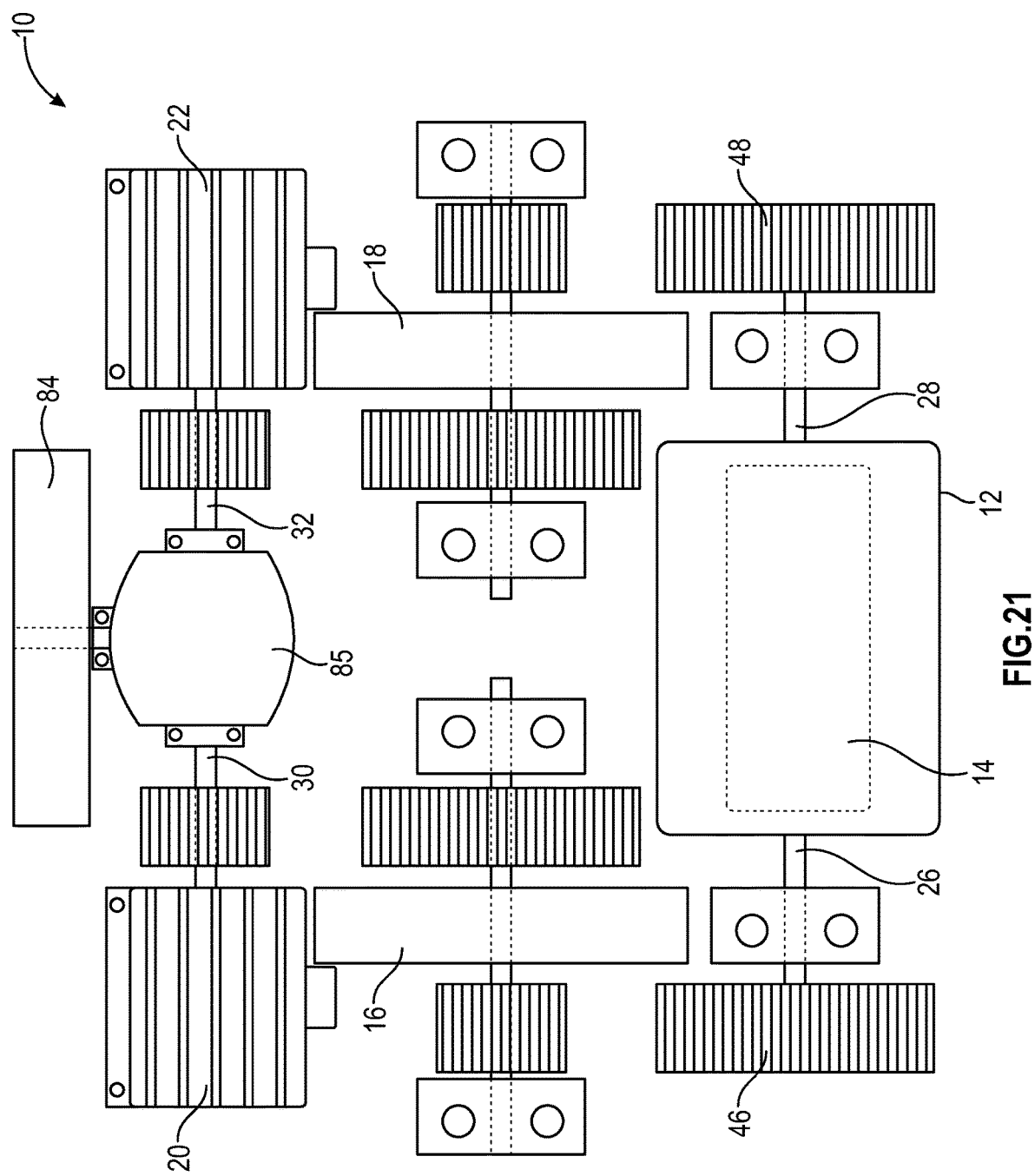
FIG. 21 is an exploded plan view of a generator according to a further example embodiment of the invention.
Figure 22:
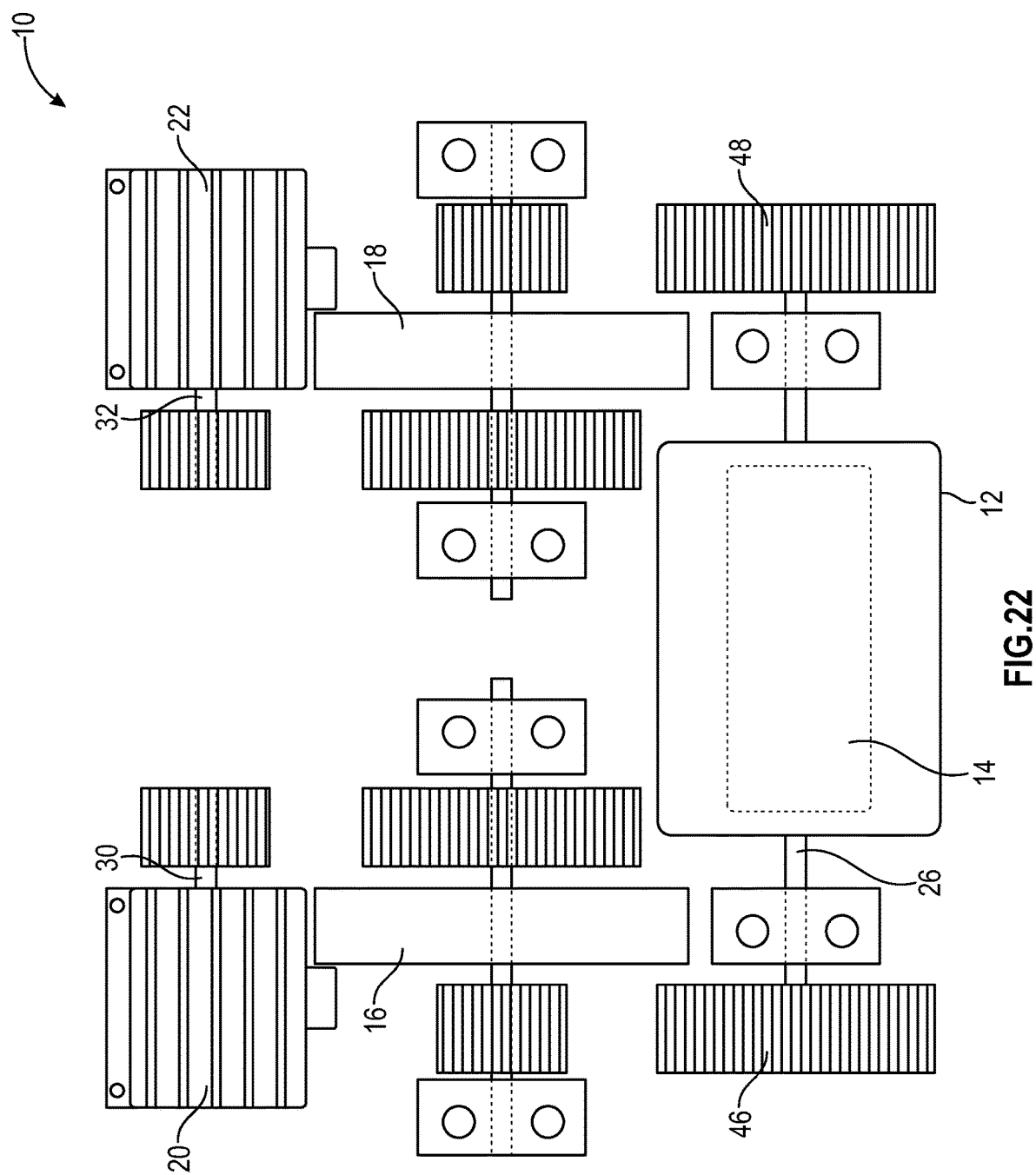
FIG. 22 is an exploded plan view of a generator according to a further example embodiment of the invention.

FIG. 21 provides a further example of the generator 10. The generator 10 comprises two prime movers 20, 22 that drive a pair of flywheels 16, 18. The flywheels 16, 18 are interposed between the prime movers 20, 22 and the rotors 12, 14 of the generator 10. A first pair of drive belts (not shown) may be driven by the prime movers 20, 22 and used to rotate the two flywheels 16, 18 in opposite rotational directions. In turn, a second pair of drive belts (not shown) may be connected between the axles of the flywheels 16, 18 and the pulley wheels 46, 48 of the rotors 12, 14 to rotate the rotors 12, 14 in opposite rotational directions. The generator 10 also includes a third flywheel 84 that is driven by a gear arrangement 85. The gear arrangement is driven by the drive axles 30, 32 of the prime movers 20, 22 and rotates the flywheel 84 in a single rotational direction. FIG. 22 provides a further example of the generator 10 that is materially the same as the example depicted in FIG. 21 except that it does not include the third flywheel 84 and gear arrangement 85.

Figure 23:
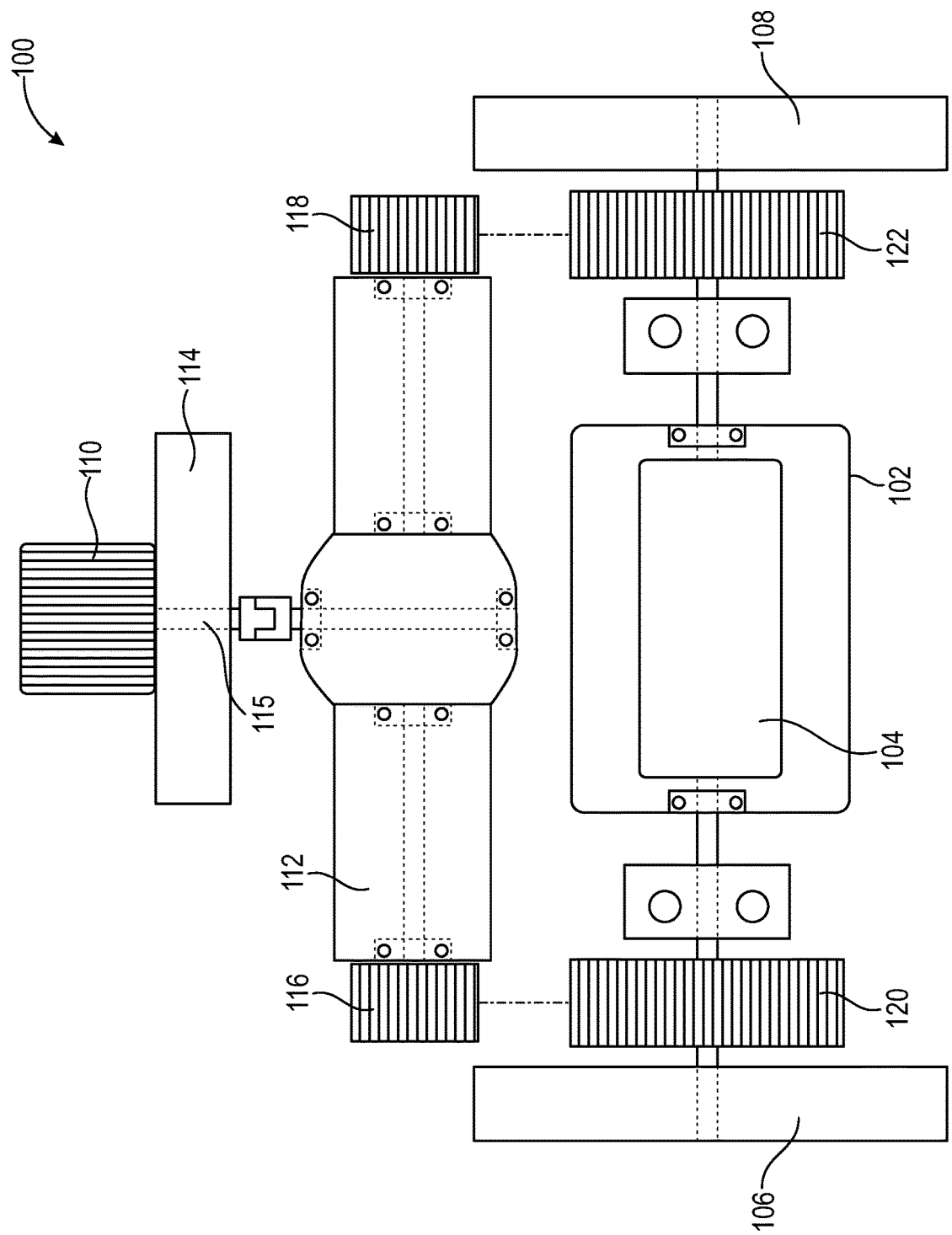
FIG. 23 is a plan view of a generator according to a further example embodiment of the invention shown in partially exploded cross sectional form.

Referring to FIG. 23, there is disclosed a generator 100 that comprises first and second rotors 102, 104 that are coaxially aligned and comprise an outer rotor 102 and an inner rotor 104, wherein the inner rotor 104 is disposed within the outer rotor 102. The rotors 102, 104 combine to form a magnetic field and armature pair for generating electricity. The generator 100 also comprises first and second counter rotating flywheels 106, 108 axially connected to the first and second rotors 102, 104 to rotate with the first and second rotors 102, 104 respectively. The generator 100 also comprises a prime mover 110 that is provided with a gear arrangement 112. The gear arrangement 112 is driven by the prime mover 110 and is operatively configured to rotate the rotors 102, 104 in opposite relative directions such that electricity is produced from relative rotation of the magnetic field and armature.

The generator 100 may also comprise a third flywheel 114 that is attached to a drive axle 115 of the prime mover 110 that drives the gear arrangement 112. The gear arrangement 112 may comprise a first drive wheel 116 and a second drive wheel 118 that are turned in opposite rotational directions by an internal gear mechanism (not shown) within the gear arrangement 112 that is driven by the axle 115. The two counter rotating drive wheels 116, 118 may drive a pair of respective drive belts (not shown) that turn a pair of pulley wheels 120, 122 that rotate the first and second rotors 102, 104 in opposite rotational directions. The internal gear mechanism may comprise a bevelled crown gear attached to the axle 115 that drives a pair of bevelled crown gears attached to a pair of axles of the two drive wheels 116, 118 respectively.

Figure 24:
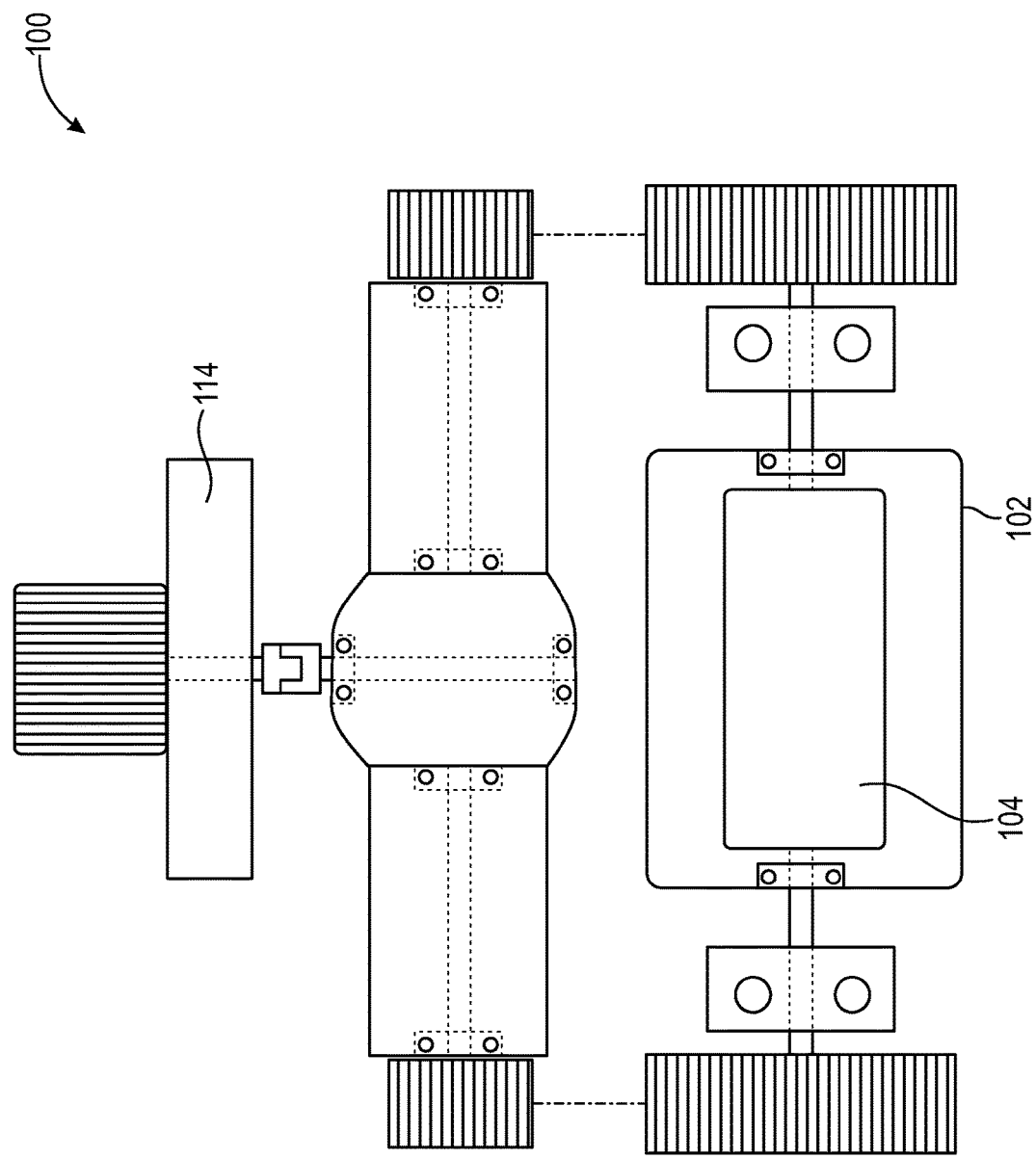
FIG. 24 is a plan view of a generator according to a further example embodiment of the invention shown in partially exploded cross sectional form.

FIG. 24 depicts an example where the generator 100 is used for large scale power generation. The two rotors 102, 104 are sufficiently large and heavy such that they effectively operate as the counter rotating flywheels of the generator 100. The separately attached flywheels 106, 108 are, therefore, dispensed with in the example.

Figure 25:
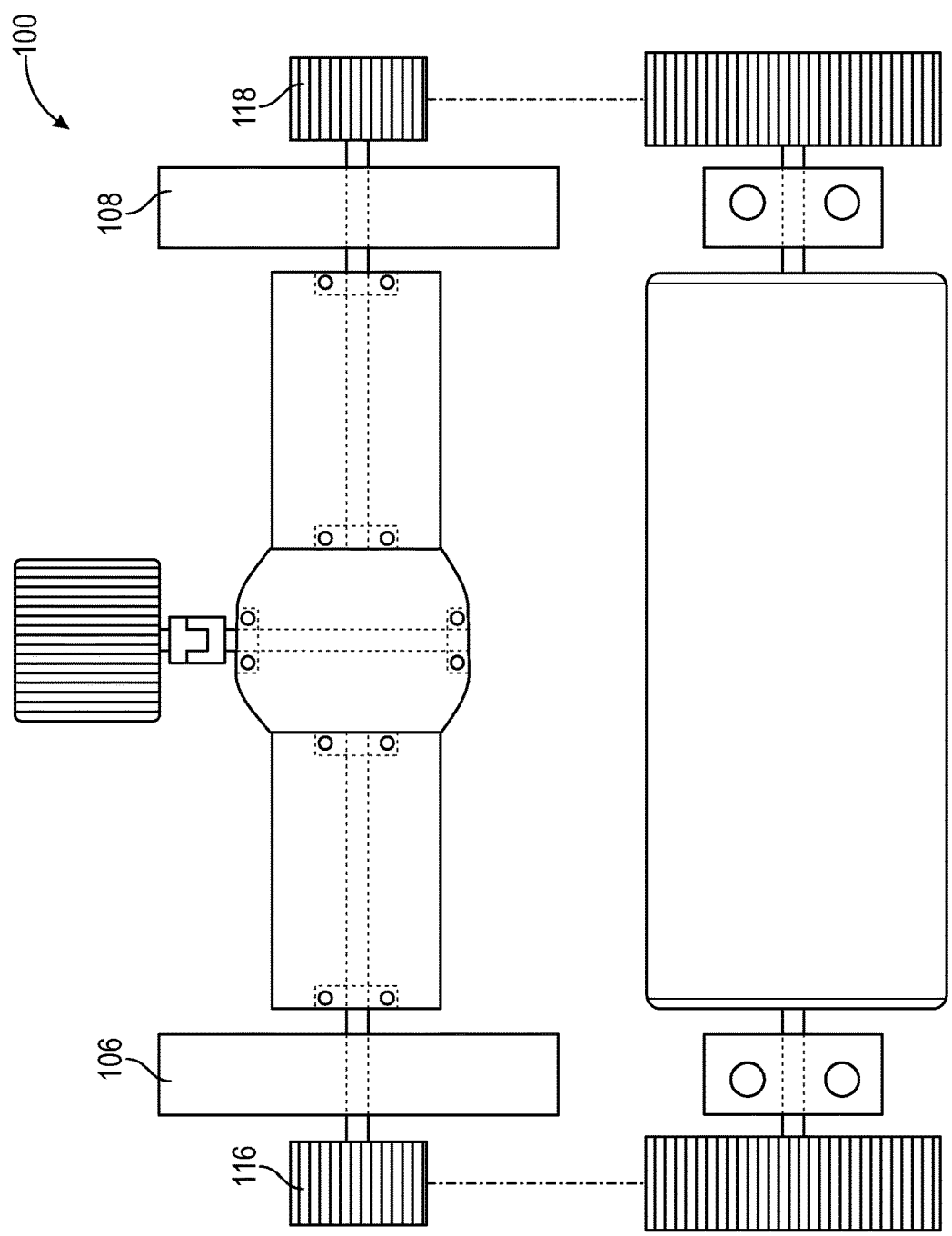
FIG. 25 is a plan view of a generator according to a further example embodiment of the invention shown in partially exploded cross sectional form.

FIG. 25 depicts a further example of the generator 100. The generator 100 is materially the same as the example shown in FIG. 23 except that the counter-rotating flywheels 106, 108 are attached to the axles of the two drive wheels 116, 118, instead of being attached to the rotors 102, 104. The third flywheel 114 is also dispensed with. The flywheels 106, 108 are inwardly positioned relative to the drive wheels 116, 118.

Figure 26:
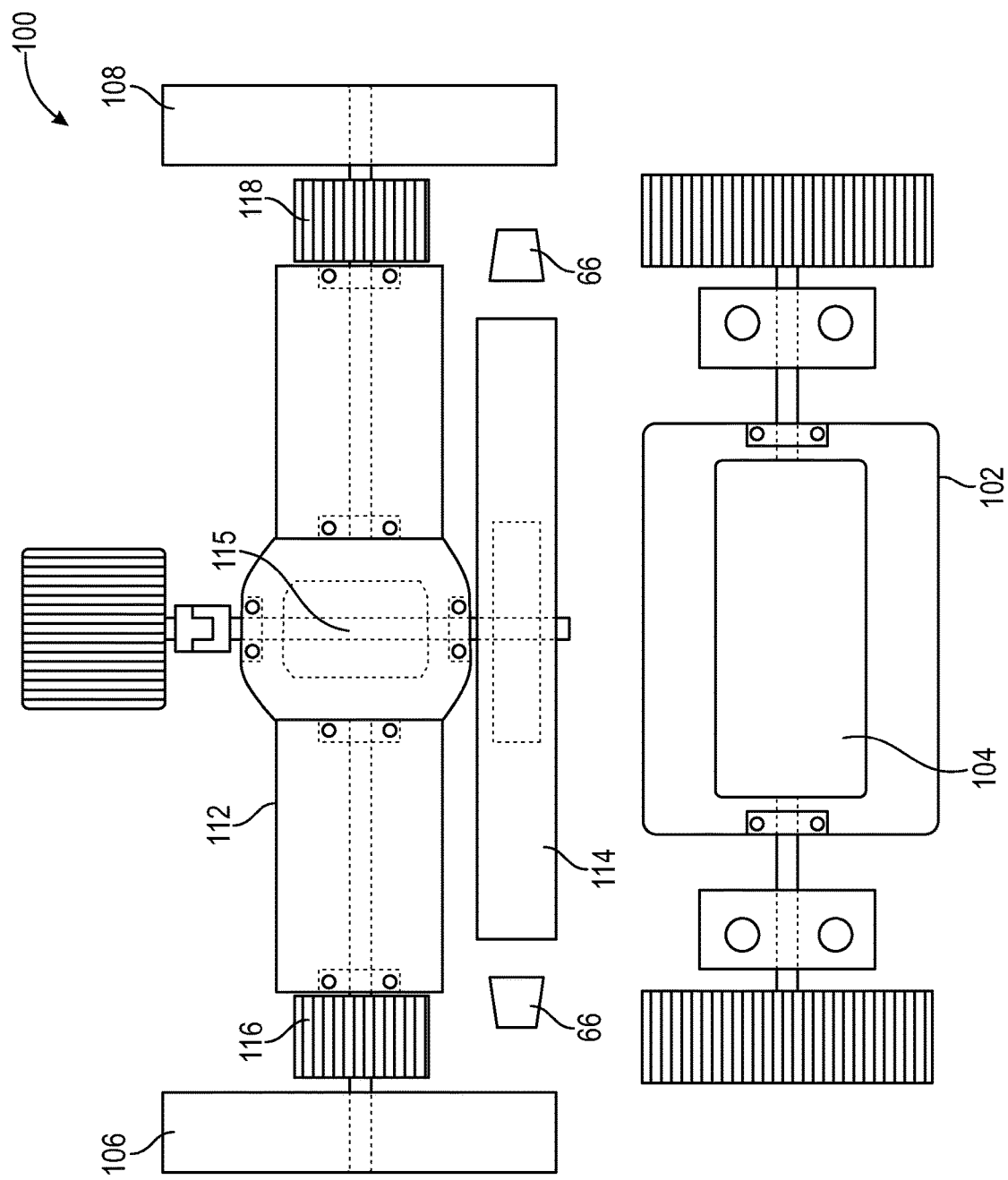
FIG. 26 is a plan view of a generator according to a further example embodiment of the invention shown in partially exploded cross sectional form.

FIG. 26 depicts a further example of the generator 100. The generator 100 is materially the same as the example shown in FIG. 25 except that the counter-rotating flywheels 106, 108 are outwardly positioned relative to drive wheels 116, 118. A third flywheel 114 is also attached to the drive axle 115. Two lateral magnetic supports 66 are also shown either side of the third flywheel 114.

Figure 27:
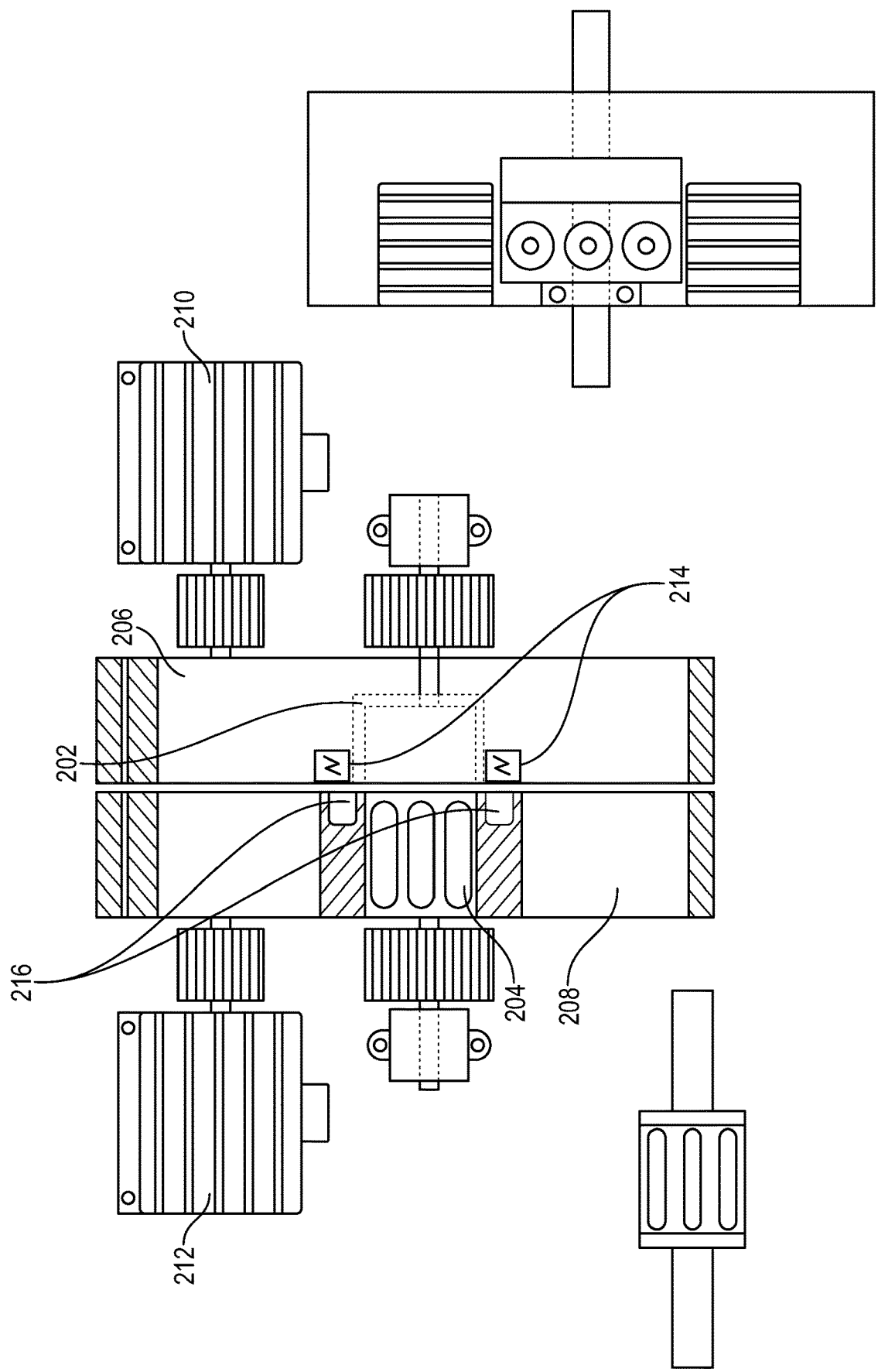
FIG. 27 is a plan view of a generator according to a further example embodiment of the invention shown in partially exploded cross sectional form.
Figure 28:
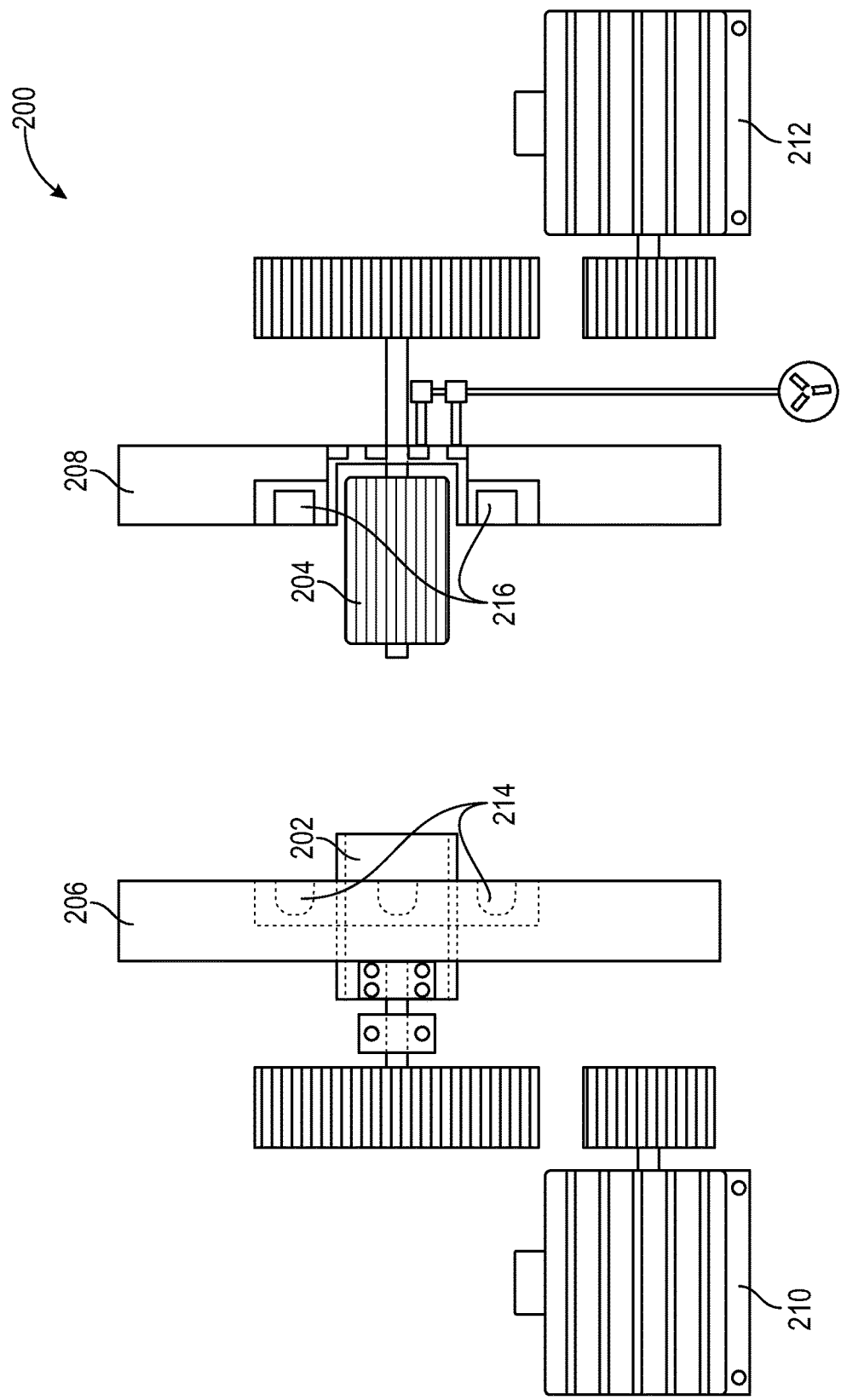
FIG. 28 is a plan view of a generator according to a further example embodiment of the invention shown in partially exploded cross sectional form.
Figure 29:
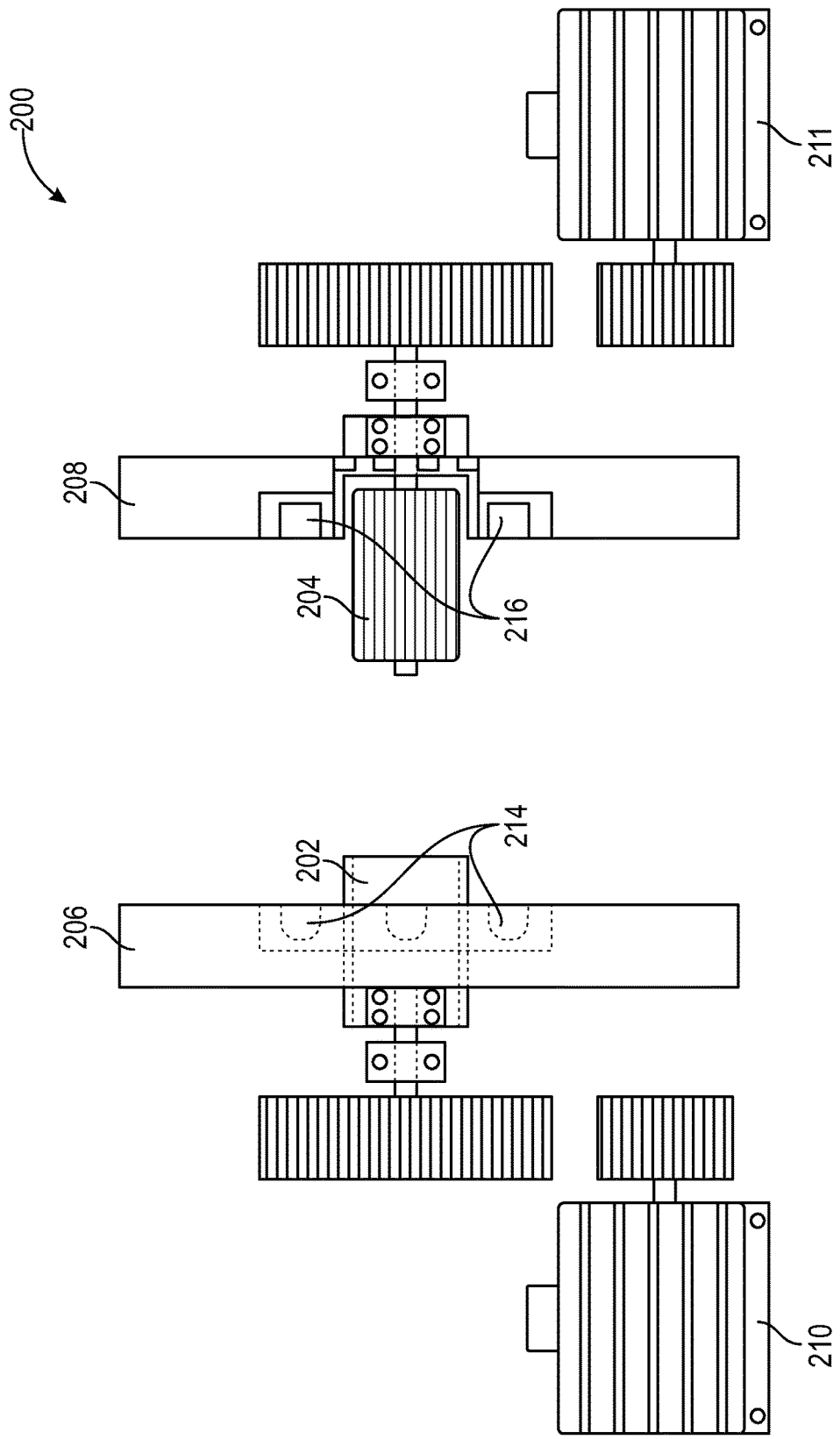
FIG. 29 is a further plan view of the generator of FIG. 28.
Figure 31:
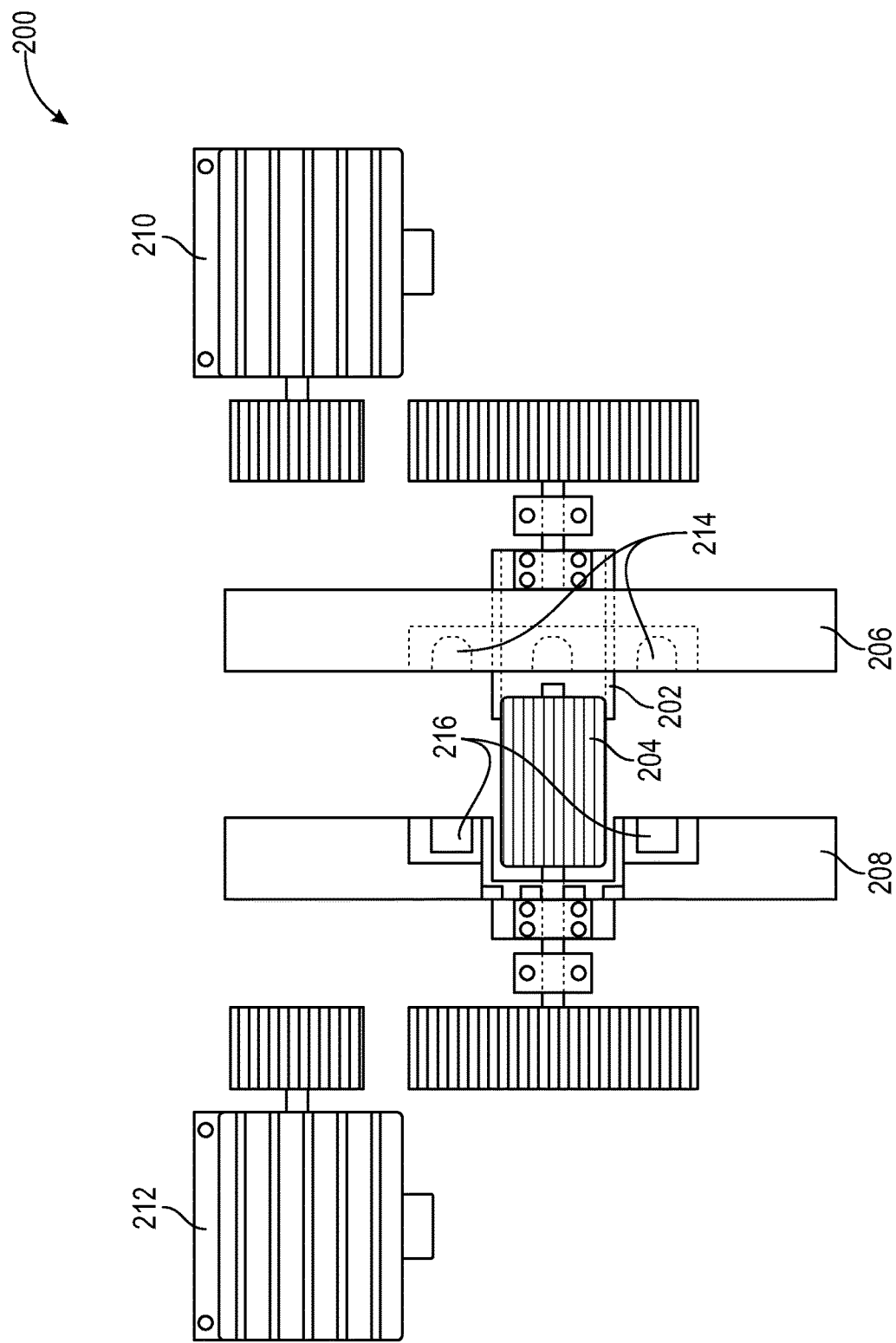
FIG. 31 is a plan view of a generator according to a further example embodiment of the invention shown in partially exploded cross sectional form.
Figure 32:
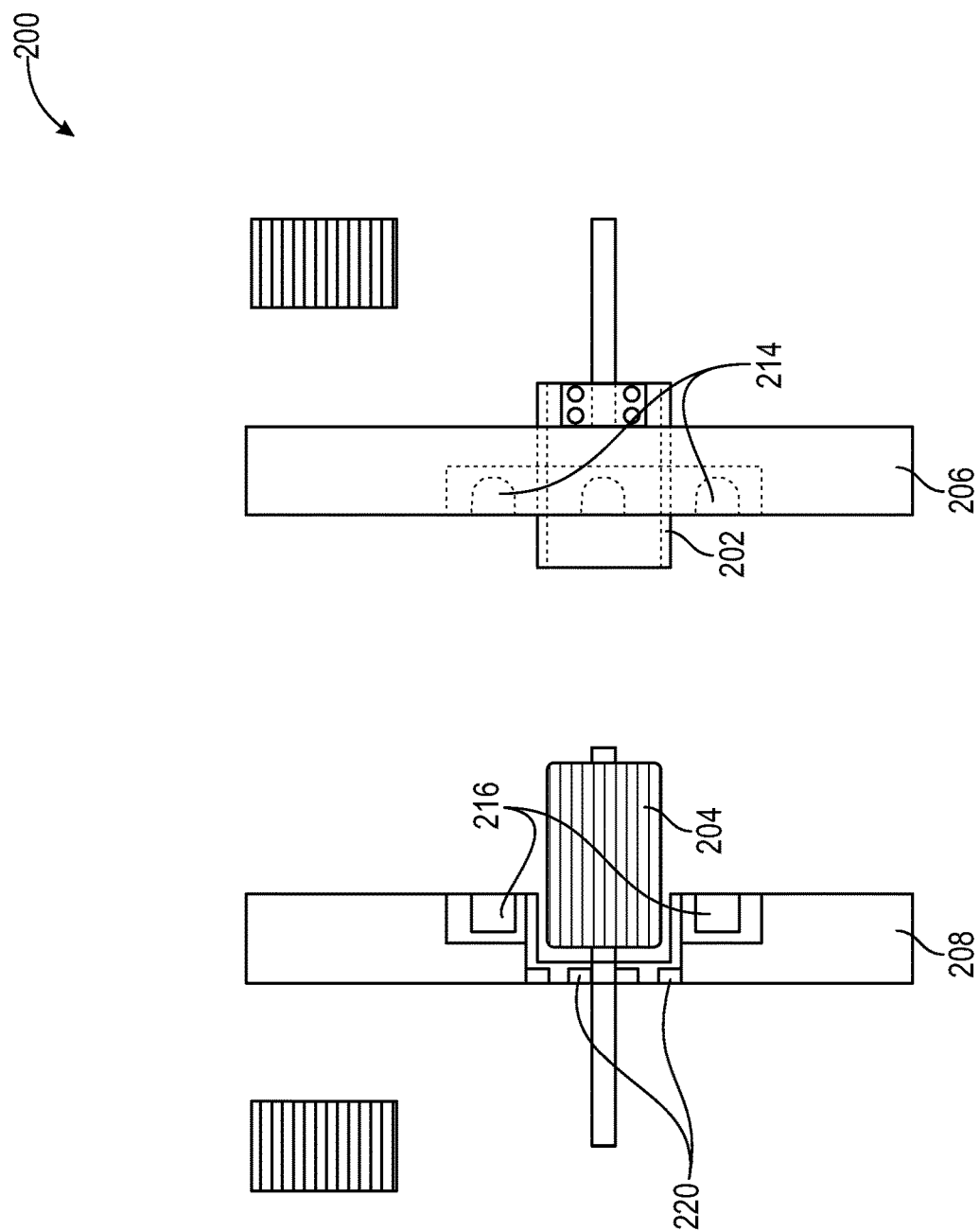
FIG. 32 is a plan view of a pair of flywheels of the generator of FIG. 31.
Figure 33:
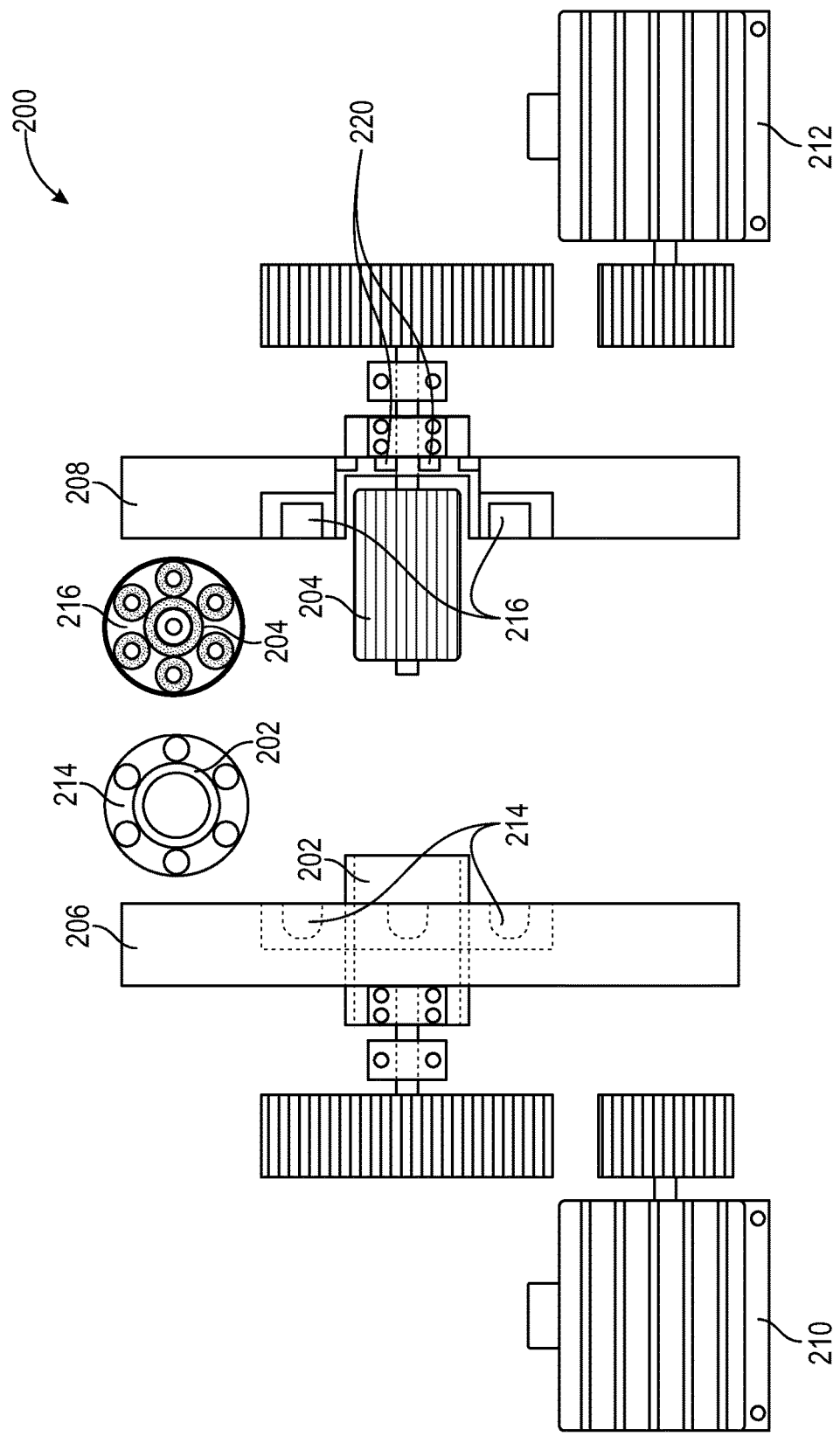
FIG. 33 is a plan view of a generator according to a further example embodiment of the invention shown in partially exploded cross sectional form.
Figure 34:
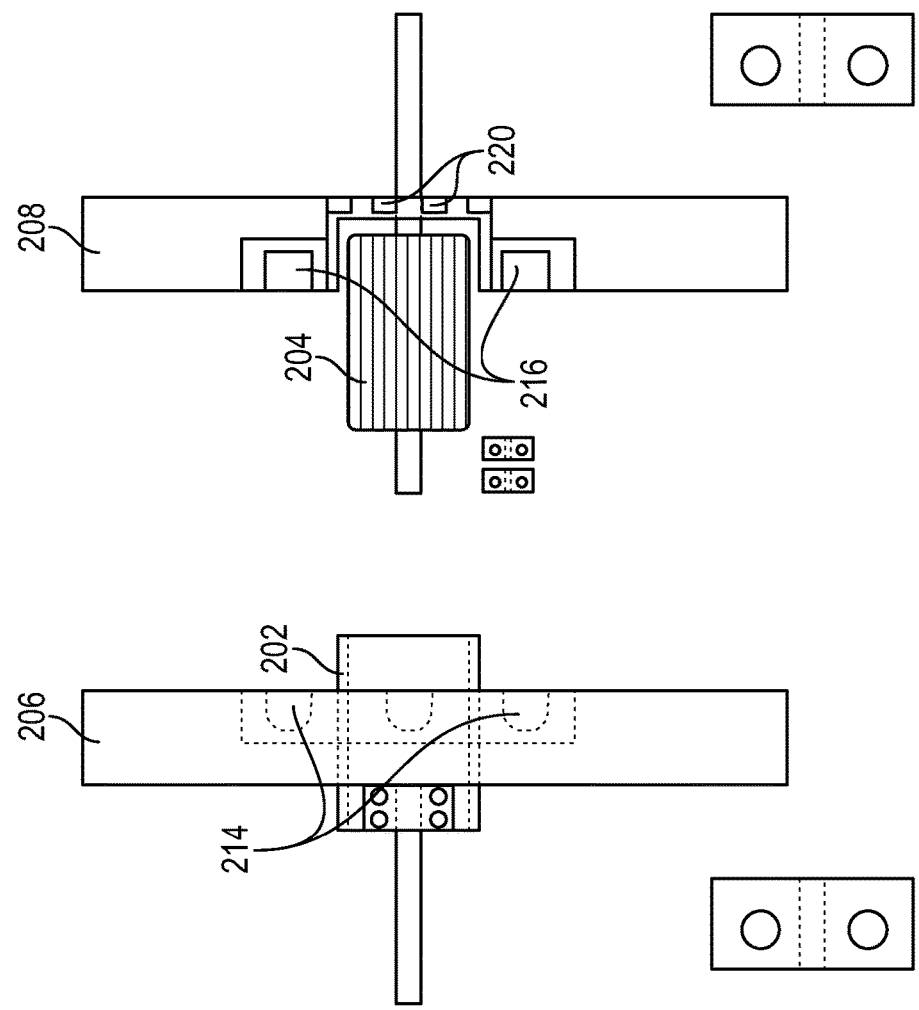
FIG. 34 is a plan view of a pair of flywheels of the generator of FIG. 33.

Referring to FIG. 27, there is disclosed a generator 200 that has first and second rotors 202, 204 that are coaxially aligned and comprise an outer rotor 202 and an inner rotor 204, wherein the inner rotor 204 is disposed within the outer rotor 202. The rotors 202, 204 combine to form a magnetic field and armature pair for generating electricity. The generator 200 also comprises first and second counter rotating flywheels 206, 208 axially connected to the first and second rotors 202, 204 to rotate with the first and second rotors 202, 204 respectively. The generator 200 also comprises first and second prime movers 210, 212 that are independently connected via drive belts (not shown) to the first and second rotors 202, 204 respectively to rotate the rotors 202, 204 in opposite relative directions such that electricity is produced from relative rotation of the magnetic field and armature.

Figure 42:
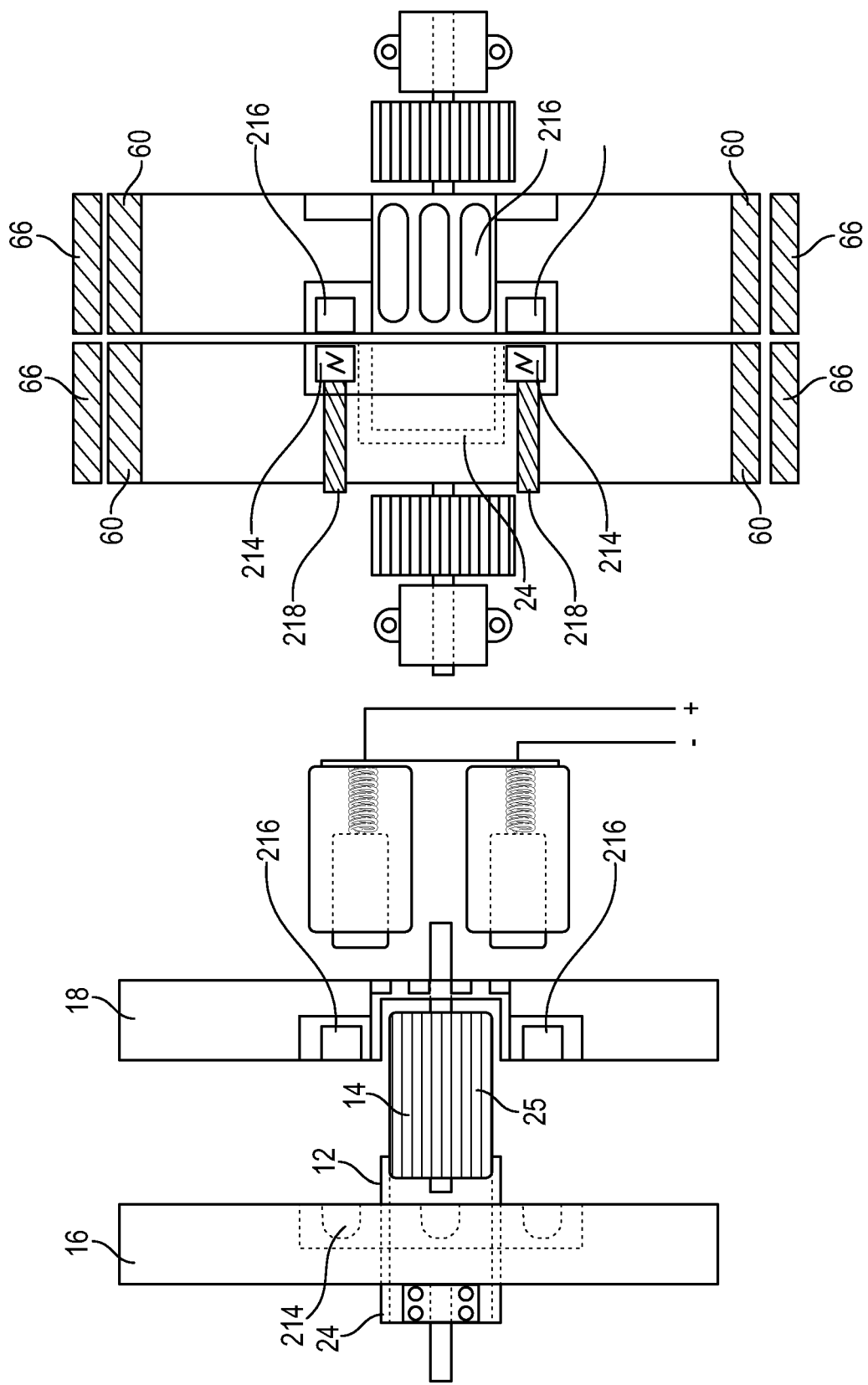
Figure 43:
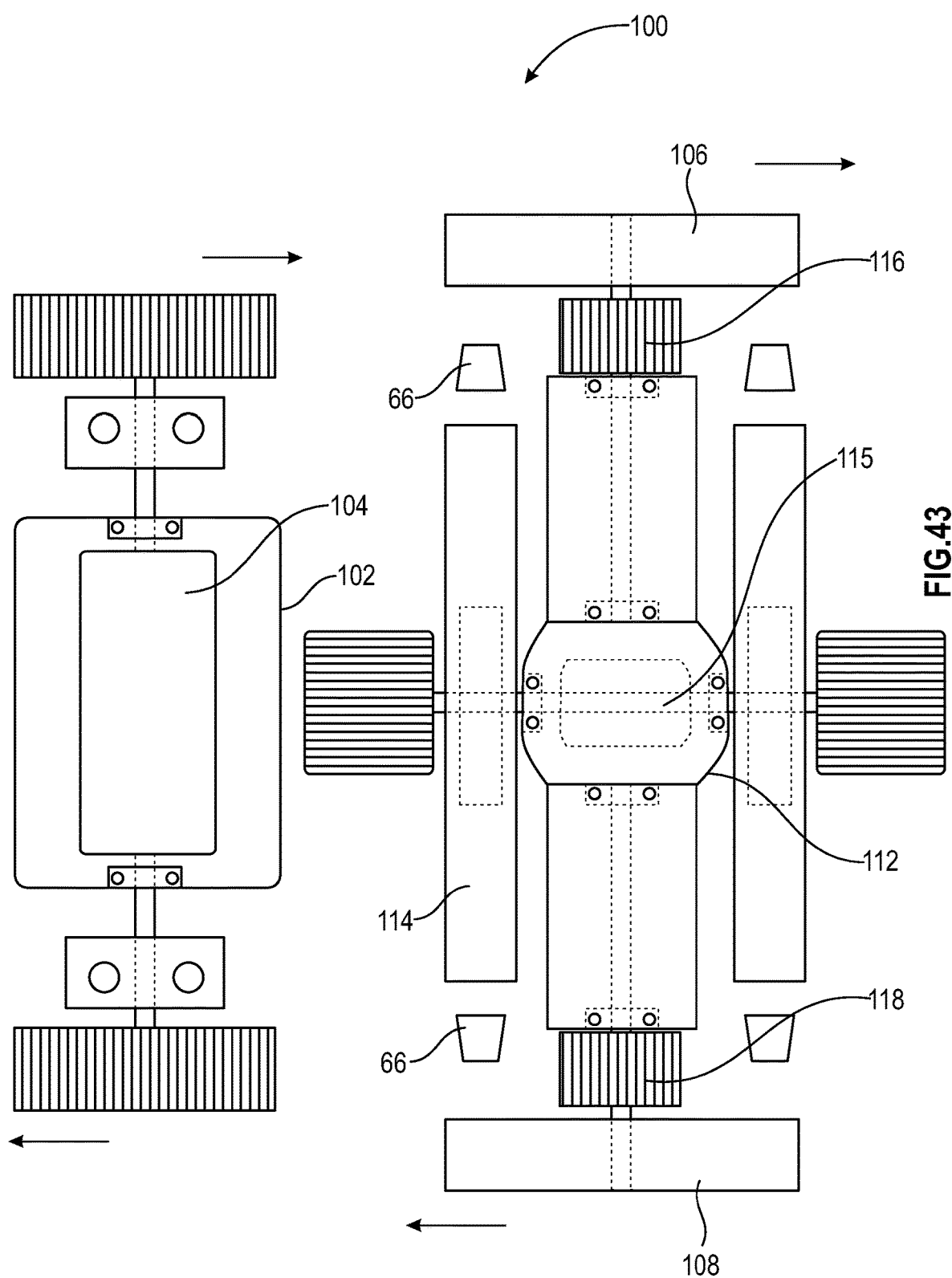
Figure 44:
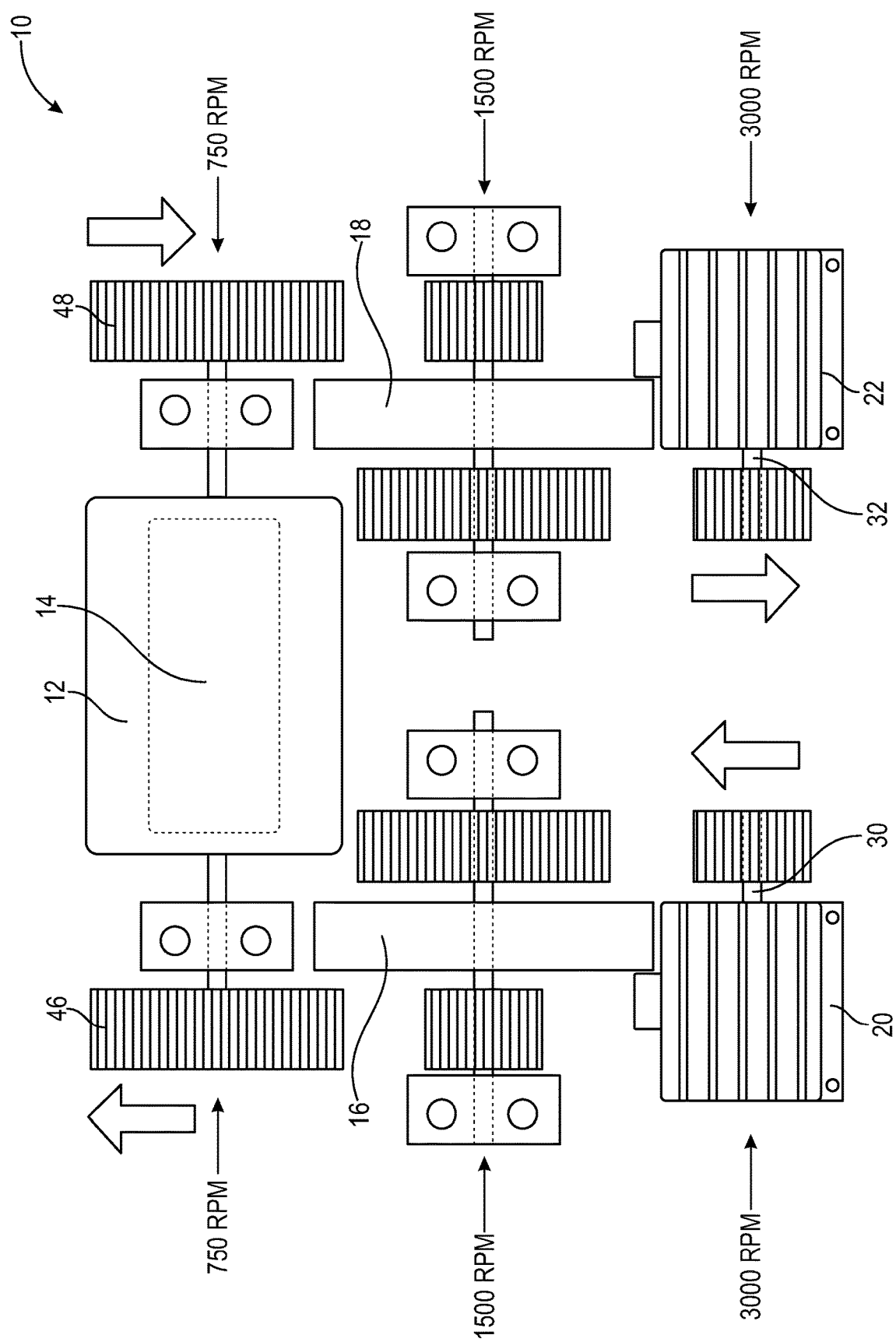
Figure 45:
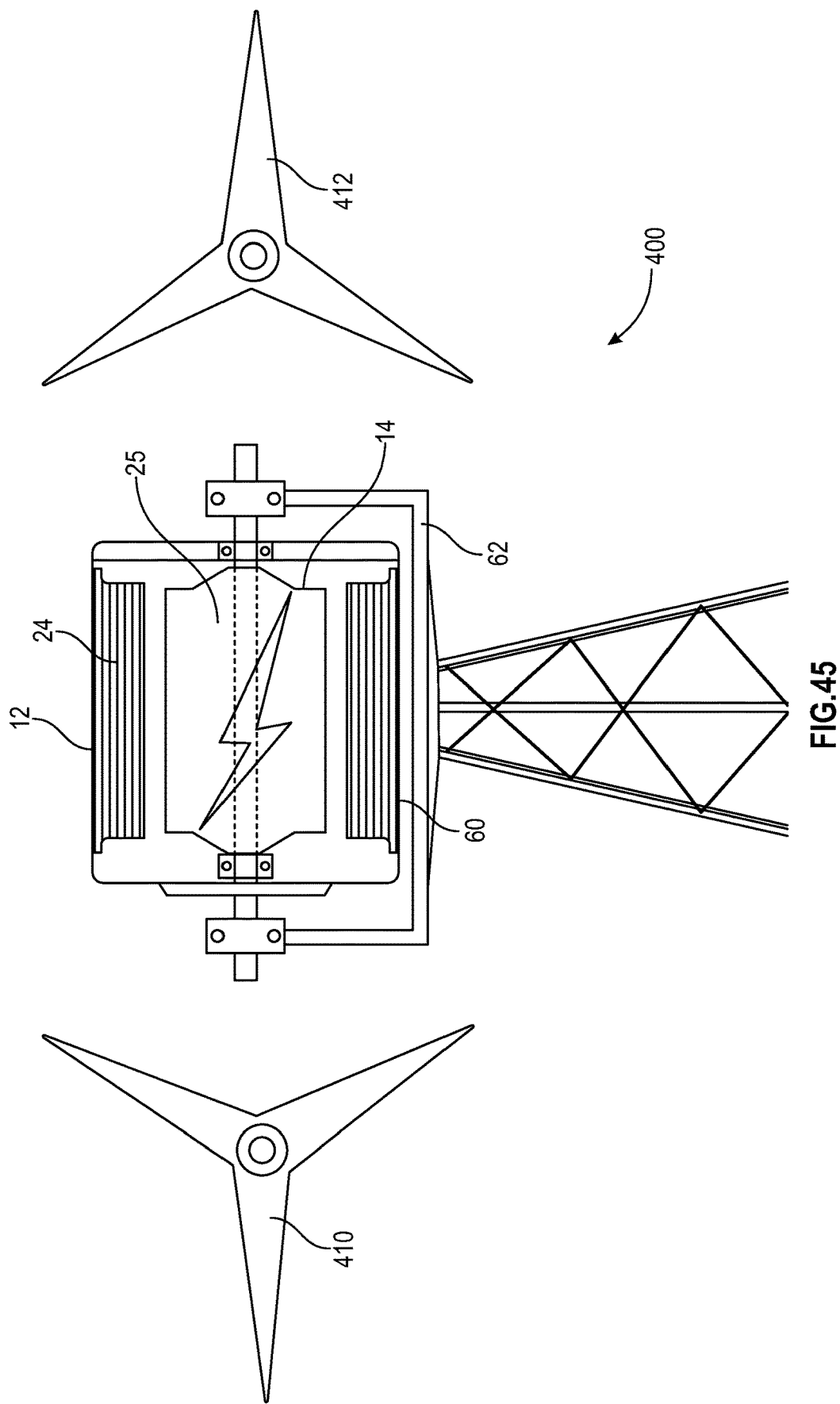

In addition to the inner rotor 204 and outer rotor 202, the generator 200 comprises a set of permanent magnets 214 connected to the first flywheel 206 and a set of field coils 216 connected to the second flywheel 208. FIGS. 28-29 and 31-35 also show examples of the generator 200 provided with the permanent magnets 214 and field coils 216. As best shown in FIG. 30, in such examples the permanent magnets 214 and field coils 216 each may be arranged in a circle, at regular spaced intervals, around the rotational axle of the relevant flywheel. Like the pair of rotors 204, 202, the permanent magnets 214 and field coils 216 rotate in opposite directions and the relative counter rotation causes an electrical current to be induced in the field coils 216. As shown in FIG. 42, the permanent magnets 214 may be mounted to the flywheel by adjustable brackets 218 that allow the position of the permanent magnets 214 relative to the field coils 216 to be adjusted. For example, the permanent magnets 214 may be mounted onto the ends of elongate screw connectors 218 that threadedly engage into elongate passages extending laterally through the flywheel. Rotating the connectors 218 alters the respective distances between the paired magnets 214, 216.

Figure 35:
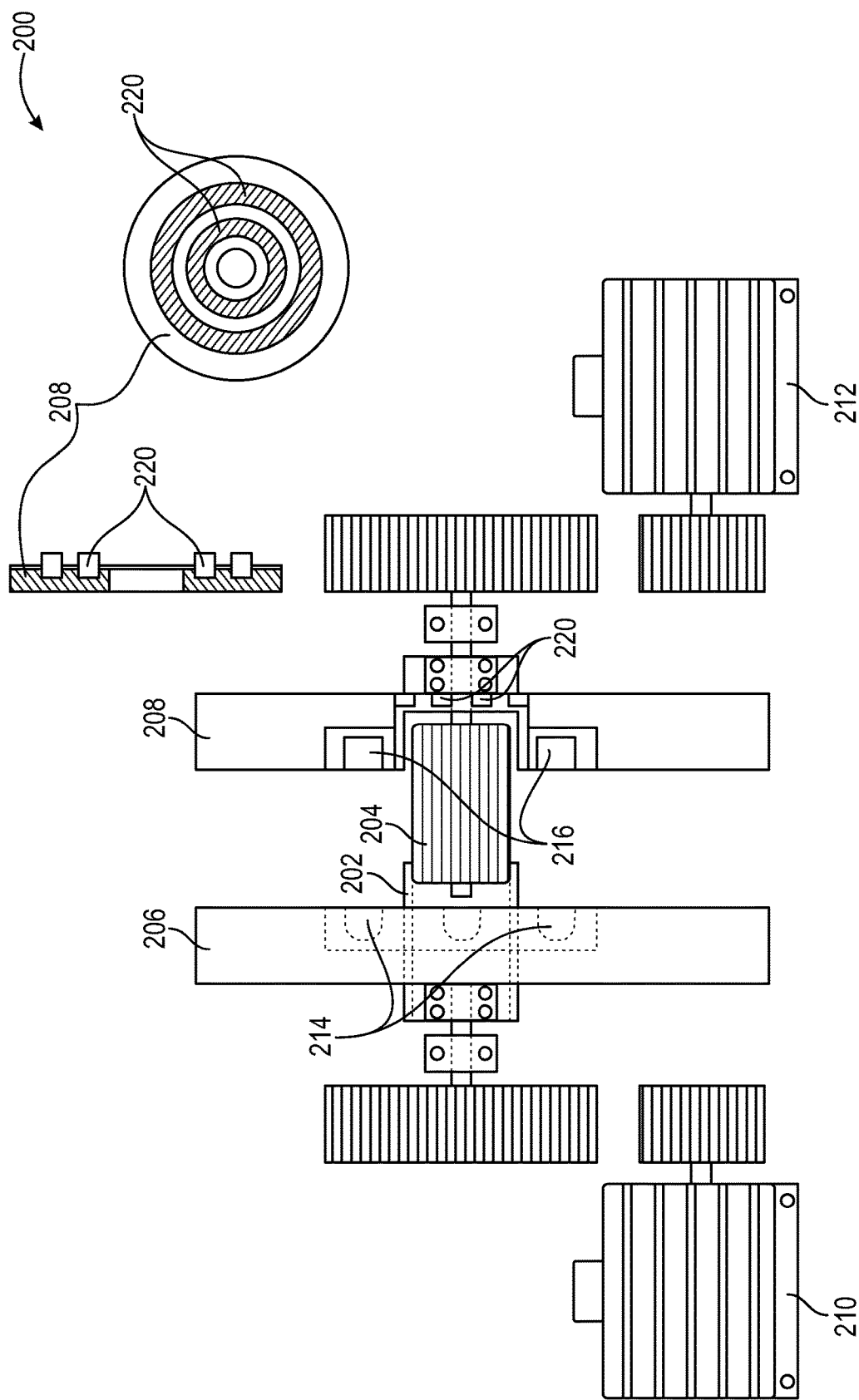
FIG. 35 is a plan view of a generator according to a further example embodiment of the invention shown in partially exploded cross sectional form.

The electrical current that is induced in the field coils 216 supplements the electrical current generated by the counter rotating rotors 204, 202. As best shown in FIG. 35, the second flywheel 208 may comprise a pair of concentric slip rings 220 provided on its output surface that engage with complimentary brushes to receive the electrical power generated by the field coils 216.

Embodiments of the present invention provide generator systems and methods that are useful for generating electrical power, including AC electrical power. In particular, the generator 10 allows AC power to be produced from relatively low individual rotation speeds of each rotor 12, 14 while remaining relatively compact in size. The counter-rotating action of the rotors 12, 14 advantageously provides for high relative rotation between the armature and magnetic field of the generator 10 while maintaining relatively low individual rotational speed of each rotor 12, 14. This mitigates against part wear and failure and provides for improved power generation efficiency compared to conventional generators that use a fixed, stationary stator and a rotating armature. In a conventional generator, the rotor typically runs at 1,500 or 3,000 rpm for 200-250V or 380-440V by a single axle. In embodiments of the present invention, a relative rotation of 1,500 rpm between the two rotors 12, 14 can be achieved but each rotor 12, 14 will individually rotate at half this frequency (i.e., at 750 RPM). In embodiments where a relative rotation of 3,000 rpm is required, each rotor 12, 14 will individually rotate at half this frequency (i.e., at 1,500 RPM). More generally, for any relative rotational frequency that is required, each individual rotor 12, 14 advantageously only needs to individually rotate at half the relative frequency. This allows the generator 10 to produce high power electrical outputs and frequencies when driven by low RPM rotational prime movers. For example, this advantage can be exploited when the generator is powered using a pair of wind turbines in low wind conditions, or by a pair of water turbines in low fluid flow rate conditions. In examples where the flywheels of the generator are provided with sets of permanent magnets 214 and field coils 216 arranged in a circle, the electricity that is induced in the field coils 216 supplements the electricity generated by the counter-rotating action of the rotors 12, 14 and, therefore, improves the efficiency of the generator.

The two flywheels 16, 18 advantageously operate to smooth out any fluctuations in the frequency of the output current produced by the generator 10. For example, if the generator 10 is powered by wind turbines, when the speed and/or direction of the wind powering the turbines suddenly changes, the angle of the turbine's blades must be rapidly adjusted to compensate for the wind changes. The stored rotational energy and inertia of the flywheels 16, 18 keeps the output frequency at a constant, or near constant, value while the blade adjustments are being made.

The magnetic supports 62, 64 advantageously support the weight of the flywheels 16, 18 and, therefore, mitigate against wear to the axles 26, 28 and bearing assemblies supporting the axles 26, 28 during use. The magnetic stabilisers 66 advantageously counteract any periodic forces acting laterally on the axles 26, 28 during use as a result of the flywheels' weights not being perfectly radially symmetrical about their respective axles 26, 28. Due to imperfections introduced during the manufacturing process, the weight distribution of each flywheel will not be perfectly radially symmetrical about its axle. As the size and weight of the flywheels are substantial, even small imperfections can result in strong forces periodically acting on the axles 26, 28. The stabilisers 66 compensate for these undesirable forces. The stabilisers 66 also operate to oppose any periodic forces acting laterally on the axles 26, 28 due to the generator 10 being operated on a ground surface that is not perfectly level. The magnetic supports 62, 64 and stabilisers 66, therefore, allow large and heavy flywheels to be used, which is essential to regulate the output frequency of the generator 10 effectively.

Figure 48:
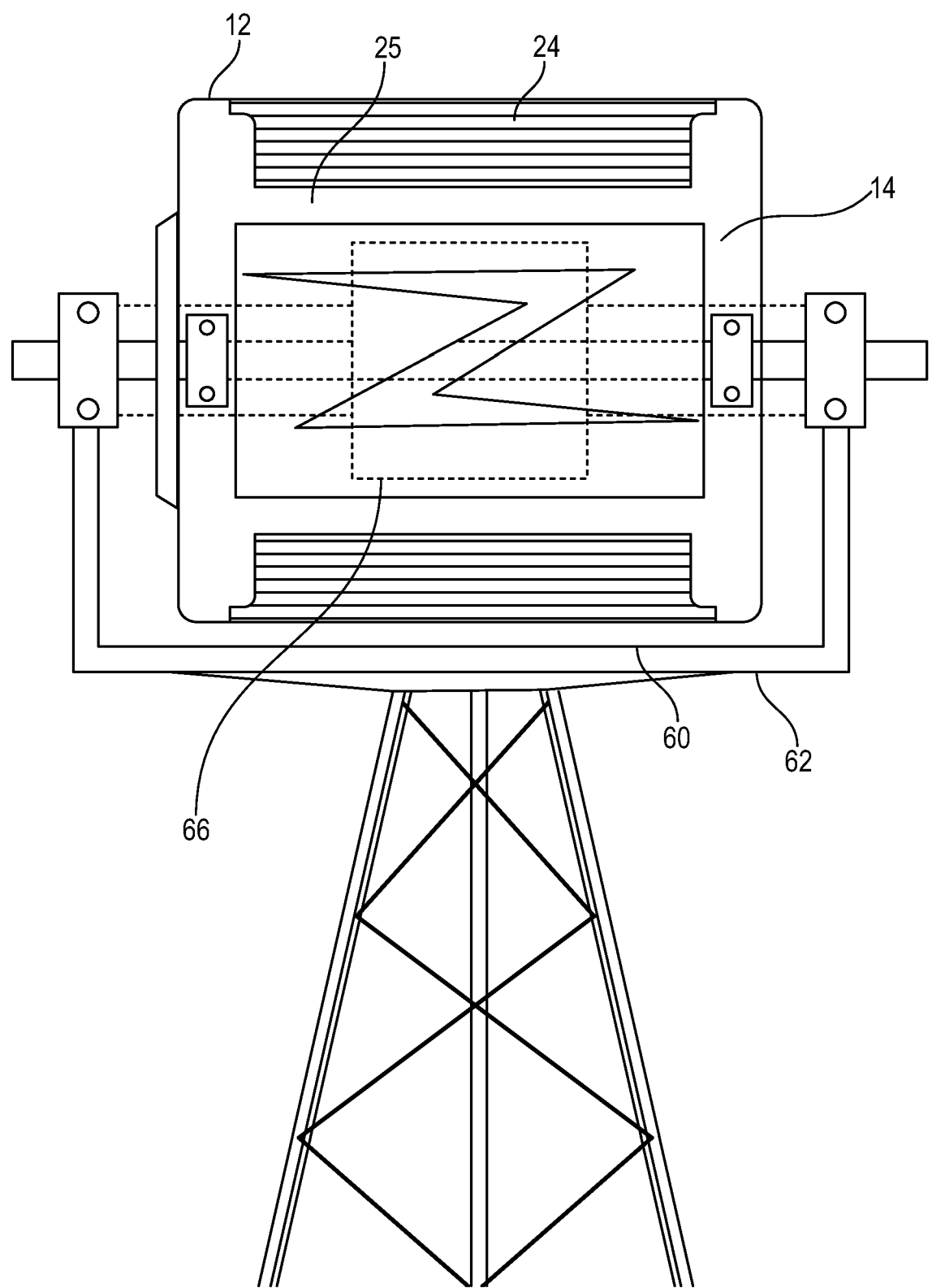
Figure 49:
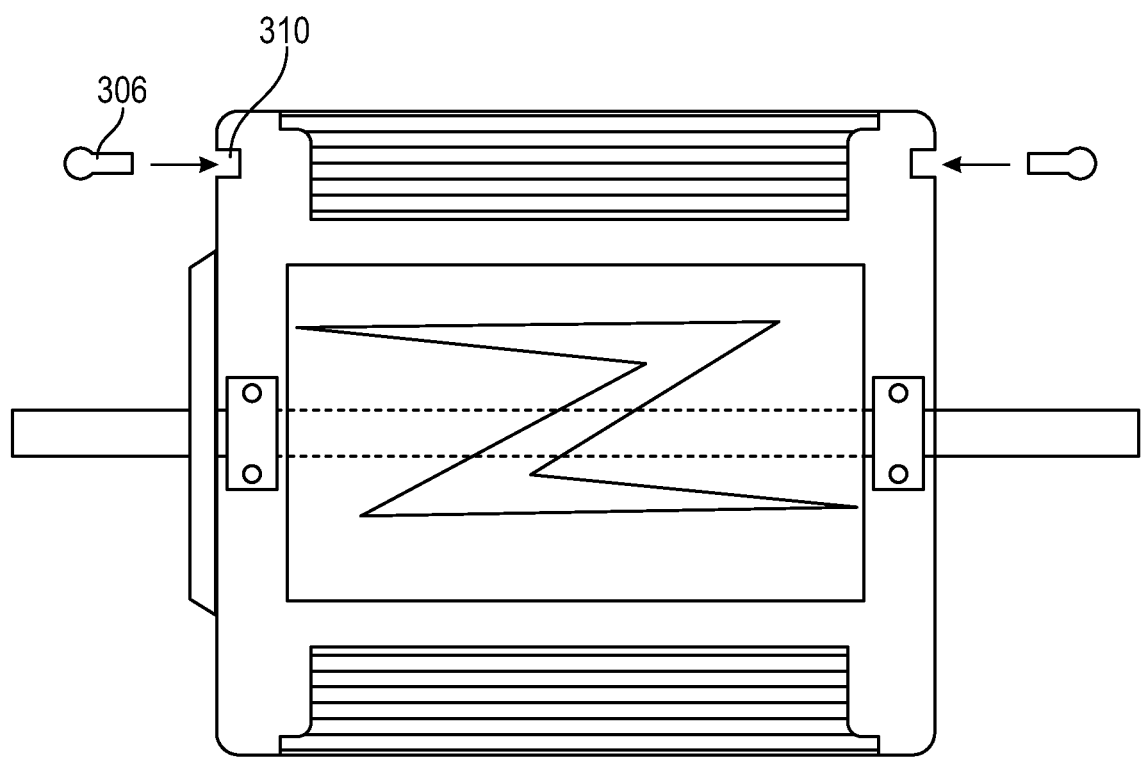

FIGS. 45-48 show wind turbine generators 400 according to further example embodiments of the invention. Each example generator 400 comprises a pair of wind turbines 410, 412 that operate as prime movers to rotate the generator's outer and inner rotors 12, 14 in opposite directions. The rotors 12, 14 may be sufficiently large and heavy such that they inherently operate as a pair of flywheels. For example, the outer casing of each rotor may be sufficiently large and heavy such that the casing operates as a flywheel that is integral with the relevant rotor. The rotors 12, 14 may be mounted above a magnetic platform 62. The outer circumference 60 of the outer rotor 12 may be magnetic such that it is repelled from the platform 62 to support a weight of the rotors 12, 14. As shown in FIGS. 46 and 47, the rotors 12, 14 may also comprise sets of paired permanent magnets 214 and field coils 216 that generate additional electrical power to complement the power produced by the principal magnet 24 and field coils 25 of the generator 400. As shown in FIG. 48, each wind turbine generator 400 will comprise magnetic stabilisers 66 arranged on respective opposed lateral sides of the rotors/flywheels 12, 14. The stabilisers 66 cause opposed horizontally acting magnetic forces to be exerted on the rotors/flywheels 12, 14 to stabilise and impede lateral movement of the rotors/flywheels 12, 14 during use.

Figure 51:
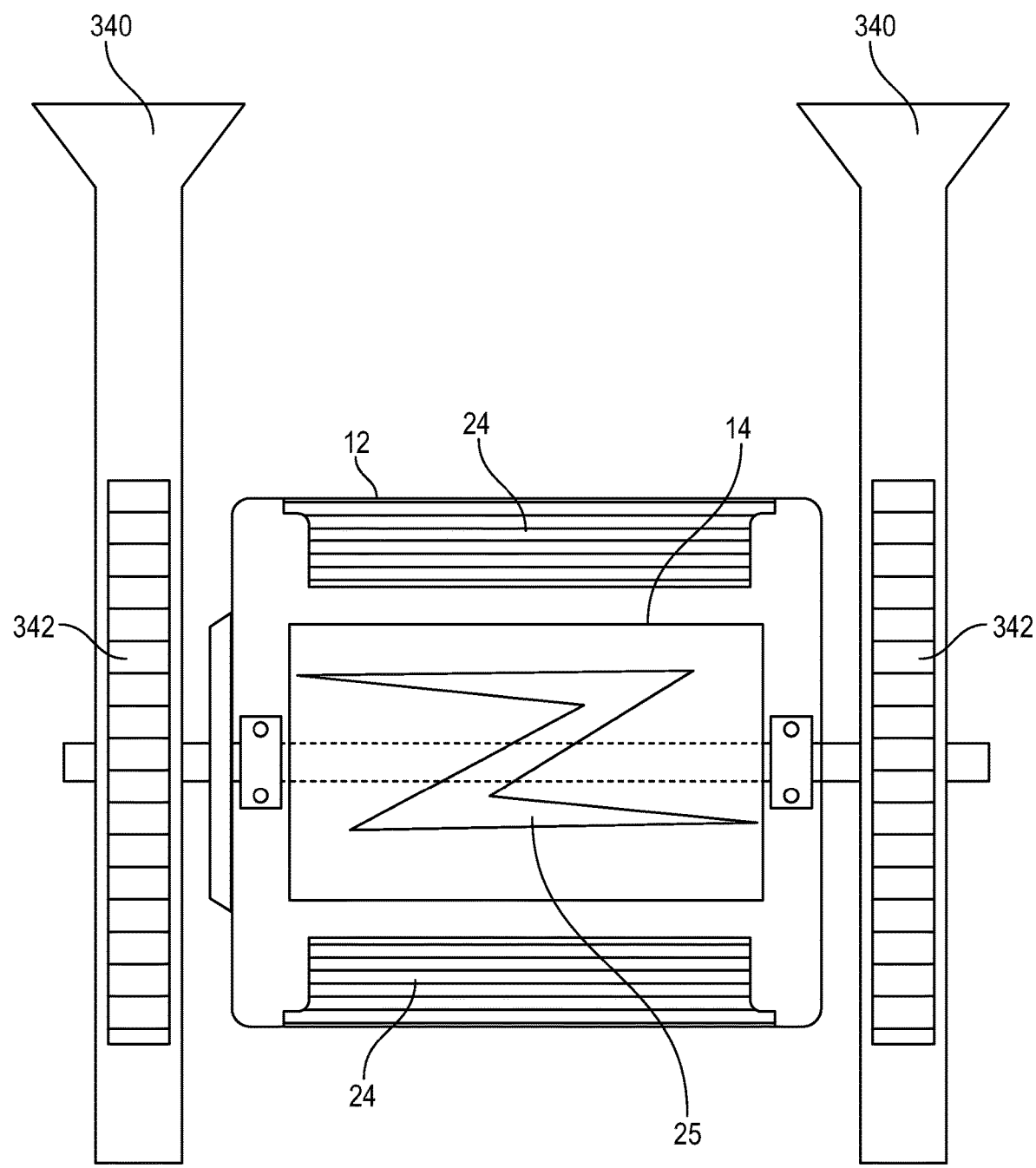
FIG. 51 shows a hydroelectric generator according to a further example embodiment of the invention.

FIG. 51 shows a hydroelectric generator according to a further example embodiment of the invention. The generator comprises a pair of hydraulic turbines 342 that receive water flowing under pressure through a pair of chutes 340. The turbines 342 operate as prime movers to rotate the generator's outer and inner rotors 12, 14 in opposite directions. The rotors 12, 14 may be sufficiently large and heavy such that they inherently operate as flywheels. The rotors 12, 14 comprise the magnetic supports and stabilisers, as described above, to support and stabilise the rotors/flywheels 12, 14.

It will be appreciated that the disclosed generator principles may equally be used to construct a DC generator. It will also be appreciated that the disclosed generator principles may be used to construct an electric motor. By way of example, referring to FIGS. 36-38 there is shown an electric motor 300 that comprises a first rotor 302 and a second rotor 304. The two rotors 302, 304 are coaxially aligned and comprise an outer rotor 302 and an inner rotor 304, wherein the inner rotor 304 is disposed within the outer rotor 302. The two rotors 302, 304 combine to form a magnetic field (stator) and armature pair. In use, when an alternating electrical current is supplied to the magnetic field coils of the outer rotor 302 (stator), the resultant current that is induced in the inner rotor 304 (armature) causes the two rotors 302, 304 to rotate in opposite directions.

Figure 38:
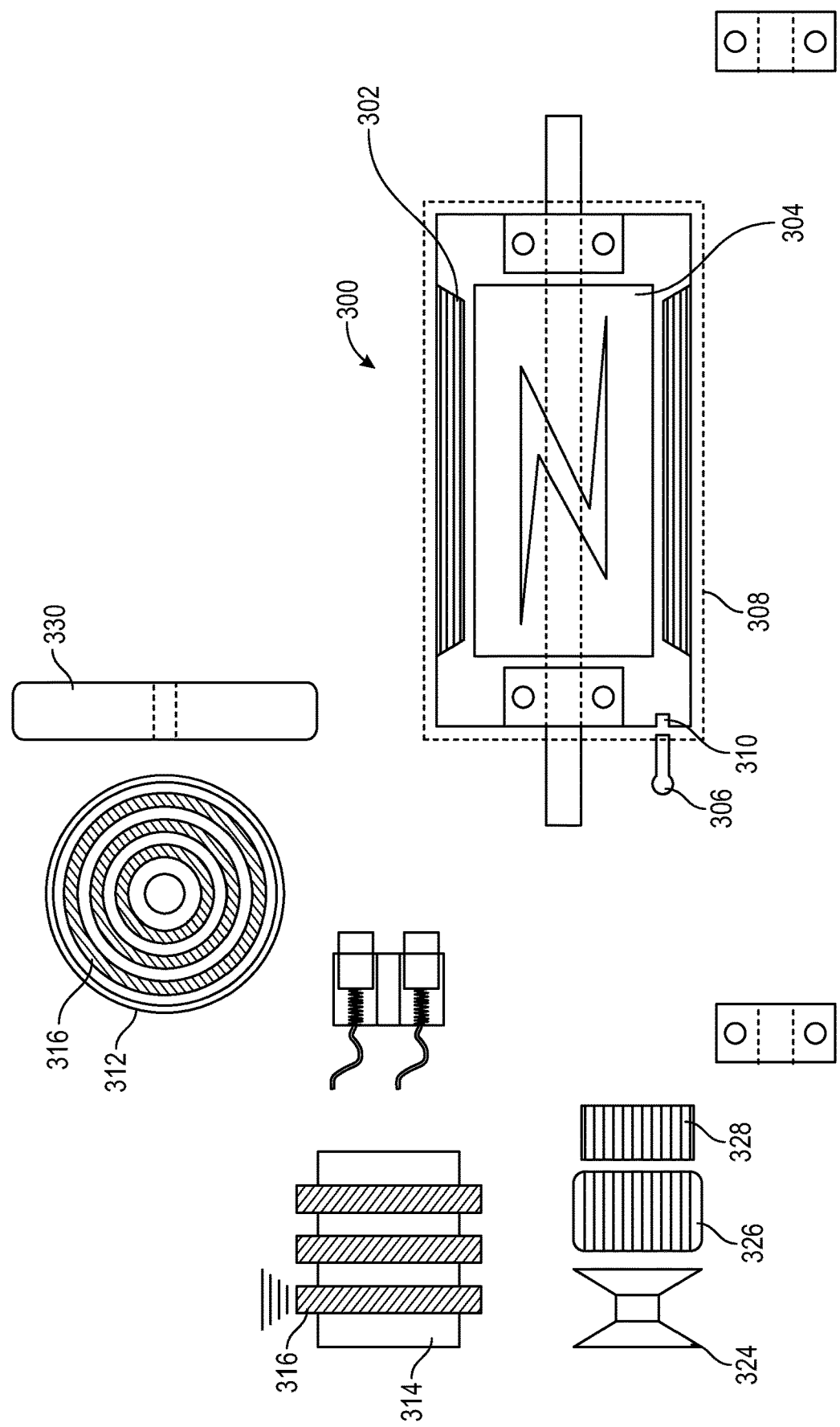
FIG. 38 is a plan view of the electric motor shown in partially exploded cross sectional form.

The electric motor 300 may also be modified to operate in a single rotating manner, rather than a counter rotating manner. For example, as shown in FIG. 38 the electric motor 300 may comprise a locking pin 306 that is slidably mounted to a static support frame or housing 308 of the motor 300. When the pin 306 is pushed toward the support frame 308, the pin 306 engages into a complimentary aperture 310 provided in a side of the outer rotor 302 housing. The pin 306 locks the outer rotor 302 to the support frame 308 thus preventing relative rotation between the outer rotor 302 and frame 308. In use, when an alternating electrical current is supplied to the magnetic field coils of the outer rotor 302 (stator), the current induced in the inner rotor 304 (armature) causes the inner rotor 304 to rotate on its own relative to the outer rotor 302 that is statically fixed to the support frame 308.

The electric motor 300 may comprise a set of slip rings for supplying the electrical current that powers the motor 300 to the outer rotor 302. For example, a set of concentrically-arranged slip rings 312 may be used. In other examples, a set of slip rings 314 may be used that are spaced apart from each other along an axle of the outer rotor 302. The slip rings may include a ground ring 316 tied to earth in addition to live and neutral rings.

Figure 36:
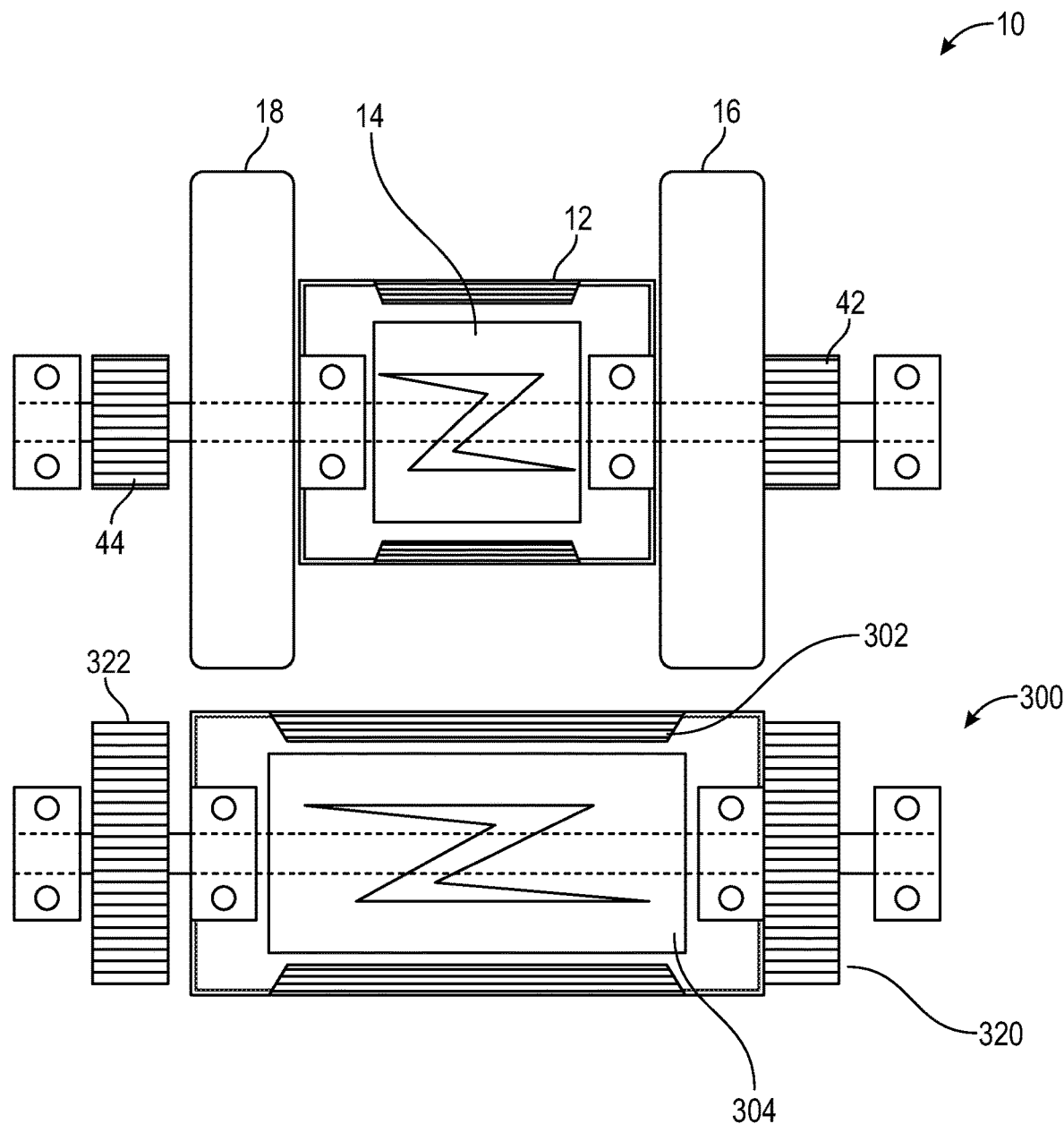
FIG. 36 is a plan view of a generator and electric motor arrangement, wherein the electric motor is constructed using the generator principles disclosed herein.
Figure 37:
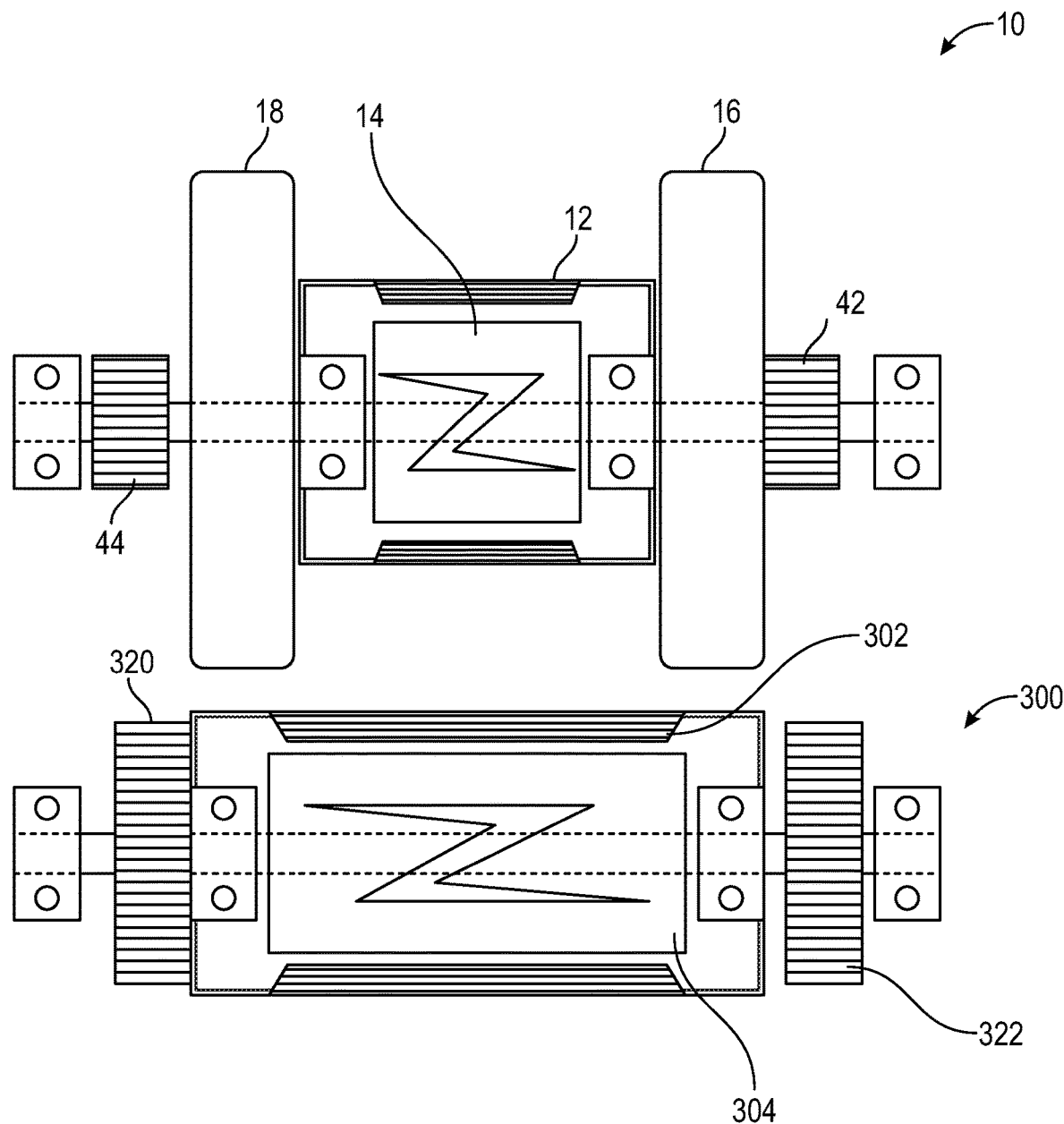
FIG. 37 is a plan view of the generator and electric motor arrangement of FIG. 36, wherein the electric motor and generator are connected together in an alternative way.
Figure 39:
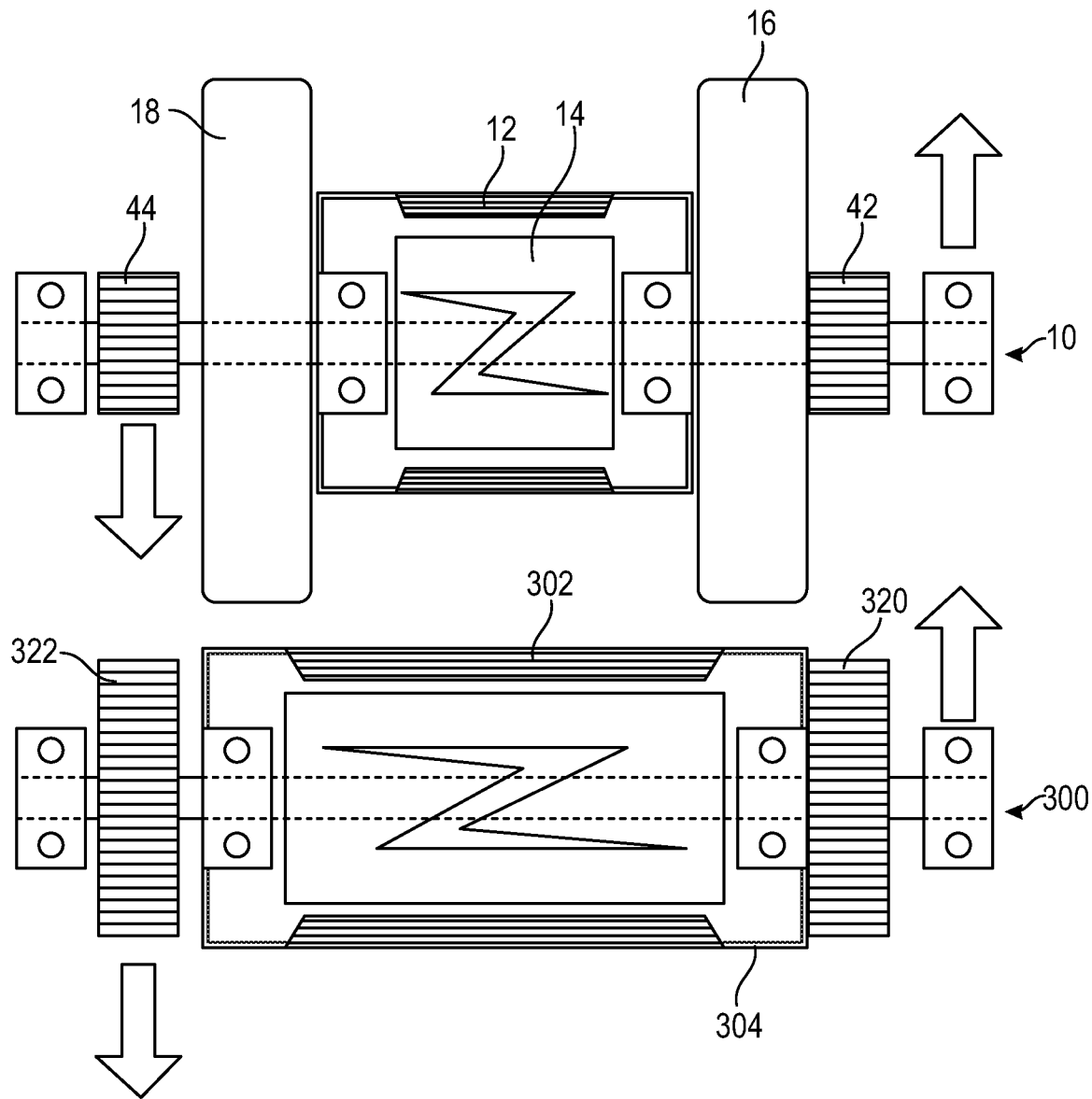
FIG. 39 is a plan view of a further generator and electric motor arrangement, wherein the electric motor is constructed using the generator principles disclosed herein.
Figure 40:
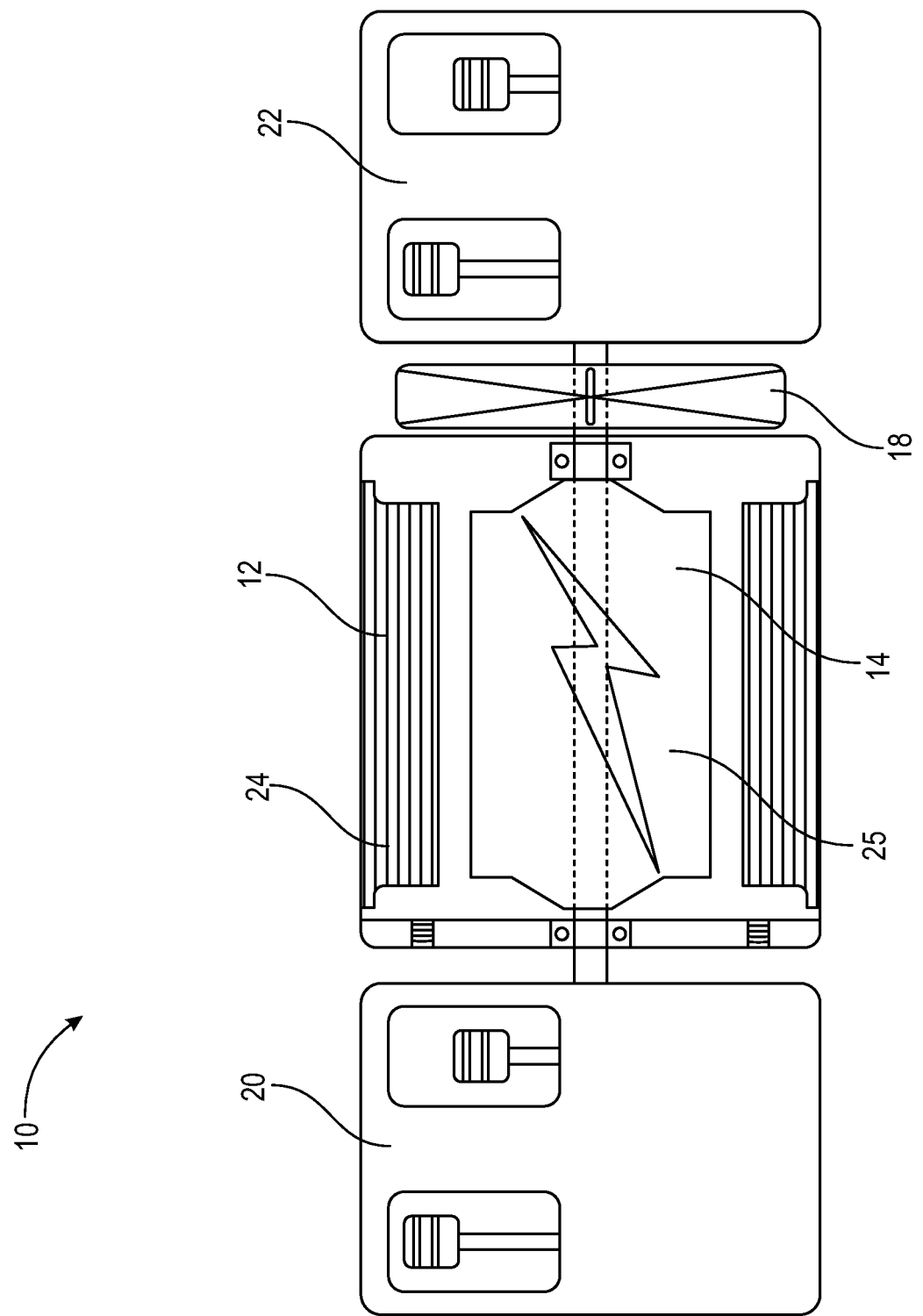
FIGS. 40-44 show generators according to further example embodiments of the invention, wherein the generators are shown in exploded, partially exploded or unexploded form.
Figure 41:
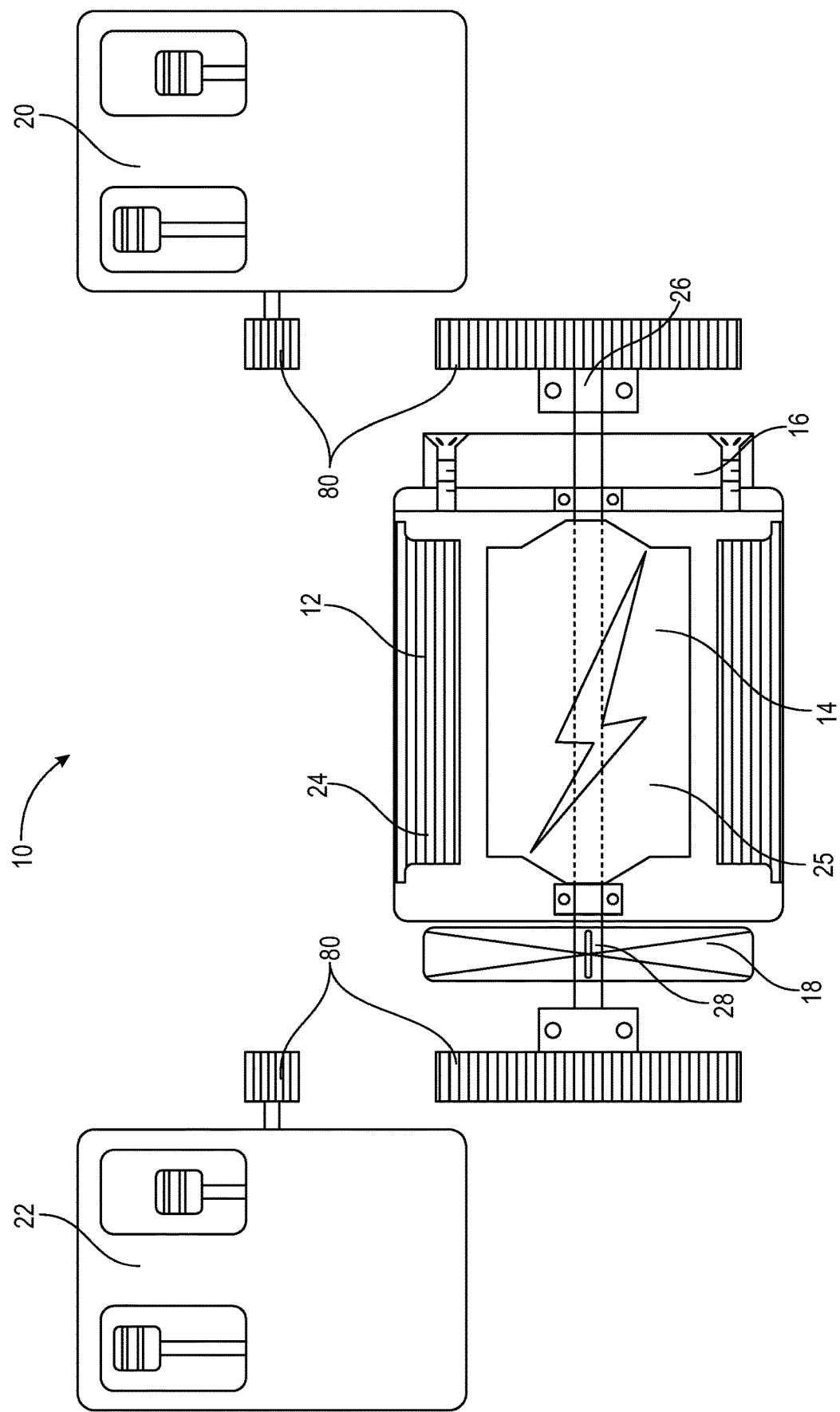

In further examples, the electric motor 300 may be used to drive a mechanical load which, as shown in FIGS. 36 and 37, may be a counter-rotating generator 10 connected to the motor 300 using pulley and drive belt arrangements. In the example shown in FIG. 36, a pulley wheel 320 that is axially connected to the outer rotor 302 operatively drives a pulley wheel 42 axially connected to the outer rotor 12 of the generator 10, and a pulley wheel 322 that is axially connected to the inner rotor 304 operatively drives a pulley wheel 44 axially connected to the inner rotor 14 of the generator 10. Alternatively, in the example shown in FIG. 37, a pulley wheel 320 that is axially connected to the outer rotor 302 of the motor 300 operatively drives a pulley wheel 44 axially connected to the inner rotor 14 of the generator 10, and a pulley wheel 322 that is axially connected to the inner rotor 304 of the motor 300 operatively drives a pulley wheel 42 axially connected to the outer rotor 302 of the generator 10. As shown in FIG. 38, each pulley wheel may comprise a V-belt pulley 324, a timing pulley 326 or a gear pulley 328. A variety of different pulley and belt configurations may be used depending on the RPM and energy output that is required from each of the motor's rotors 302, 304. Alternatively, in the example shown in FIG. 39, a pulley wheel 320 that is axially connected to the outer rotor 302 of the motor 300 operatively drives a pulley wheel 42 axially connected to the inner rotor 14 of the generator 10, and a pulley wheel 322 that is axially connected to the inner rotor 304 of the motor 300 operatively drives a pulley wheel 44 axially connected to the outer rotor 12 of the generator 10.

The electric motor 300 may also be provided with one or more flywheels 330 that may be attached to the outer rotor 302 and/or inner rotor 304. In embodiments where the rotors 302, 304 rotate in opposite directions, the combined weight of the outer rotor 302 and any flywheel attached thereto is preferably substantially equal to the combined weight of the inner rotor 304 and any flywheel attached thereto. This ensures that the rotational inertia of the two counter-rotating bodies is substantially equal and ensures that the same output and RPM is achieved on both sides.

For the purpose of this specification, the word "comprising" means "including but not limited to", and the word "comprises" has a corresponding meaning.

The above embodiments have been described by way of example only and modifications are possible within the scope of the claims that follow.

The invention claimed is:

1. A generator, comprising:
   first and second rotors that are coaxially aligned and comprise an outer rotor and an inner rotor, the inner rotor being disposed within the outer rotor, wherein the rotors combine to form a magnetic field and armature pair for generating electricity;
   first and second prime movers that are independently connected to the first and second rotors respectively to rotate the rotors in opposite relative directions such that electricity is produced from relative rotation of the magnetic field and armature; and
   first and second flywheels connected to or integral with the first and second rotors respectively to rotate with the first and second rotors respectively, wherein a combined weight of the first flywheel and first rotor is substantially equal to a combined weight of the second flywheel and second rotor, and wherein each individual flywheel of the first and second flywheels includes an annular magnet that extends circumferentially around an outer circumference of the individual flywheel, and wherein each individual flywheel is provided with:
one or more magnetic supports arranged relative to the annular magnet to cause at least one vertically acting magnetic force to be exerted on the annular magnet to support a weight of the flywheel; and
a pair of magnetic stabilisers arranged on respective opposed lateral sides of the flywheel, wherein the stabilisers have inwardly positioned surfaces facing the flywheel, wherein magnetic polarities of the surfaces match a magnetic polarity of an outward facing surface of the annular magnet such that the stabilisers cause a pair of opposed magnetic repulsion forces to be exerted on the annular magnet to impede lateral movement of the flywheel to stabilise the flywheel.

2. The generator according to claim 1, wherein the stabilisers are mounted on adjustable supports that allow respective positions of the inwardly positioned surfaces to be adjusted relative to the annular magnet to alter respective magnitudes of the repulsion forces.

3. The generator according to claim 1, wherein the stabilisers comprise electromagnets.

4. The generator according to claim 3, wherein the electromagnets are powered by the electricity generated by the generator.

5. The generator according to claim 1, wherein the magnetic supports comprise a first magnetic support disposed underneath the flywheel, wherein a magnetic polarity of the first magnetic support matches a magnetic polarity of the annular magnet such that the annular magnet is repelled from the first magnetic support.

6. The generator according to claim 5, wherein the magnetic supports comprise a second magnetic support disposed above the flywheel, wherein a magnetic polarity of the second magnetic support is opposite to the magnetic polarity of the annular magnet such that the annular magnet is attracted to the second magnetic support.

7. The generator according to claim 5, wherein the magnetic supports are mounted on adjustable supports that allow respective vertical positions of the magnetic supports relative to the annular magnet to be altered.

8. The generator according to claim 1, wherein the first and second rotors comprise respective first and second drive axles, and wherein the first and second prime movers comprise respective first and second drive shafts coupled to the respective first and second drive axles to rotate the rotors in the opposite relative directions.

9. The generator according to claim 8, wherein the first and second drive shafts are directly axially coupled to the first and second drive axles respectively.

10. The generator according to claim 8, wherein the first and second drive shafts are indirectly coupled to the first and second drive axles respectively by pulley wheel and drive belt arrangements.

11. The generator according to claim 1, wherein the outer rotor provides the magnetic field and the inner rotor provides the armature.

12. The generator according to claim 11, wherein the generator comprises a slip ring assembly provided on the drive axle of the inner rotor.

13. The generator according to claim 1, wherein the generator comprises a slip ring assembly that comprises a pair of conductive rings extending concentrically about a rotational axis of the second of the flywheels.

14. The generator according to claim 1, wherein the outer rotor comprises a generally cylindrical hollow drum, and wherein the first of the flywheels is attached to an outward facing surface of the drum.

15. The generator according to claim 14, wherein the first of the flywheels comprises an annular disc extending circumferentially about the outwardly facing surface of the drum.

16. The generator according to claim 14, wherein the second of the flywheels is attached to a drive axle of the inner rotor and is positioned laterally offset from the drum.

17. The generator according to claim 1, wherein the generator comprises a set of permanent magnets connected to the first of the flywheels and a set of field coils connected to the second of the flywheels, wherein relative rotation between the permanent magnets and field coils causes an electrical current to be induced in the field coils.

18. The generator according to claim 1, wherein the generator comprises a third rotor, wherein the inner and outer rotors are disposed inside and coaxially aligned with the third rotor, the third rotor being connected to a drive axle of the inner rotor such that the third rotor is rotated by the drive axle with the inner rotor in an opposite relative direction to the outer rotor, and wherein the third rotor and outer rotor combine to form a magnetic field and armature pair for generating electricity.

19. The generator according to claim 1, wherein the prime movers comprise a pair of hydraulic turbines.

* * * * *